US010375406B2

(12) United States Patent
Tanaka et al.

(10) Patent No.: US 10,375,406 B2
(45) Date of Patent: Aug. 6, 2019

(54) IMAGE ENCODING DEVICE AND METHOD, AND IMAGE PROCESSING DEVICE AND METHOD FOR ENABLING BITSTREAM CONCATENATION

(71) Applicant: SONY CORPORATION, Tokyo (JP)

(72) Inventors: Junichi Tanaka, Kanagawa (JP); Akihiro Imamura, Tokyo (JP); Ohji Nakagami, Tokyo (JP); Takefumi Nagumo, Kanagawa (JP); Yuichi Araki, Tokyo (JP); Yuji Fujimoto, Kanagawa (JP); Shinobu Hattori, Tokyo (JP); Masakazu Kouno, Tokyo (JP)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 15/114,301

(22) PCT Filed: Feb. 24, 2015

(86) PCT No.: PCT/JP2015/055142
§ 371 (c)(1),
(2) Date: Jul. 26, 2016

(87) PCT Pub. No.: WO2015/133325
PCT Pub. Date: Sep. 11, 2015

(65) Prior Publication Data
US 2017/0013267 A1 Jan. 12, 2017

(30) Foreign Application Priority Data
Mar. 7, 2014 (JP) .................................. 2014-045741

(51) Int. Cl.
*H04N 19/46* (2014.01)
*H04N 19/40* (2014.01)
(Continued)

(52) U.S. Cl.
CPC ........... *H04N 19/40* (2014.11); *H04L 65/607* (2013.01); *H04N 19/114* (2014.11);
(Continued)

(58) Field of Classification Search
CPC .... H04N 19/40; H04N 19/126; H04N 19/184; H04N 19/463; H04L 65/607
(Continued)

(56) References Cited

U.S. PATENT DOCUMENTS

| 2010/0034254 A1 | 2/2010 | Wang |
| 2013/0243080 A1* | 9/2013 | Leontaris ............. H04N 19/115 375/240.02 |
| 2014/0192893 A1* | 7/2014 | Sullivan ........... H04N 21/23424 375/240.25 |

FOREIGN PATENT DOCUMENTS

| JP | 09-331524 | 12/1997 |
| JP | 2003-052010 | 2/2003 |

(Continued)

OTHER PUBLICATIONS

Gary J. Sullivan, Lihua Zhu, and Sridhar Sankuratri, "HRD issue for bitstream splicing", Joint Collaborative Team on Video Coding (JCT-VC) of ITU-T SG 16 WP 3 and ISO/IEC JTC 1/SC 29/WG 11, 12th Meeting: Geneva, CH, Jan. 2013.*

(Continued)

*Primary Examiner* — Ayman A Abaza
(74) *Attorney, Agent, or Firm* — Paratus Law Group, PLLC

(57) ABSTRACT

There is provided an image encoding device and an image encoding method, and an image processing device and an image processing method that enable easier bitstream concatenation. A structure according to the present disclosure includes: a setting unit that sets header information related to a hypothetical reference decoder in accordance with
(Continued)

information about a position and information about reference, the information about a position and the information about reference being of the current picture of image data to be processed; and an encoding unit that encodes the image data and generates a bitstream containing the encoded data of the image data and the header information set by the setting unit. The present disclosure can be applied to image processing devices or image encoding devices, for example.

20 Claims, 36 Drawing Sheets

(51) Int. Cl.
*H04N 19/126* (2014.01)
*H04N 19/184* (2014.01)
*H04N 19/463* (2014.01)
*H04L 29/06* (2006.01)
*H04N 19/114* (2014.01)

(52) U.S. Cl.
CPC ......... *H04N 19/126* (2014.11); *H04N 19/184* (2014.11); *H04N 19/46* (2014.11); *H04N 19/463* (2014.11)

(58) Field of Classification Search
USPC .................................................. 375/240.01
See application file for complete search history.

(56) References Cited

FOREIGN PATENT DOCUMENTS

| | | | | |
|---|---|---|---|---|
| JP | 2003052010 A | * | 2/2003 | ............... H04N 5/91 |
| JP | 2008-022361 | | 1/2008 | |
| JP | 2008-131147 | | 6/2008 | |
| JP | 2010-516103 | | 5/2010 | |

OTHER PUBLICATIONS ("High efficiency video coding", Series H: Audiovisual and Multimedia Systems Infrastructure of audiovisual services—Coding of moving video, Apr. 2013.*
ITU-T, "High efficiency video coding", Series H: Audiovisual and Multimedia Systems Infrastructure of audiovisual services—Coding of moving video, Apr. 2013, pp. I, 242, 246-247.
Sullivan, et al., "HRD issue for bitstream splicing", Joint Collaborative Team on Video Coding (JCT-VC) of ITU-T SG16 WP3 and ISO/IEC JTC1/SG29/WG11, Jan. 14-23, 2013, pp. 1-7, 12$^{th}$ Meeting: Geneva, CH.
Kazui, et al., "AHG9: Simple HEVC steam editing", Joint Collaborative Team on Video Coding (JCT-VC) of ITU-T SG16 WP3 and ISO/IEC JTC1/SC29/WG11, Oct. 10-19, 2012, pp. 1-14, 11$^{th}$ Meeting: Shanghai, CN.
Sep. 20, 2017, European search report issued for related EU application No. 15758960.7.
Benjamin Bross, et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. i-258, 11$^{th}$ Meeting: Shanghai, CN.
Sachin Deshpande, et al., An Improved Hypothetical Reference Decoder for HEVC, Visual Information Processing Communication IV, Feb. 21, 2013, pp. 1-9.
Oct. 30, 2018, Japanese Office Action for related JP application No. 2016-506433.
ITU-T, "High efficiency video coding", Series H: Audiovisual and Multimedia Systems Infrastructure of audiovisual services—Coding of moving video, Apr. 2013, pp. 226-229, 242, 243, 246-247.
Feb. 22, 2019, Chinese Office Action issued for related CN Application No. 201580011410.9.
Apr. 18, 2019, European Search Report issued for related EP Application No. 19157523.2.

* cited by examiner

FIG. 1

Stream A

| Decode Order | N+0 | N+1 | N+2 | N+3 | N+4 | N+5 |
|---|---|---|---|---|---|---|
| Display Order | N+0 | N+1 | N+2 | N+3 | N+4 | N+5 |
| PicType | P | P | P | P | P | P |
| nal_unit_type | 1 | 1 | 1 | 1 | 1 | 1 |
| CpbRemovalDelay | 15 | 16 | 17 | 18 | 19 | 20 |
| DpbOutputDelay | 0 | 0 | 0 | 0 | 0 | 0 |
| SEI | PT | PT | PT | PT | PT | PT |

Stream B

| Decode Order | N+0 | N+1 | N+2 | N+3 | N+4 | N+5 |
|---|---|---|---|---|---|---|
| Display Order | N+0 | N+1 | N+2 | N+3 | N+4 | N+5 |
| PicType | IDR | P | P | P | P | P |
| nal_unit_type | 1 | 1 | 1 | 1 | 1 | 1 |
| CpbRemovalDelay | 0 | 1 | 2 | 3 | 4 | 5 |
| DpbOutputDelay | 0 | 0 | 0 | 0 | 0 | 0 |
| SEI | BP+PT | PT | PT | PT | PT | PT |

A

Stream A+B

| Decode Order | N+0 | N+1 | N+2 | N+3 | N+4 | N+5 | N+0 | N+1 | N+2 | N+3 | N+4 | N+5 |
|---|---|---|---|---|---|---|---|---|---|---|---|---|
| Display Order | N+0 | N+1 | N+2 | N+3 | N+4 | N+5 | N+0 | N+1 | N+2 | N+3 | N+4 | N+5 |
| PicType | P | P | P | P | P | P | IDR | P | P | P | P | P |
| nal_unit_type | 1 | 1 | 1 | 1 | 1 | 1 | 1 | 1 | 1 | 1 | 1 | 1 |
| CpbRemovalDelay | 15 | 16 | 17 | 18 | 19 | 20 | 21 | 1 | 2 | 3 | 4 | 5 |
| DpbOutputDelay | 0 | 0 | 0 | 0 | 0 | 0 | 0 | 0 | 0 | 0 | 0 | 0 |
| SEI | PT | PT | PT | PT | PT | PT | BP+PT | PT | PT | PT | PT | PT |

CpbRemovalDelay AT START OF Stream B NEEDS TO BE +1 GREATER THAN CpbRemovalDelay AT END OF Stream A.

Stream A

| Decode Order | N+0 | N+1 | N+2 | N+3 | N+4 | N+5 |
|---|---|---|---|---|---|---|
| Display Order | N+2 | N+0 | N+1 | N+5 | N+3 | N+4 |
| PicType | P | B | B | P | B | B |
| nal_unit_type | 1 | 1 | 1 | 1 | 1 | 1 |
| CpbRemovalDelay | 15 | 16 | 17 | 18 | 19 | 20 |
| DpbOutputDelay | 2 | 0 | 0 | 2 | 0 | 0 |
| SEI | PT | PT | PT | PT | PT | PT |

Stream B

| Decode Order | N+0 | N+1 | N+2 | N+3 | N+4 | N+5 |
|---|---|---|---|---|---|---|
| Display Order | N+2 | N+0 | N+1 | N+5 | N+3 | N+4 |
| PicType | IDR | B | B | P | B | B |
| nal_unit_type | 1 | 1 | 1 | 1 | 1 | 1 |
| CpbRemovalDelay | 0 | 1 | 2 | 3 | 4 | 5 |
| DpbOutputDelay | 2 | 0 | 0 | 2 | 0 | 0 |
| SEI | BP+PT | PT | PT | PT | PT | PT |

A

Stream A+B

| Decode Order | N+0 | N+1 | N+2 | N+3 | N+4 | N+5 | N+0 | N+1 | N+2 | N+3 | N+4 | N+5 |
|---|---|---|---|---|---|---|---|---|---|---|---|---|
| Display Order | N+2 | N+0 | N+1 | N+5 | N+3 | N+4 | N+2 | N+0 | N+1 | N+5 | N+3 | N+4 |
| PicType | P | B | B | P | B | B | IDR | B | B | P | B | B |
| nal_unit_type | 1 | 1 | 1 | 1 | 1 | 1 | 1 | 1 | 1 | 1 | 1 | 1 |
| CpbRemovalDelay | 15 | 16 | 17 | 18 | 19 | 20 | 21 | 1 | 2 | 3 | 4 | 5 |
| DpbOutputDelay | 2 | 0 | 0 | 2 | 0 | 0 | 2 | 0 | 0 | 2 | 0 | 0 |
| SEI | PT | PT | PT | PT | PT | PT | BP+PT | PT | PT | PT | PT | PT |

CpbRemovalDelay AT START OF Stream B NEEDS TO BE +1 GREATER THAN CpbRemovalDelay AT END OF Stream A.

IMAGE ENCODING DEVICE AND METHOD, AND IMAGE PROCESSING DEVICE AND METHOD FOR ENABLING BITSTREAM CONCATENATION

CROSS REFERENCE TO PRIOR APPLICATION

This application is a National Stage Patent Application of PCT International Patent Application No. PCT/JP2015/055142 (filed on Feb. 24, 2015) under 35 U.S.C. § 371, which claims priority to Japanese Patent Application No. 2014-045741 (filed on Mar. 7, 2014), which are all hereby incorporated by reference in their entirety.

TECHNICAL FIELD

The present disclosure relates to image encoding devices and methods, and image processing devices and methods, and more particularly, to an image encoding device and an image encoding method, and an image processing device and an image processing method that enable easier concatenation of bitstreams.

BACKGROUND ART

In conventional editing of moving images, moving images are concatenated. Since the data size of moving image data is normally large in digital signal processing, moving image data is often encoded (compressed) before use. Examples of general encoding methods for image data include Moving Picture Experts Group (MPEG), Advanced Video Coding (AVC), and High Efficiency Video Coding (HEVC).

In a case where moving images are concatenated in the above described manner using moving image data encoded as above, one bitstream is generated from more than one bitstream. In such bitstream generation, each bitstream may be decoded and decompressed, and the bitstreams be then concatenated. The moving images after the concatenation may be encoded, to generate one bitstream. In that case, the processing load might become larger, as the data size of the bitstreams becomes larger.

In view of this, smart rendering editing has been developed as a technology for shortening the encoding time and preventing image quality degradation when moving image data encoded as above are clipped and edited with frame precision (see Patent Document 1 and Patent Document 2, for example).

Meanwhile, in AVC and HEVC, the concept of a hypothetical reference decoder (HRD) is introduced so as to transmit bitstreams without any breaking. An encoder needs to generate bitstreams in such a manner as not to cause the hypothetical reference decoder to break. This also applies in encoding in the above described smart rendering editing.

CITATION LIST

Patent Documents

Patent Document 1: Japanese Patent Application Laid-Open No. 2008-22361
Patent Document 2: Japanese Patent Application Laid-Open No. 2008-131147

SUMMARY OF THE INVENTION

Problems to be Solved by the Invention

In the smart rendering editing, however, the relationship between concatenated bitstreams is not taken into consideration in a case where a predetermined encoded section of a moving image is simply encoded. As a result, prevention of breaking of the hypothetical reference decoder cannot be guaranteed over the concatenated portions (in the entire bitstream after the concatenation). That is, there is a risk that the bitstream after concatenation cannot be correctly decoded.

So as to correctly decode the bitstream after the concatenation, it is necessary to perform a troublesome operation such as appropriately rewriting the information related to the hypothetical reference decoder included in the bitstream.

The present disclosure is made in view of those circumstances, and is to enable easier concatenation of bitstreams.

Solutions to Problems

One aspect of the present technology is an image encoding device that includes: a setting unit that sets header information related to a hypothetical reference decoder in accordance with information about a position and information about reference, the information about a position and the information about reference being of the current picture of image data to be processed; and an encoding unit that encodes the image data and generates a bitstream containing the encoded data of the image data and the header information set by the setting unit.

The setting unit may set information indicating a null unit type.

The setting unit may further set information indicating bitstream concatenation.

The setting unit may further set information indicating a difference between the position of the access unit at the end of the bitstream and the position of the previous non-discardable picture.

When the current picture is a first picture, the setting unit may set the information indicating the null unit type at a value indicating an IDR picture, set the information indicating bitstream concatenation at "true", and set the information indicating the difference between the position of the access unit at the end of the bitstream and the position of the previous non-discardable picture at a minimum value.

When the current picture is a last picture, the setting unit may set the information indicating the null unit type at a value indicating a trailing picture that is not of a temporal sublayer and is to be referred to, set the information indicating bitstream concatenation at "false", and set the information indicating the difference between the position of the access unit at the end of the bitstream and the position of the previous non-discardable picture at a minimum value.

When the current picture is neither a first picture nor a last picture, but is a reference picture, the setting unit may set the information indicating the null unit type at a value indicating a trailing picture that is not of a temporal sublayer and is to be referred to, set the information indicating bitstream concatenation at "false", and set the information indicating the difference between the position of the access unit at the end of the bitstream and the position of the previous non-discardable picture at a minimum value.

When the current picture is neither a first picture nor a last picture, and is not a reference picture, either, the setting unit may set the information indicating the null unit type at a value indicating a non-reference picture that is not of a temporal sublayer, set the information indicating bitstream concatenation at "false", and set the information indicating the difference between the position of the access unit at the end of the bitstream and the position of the previous non-discardable picture at a minimum value.

The image encoding device may further include a rate control unit that sets a target code amount value in accordance with the information about the position of the current picture, information indicating a section for adjusting the hypothetical reference decoder, and information indicating a generated code amount.

The one aspect of the present technology is also an image encoding method that includes: setting header information related to a hypothetical reference decoder in accordance with information about a position and information about reference, the information about a position and the information about reference being of the current picture of image data to be processed; and encoding the image data and generating a bitstream containing the encoded data of the image data and the set header information.

Another aspect of the present technology is an image processing device that includes an updating unit that updates header information related to a hypothetical reference decoder, the header information being included in a bitstream containing encoded data generated by encoding image data, the updating enabling concatenation of the bitstream with another bitstream.

The updating unit may re-encode the bitstream to appropriately adjust the relationship between the position of the coded picture buffer at the end of the bitstream to be concatenated and the position of the coded picture buffer at the start of the concatenating bitstream.

The updating unit may update information indicating the null unit type at the end of the bitstream with the value corresponding to the previous non-discardable picture.

The updating unit may update information about readout from a coded picture buffer with a value suitable for bitstream concatenation.

The updating unit may search for the previous non-discardable picture at the end of the bitstream, and, in accordance with a result of the search, update the difference between the position of the access unit at the end of the bitstream and the position of the previous non-discardable picture.

The updating unit may update information about readout from the coded picture buffer and the decoded picture buffer at the end of the bitstream with a value suitable for bitstream concatenation.

The updating unit may update information about readout from the coded picture buffer and the decoded picture buffer at the start of the bitstream with a value suitable for bitstream concatenation.

The updating unit may update information indicating a delay of readout from the coded picture buffer of the access unit at the start of the concatenating bitstream, with a value in accordance with information indicating a delay of readout from the coded picture buffer at the end of the bitstream to be concatenated.

The image processing device may further include a concatenating unit that concatenates the bitstream updated by the updating unit with another bitstream.

Another aspect of the present technology is also an image processing method that includes updating header information related to a hypothetical reference decoder, the header information being included in a bitstream containing encoded data generated by encoding image data, the updating enabling concatenation of the bitstream with another bitstream.

In the one aspect of the present technology, header information related to a hypothetical reference decoder is set in accordance with information about a position and information about reference, the information about a position and the information about reference being of the current picture of image data to be processed, and a bitstream containing encoded data of the image data and the set header information is generated by encoding the image data.

In another aspect of the present technology, header information related to a hypothetical reference decoder included in a bitstream containing encoded data generated by encoding image data is updated so that the bitstream can be concatenated with another bitstream.

Effects of the Invention

According to the present disclosure, image data can be encoded or processed. Particularly, bitstreams can be more easily concatenated.

BRIEF DESCRIPTION OF DRAWINGS

FIG. 1 is a diagram for explaining an example of smart rendering editing.

FIG. 2 is a diagram for explaining an example of smart rendering editing.

FIG. 4 is a diagram for explaining an example of smart rendering editing.

FIG. 5 is a diagram for explaining an example of smart rendering editing.

FIG. 14 is a diagram for explaining an example of smart rendering editing.

FIG. 20 is a diagram for explaining an example of smart rendering editing.

FIG. 25 is a diagram for explaining an example of smart rendering editing.

FIG. 31 is a diagram for explaining an example of smart rendering editing.

MODES FOR CARRYING OUT THE INVENTION

Figure 3:
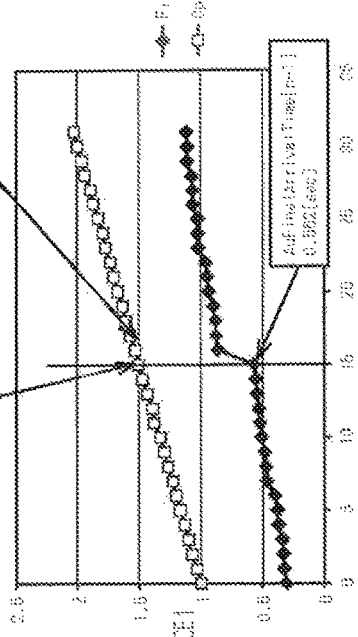
FIG. 3 is a diagram for explaining an example of a hypothetical reference decoder.

The following is a description of modes for carrying out the present disclosure (hereinafter referred to as the embodiments). Explanation will be made in the following order.

1. First Embodiment (Image Encoding Device)
2. Second Embodiment (Bitstream Concatenation Device)
3. Third Embodiment (Bitstream Concatenation Device)
4. Fourth Embodiment (Bitstream Concatenation Device)
5. Fifth Embodiment (Computer)
6. Sixth Embodiment (Example Applications)
7. Seventh Embodiment (Set, Unit, Module, and Processor)

1. First Embodiment

Smart Rendering Editing

In conventional editing of moving images, moving images are concatenated. Since the data size of moving image data is normally large in digital signal processing, moving image data is often encoded (compressed) before use. Examples of general encoding methods for image data include Moving Picture Experts Group (MPEG), Advanced Video Coding (AVC), and High Efficiency Video Coding (HEVC).

In a case where moving images are concatenated in the above described manner using moving image data encoded as above, one bitstream is generated from more than one bitstream. In such bitstream generation, each bitstream may be decoded and decompressed, and the bitstreams be then concatenated. The moving images after the concatenation may be encoded, to generate one bitstream. In that case, the processing load might become larger, as the data size of the bitstreams becomes larger.

In view of this, smart rendering editing has been developed as a technology for shortening the encoding time and preventing image quality degradation when moving image data encoded as above are clipped and edited with frame precision, as disclosed in Patent Document 1 and Patent Document 2.

In AVC and HEVC, the concept of a hypothetical reference decoder (HRD) is introduced so as to transmit bitstreams without any breaking. An encoder needs to generate bitstreams in such a manner as not to cause the hypothetical reference decoder to break. This also applies in encoding in the above described smart rendering editing.

In the smart rendering editing, however, the relationship between concatenated bitstreams is not taken into consideration in a case where a predetermined encoded section of a moving image is simply encoded. As a result, prevention of breaking of the hypothetical reference decoder cannot be guaranteed over the concatenated portions (in the entire bitstream after the concatenation). So as to correctly decode the bitstream after the concatenation, it is necessary to perform a troublesome operation such as appropriately rewriting the information related to the hypothetical reference decoder included in the bitstream.

FIG. 1 shows an example case where bitstreams formed by encoding image data according to AVC are concatenated. A in FIG. 1 shows an example of parameters (such as parameters related to the hypothetical reference decoder) about some of the frames (located near the connected portions) of the respective bitstreams (a stream A and a stream B) prior to concatenation. In the concatenation shown in FIG. 1, the start of the stream B is connected to the end of the stream A. B in FIG. 1 shows an example of parameters (such as parameters related to the hypothetical reference decoder) about some of the frames (located near the connected portions) of a stream A+B that is the bitstream after the concatenation.

Hereinafter, the stream A to be used in such concatenation will also be referred to as the bitstream (stream) to be concatenated, and the stream B will also be referred to as the concatenating bitstream (stream).

As shown in B in FIG. 1, in this example case, the CpbRemovalDelay at the start of the stream B as the concatenating bitstream needs to be "+1" greater than the CpbRemovalDelay at the end of the stream A as the bitstream to be concatenated. Therefore, the user has to check the CpbRemovalDelay at the end of the stream A, and update the CpbRemovalDelay at the start of the stream B, resulting in a troublesome operation.

Figure 2:
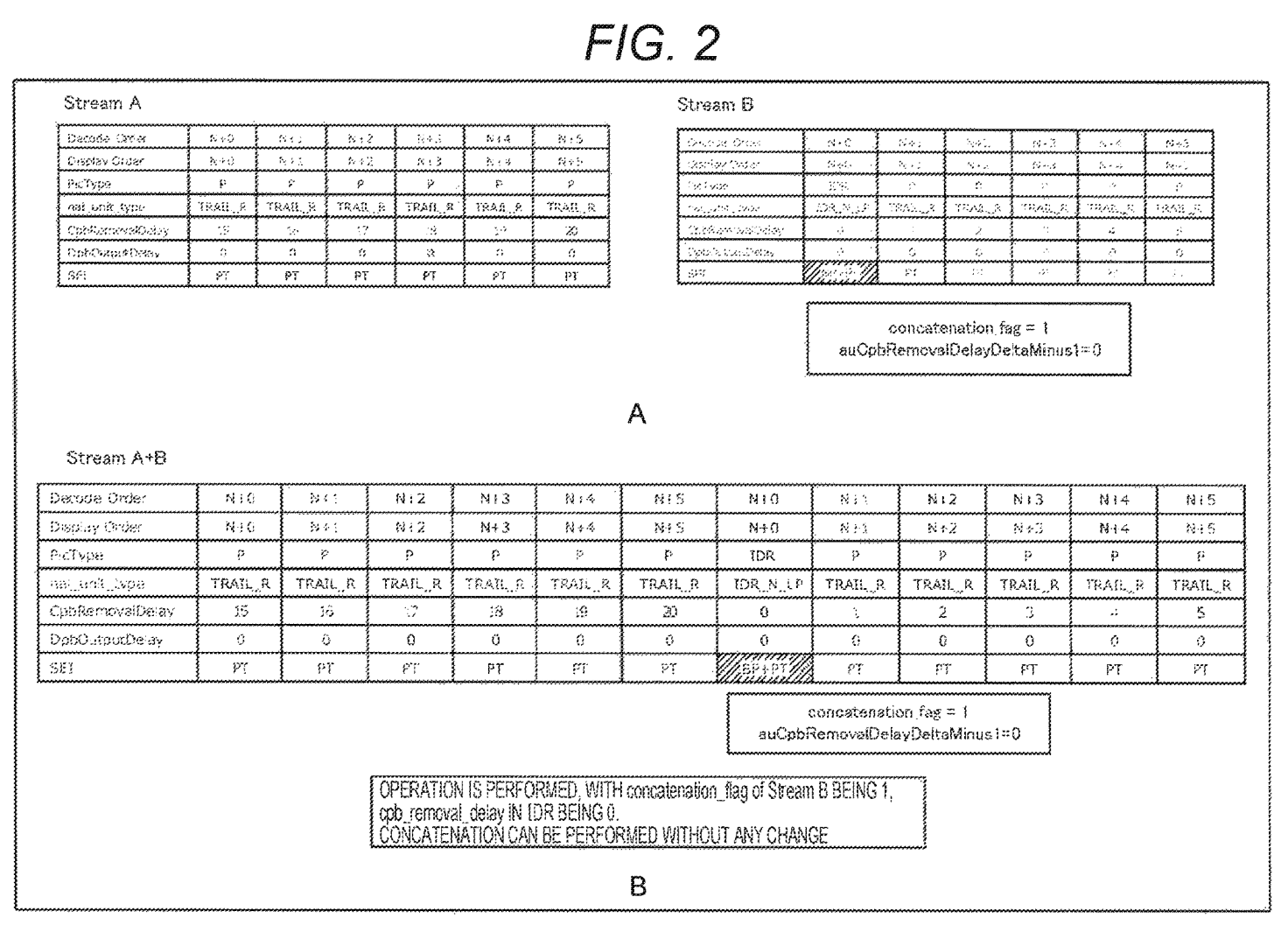

FIG. 2 shows an example case where bitstreams formed by encoding image data according to HEVC are concatenated. Like A in FIG. 1, A in FIG. 2 shows an example of parameters (such as parameters related to the hypothetical reference decoder) about some of the frames (located near the connected portions) of the respective bitstreams (a stream A and a stream B) prior to concatenation. The concatenation shown in FIG. 2 is conducted in the same manner as in FIG. 1. That is, the start of the stream B is connected to the end of the stream A. Like B in FIG. 1, B in FIG. 2 shows an example of parameters (such as parameters related to the hypothetical reference decoder) about some of the frames (located near the connected portions) of a stream A+B that is the bitstream after the concatenation.

As shown in FIG. 2, in HEVC, concatenation_flag is added to Buffering Period Supplemental Enhancement Information (SEI), so as to facilitate bitstream concatenation. In a case where the concatenation_flag is 1, the bitstreams have been concatenated, and the method of calculating AuNominalRemovalTime, which indicates the timing to remove Coded Picture Buffer (Cpb), is changed. At this point, the au_cpb_removaldelay_minus1 indicated by Picture Timing SEI is characteristically not used in the calculation.

In the case of HEVC bitstreams, the concatenation_flag is simply switched to 1, to generate a stream from two concatenated bitstreams without breaking in terms of HRD.

FIG. 3 shows an example of an actual method of calculating AuNominalRemovalTime in a case where the concatenation_flag is 1. As can be seen from this calculation, seamless concatenation is achieved without the use of the au_cpb_removal_delay_minus1 of the picture timing SEI.

As described above, in HEVC, there are cases where bitstreams can be easily concatenated with the use of the concatenation_flag. However, bitstreams are not always concatenated so easily.

FIG. 4 shows an example case where a reorder is generated so as to involve B-pictures in concatenation of bitstreams according to AVC. Like A in FIG. 1, A in FIG. 4 shows an example of parameters (such as parameters related to the hypothetical reference decoder) about some of the frames (located near the connected portions) of the respective bitstreams (a stream A and a stream B) prior to concatenation. Like B in FIG. 1, B in FIG. 4 shows an example of parameters (such as parameters related to the hypothetical reference decoder) about some of the frames (located near the connected portions) of a stream A+B that is the bitstream after the concatenation. In this case, bitstreams can be concatenated through the same process as that in FIG. 1.

Figure 5:
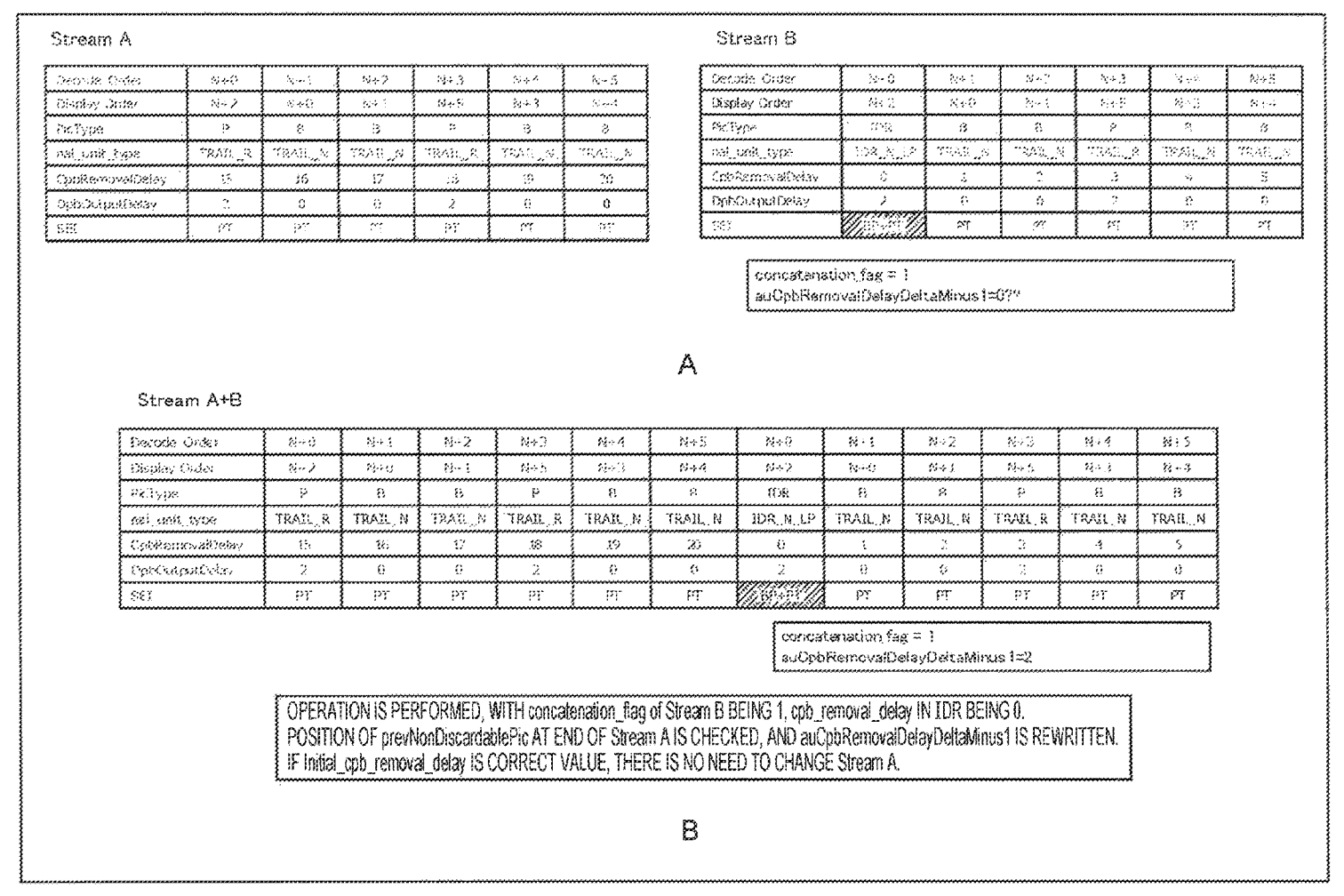

In a case where a reorder is generated so as to involve B-pictures in concatenation of bitstreams according to HEVC, on the other hand, the processing might become more complicated than that according to AVC. FIG. 5 shows an example in such a case. Like A in FIG. 2, A in FIG. 5 shows an example of parameters (such as parameters related to the hypothetical reference decoder) about some of the frames (located near the connected portions) of the respective bitstreams (a stream A and a stream B) prior to concatenation. Like B in FIG. 2, B in FIG. 5 shows an example of parameters (such as parameters related to the hypothetical reference decoder) about some of the frames (located near the connected portions) of a stream A+B that is the bitstream after the concatenation.

As shown in FIG. 5, in this example case, the concatenation_flag of the stream B, which is the concatenating bitstream, is set at 1, and cpb_removal_delay is set at 0 in the Instantaneous Decoding Refresh (IDR) picture. The user needs to check the position of the prevNonDiscardablePic at the end of the stream A, which is the bitstream to be concatenated, and rewrite the auCpbRemovalDelayDeltaMinus1 of the stream B. That is, a troublesome operation needs to be performed. In the example case shown in FIG. 5, the prevNonDiscardablePic at the end of the stream A is a (n+3) picture (the nal_unit_type being TRAIL_R), and therefore, the auCpbRemovalDelayDeltaMinus1 of the stream B is 2.

In view of this, the syntax is appropriately set prior to bitstream concatenation according to HEVC, so that bitstreams can be more easily concatenated.

<Image Encoding Device>

When image data is encoded, for example, header information related to the hypothetical reference decoder is set in accordance with information about the position of the current picture of the image data and information about the reference, and a bitstream containing the encoded data formed by encoding the image data and the header information set in the above manner is generated.

The header information means the information to be parsed (or referred to) before the data set in each of the hierarchical levels (sequence, picture, slice, tile, maximum encoding unit, encoding unit, and the like), or the information to be parsed (or referred to) independent of the data set in each hierarchical level. For example, the header information may be a video parameter set (VPS), a sequence parameter set (SPS), a picture parameter set (PPS), a slice header, a null unit type (nal_unit_type), Supplemental Enhancement Information (SEI), and the like. The header information includes not only information explicitly defined as the syntax of bitstreams, but also the information located at the start of each of the hierarchical levels.

Figure 6:
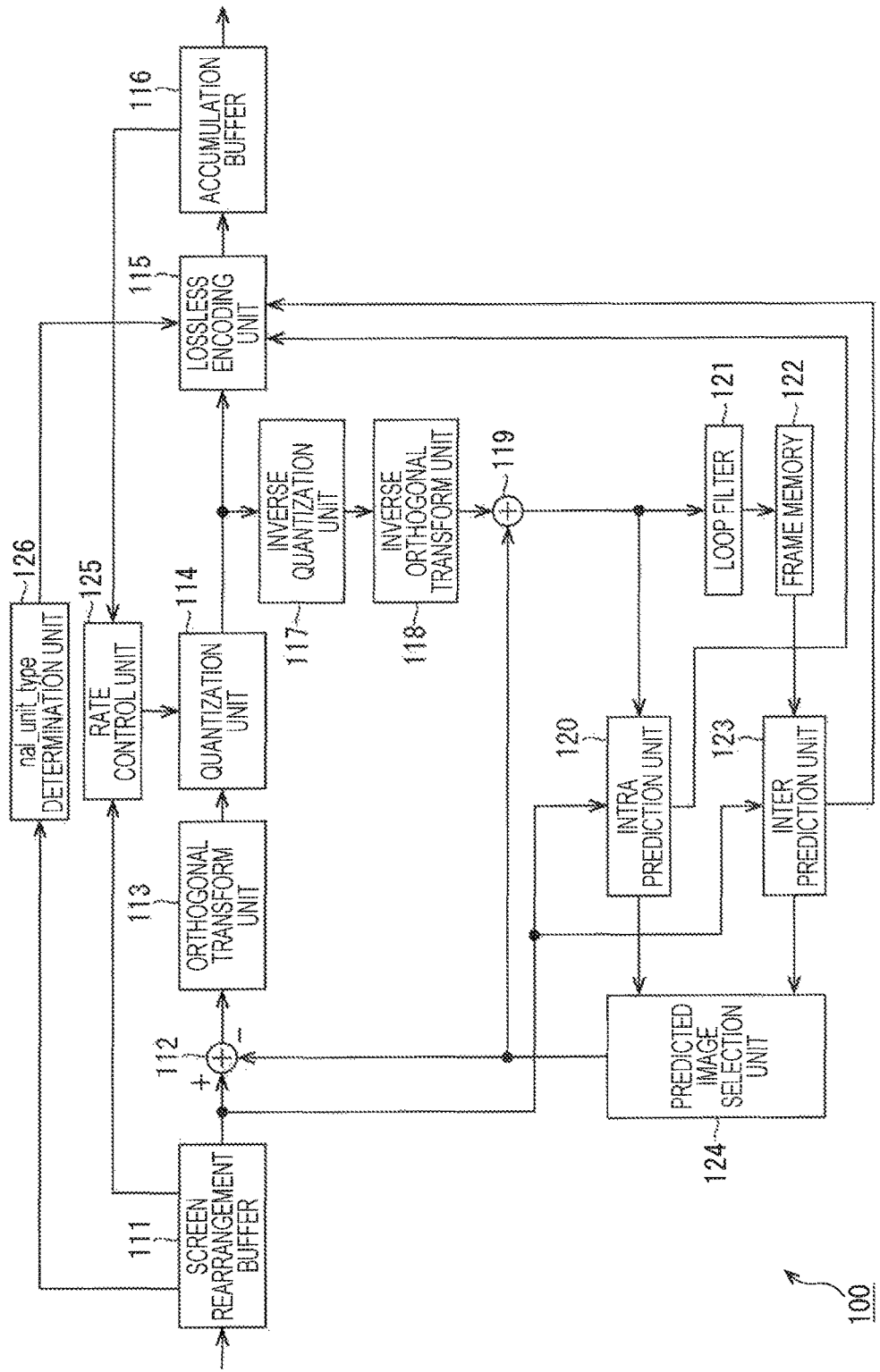
FIG. 6 is a block diagram showing a typical example structure of an image encoding device.

FIG. 6 is a block diagram showing an example structure of an image encoding device as an embodiment of an image processing device to which the present technology is applied. The image encoding device 100 shown in FIG. 6 encodes image data of moving images, using an HEVC prediction process, or a prediction process compliant with HEVC, for example.

The image encoding device 100 shown in FIG. 6 includes a screen rearrangement buffer 111, an arithmetic operation unit 112, an orthogonal transform unit 113, a quantization unit 114, a lossless encoding unit 115, an accumulation buffer 116, an inverse quantization unit 117, and an inverse orthogonal transform unit 118. The image encoding device 100 also includes an arithmetic operation unit 119, an intra prediction unit 120, a loop filter 121, a frame memory 122, an inter prediction unit 123, and a predicted image selection unit 124.

The image encoding device 100 further includes a rate control unit 125 and a nal_unit_type determination unit 126.

The screen rearrangement buffer 111 stores the images of the respective frames of input image data in the order of display, changes the order of display of the stored images of the frames to the order of encoding of the frames according to Group Of Picture (GOP), and supplies the images with the rearranged frame order to the arithmetic operation unit 112. The screen rearrangement buffer 111 also supplies the images having the rearranged frame order to the intra prediction unit 120 and the inter prediction unit 123.

The arithmetic operation unit 112 subtracts a predicted image supplied from the intra prediction unit 120 or the inter prediction unit 123 via the predicted image selection unit 124, from an image read from the screen rearrangement buffer 111, and supplies the difference information (residual data) to the orthogonal transform unit 113. When intra encoding is to be performed on an image, for example, the arithmetic operation unit 112 subtracts a predicted image supplied from the intra prediction unit 120, from an image read from the screen rearrangement buffer 111. When inter encoding is performed on an image, for example, the arithmetic operation unit 112 subtracts a predicted image supplied from the inter prediction unit 123, from an image read from the screen rearrangement buffer 111.

The orthogonal transform unit 113 performs an orthogonal transform, such as a discrete cosine transform or a Karhunen-Loeve transform, on the residual data supplied from the arithmetic operation unit 112. The orthogonal transform unit 113 supplies the transform coefficient obtained through the orthogonal transform, to the quantization unit 114.

The quantization unit 114 quantizes the transform coefficient supplied from the orthogonal transform unit 113. The quantization unit 114 sets quantization parameters in accordance with information about the target code amount value supplied from the rate control unit 125, and then performs the quantization. The quantization unit 114 supplies the quantized transform coefficient to the lossless encoding unit 115.

The lossless encoding unit 115 encodes the transform coefficient quantized by the quantization unit 114, using an appropriate encoding technique. The lossless encoding unit 115 also obtains information indicating an intra prediction mode and the like from the intra prediction unit 120, and obtains information indicating an inter prediction mode, information indicating difference motion vector information, and the like from the inter prediction unit 123. The lossless encoding unit 115 further obtains information such as the concatenation_flag and the nal_unit_type set at the nal_unit_type determination unit 126.

The lossless encoding unit 115 encodes those pieces of information by an appropriate encoding technique, to obtain part of the header information about the encoded data (also called an encoded stream). The lossless encoding unit 115 supplies the encoded data obtained by the encoding to the accumulation buffer 116, and accumulates the encoded data therein.

The encoding technique to be used by the lossless encoding unit 115 may be variable-length encoding or arithmetic encoding, for example. The variable-length encoding may be Context-Adaptive Variable Length Coding (CAVLC) specified in H.264/AVC, for example. The arithmetic encoding may be Context-Adaptive Binary Arithmetic Coding (CABAC), for example.

The accumulation buffer 116 temporarily holds the encoded data supplied from the lossless encoding unit 115. The accumulation buffer 116 outputs the encoded data held therein to the outside of the image encoding device 100 at a predetermined time. That is, the accumulation buffer 116 also serves as a transmission unit that transmits encoded data.

The transform coefficient quantized by the quantization unit 114 is also supplied to the inverse quantization unit 117. The inverse quantization unit 117 inversely quantizes the quantized transform coefficient by a method compatible with the quantization performed by the quantization unit 114. The inverse quantization unit 117 supplies the transform coefficient obtained through the inverse quantization, to the inverse orthogonal transform unit 118.

The inverse orthogonal transform unit 118 performs an inverse orthogonal transform on the supplied transform coefficient supplied from the inverse quantization unit 117, by a method compatible with the orthogonal transform process performed by the orthogonal transform unit 113. The inverse orthogonal transform unit 118 supplies the output subjected to the inverse orthogonal transform (the restored residual data) to the arithmetic operation unit 119.

The arithmetic operation unit 119 obtains a locally reconstructed image (hereinafter referred to as the reconstructed image) by adding the predicted image supplied from the intra prediction unit 120 or the inter prediction unit 123 via the predicted image selection unit 124 to the restored residual data supplied from the inverse orthogonal transform unit 118. The reconstructed image is supplied to the intra prediction unit 120 and the loop filter 121.

The intra prediction unit 120 performs intra prediction (in-screen prediction) to generate a predicted image, using the pixel value in the current picture that is the reconstructed image supplied as the reference image from the arithmetic operation unit 119. The intra prediction unit 120 performs the intra prediction in intra prediction modes prepared in advance.

The intra prediction unit 120 generates predicted images in all candidate intra prediction modes, evaluates the cost function values of the respective predicted images by using input images supplied from the screen rearrangement buffer 111, and selects an optimum mode. After selecting an optimum intra prediction mode, the intra prediction unit 120 supplies the predicted image generated in the optimum mode to the predicted image selection unit 124.

As described above, the intra prediction unit 120 also supplies intra prediction mode information indicating the adopted intra prediction mode and the like to the lossless encoding unit 115 as appropriate, so that the intra prediction mode information and the like are encoded.

The loop filter 121 includes a deblocking filter, an adaptive loop filter, and the like, and performs an appropriate filtering process on the reconstructed image supplied from the arithmetic operation unit 119. The loop filter 121 removes block distortion from the reconstructed image by performing a deblocking filtering process on the reconstructed image, for example. The loop filter 121 also improves image quality by performing a loop filtering process on a result of the deblocking filtering process (the reconstructed image from which block distortion has been removed), using a Wiener filter.

The loop filter 121 may also perform any other appropriate filtering process on the reconstructed image. The loop filter 121 may also supply the lossless encoding unit 115 with information as necessary, such as the filtering coefficient used in the filtering process, so that the information can be encoded.

The loop filter 121 supplies the frame memory 122 with a result of the filtering process (the result will be hereinafter referred to as the decoded image).

The loop filter 121 may also perform any other appropriate filtering process on the reconstructed image. The loop filter 121 may also supply the lossless encoding unit 115 with information as necessary, such as the filtering coefficient used in the filtering process, so that the information can be encoded.

The frame memory 122 stores the supplied decoded image, and supplies the stored decoded image as a reference image to the inter prediction unit 123 at a predetermined time.

The inter prediction unit 123 performs an inter prediction process, using input images supplied from the screen rearrangement buffer 111 and the reference image read from the frame memory 122. More specifically, the inter prediction unit 123 detects a motion vector by conducting motion prediction, and performs a motion compensation process in accordance with the motion vector, to generate a predicted image (inter-predicted image information).

The inter prediction unit 123 generates predicted images in all candidate inter prediction modes. The inter prediction unit 123 evaluates the cost function values of the respective predicted images by using input images supplied from the screen rearrangement buffer 111 and information about a generated difference motion vector and the like, and then selects an optimum mode. After selecting an optimum inter prediction mode, the inter prediction unit 123 supplies the predicted image generated in the optimum mode to the predicted image selection unit 124.

The inter prediction unit 123 supplies the lossless encoding unit 115 with the information necessary for performing processing in the adopted inter prediction mode in decoding the information indicating the adopted inter prediction mode and encoded data, so that the lossless encoding unit 115 can encode the information and the like. The necessary information includes the information about a generated difference motion vector, and predicted motion vector information that is a flag indicating the index of a predicted motion vector, for example.

The predicted image selection unit 124 selects the supplier of a predicted image to be supplied to the arithmetic operation unit 112 and the arithmetic operation unit 119. In the case of intra encoding, for example, the predicted image selection unit 124 selects the intra prediction unit 120 as the predicted image supplier, and supplies a predicted image supplied from the intra prediction unit 120 to the arithmetic operation unit 112 and the arithmetic operation unit 119. In the case of inter encoding, for example, the predicted image selection unit 124 selects the inter prediction unit 123 as the predicted image supplier, and supplies a predicted image supplied from the inter prediction unit 123 to the arithmetic operation unit 112 and the arithmetic operation unit 119.

In accordance with the code amount of the encoded data accumulated in the accumulation buffer 116, the rate control unit 125 controls the quantization operation rate of the quantization unit 114 so as not to cause an overflow or underflow.

The nal_unit_type determination unit 126 obtains, from the screen rearrangement buffer 111, information (isFirstPicture) indicating whether the current picture is the first picture of a stream, information (isLastPicture) indicating whether the current picture is the last picture of a stream, and information (isReferencePicture) indicating whether the current picture is to be referred to (whether the current picture is the reference picture).

The nal_unit_type determination unit 126 sets information (concatenation_flag) indicating bitstream concatenation, information (auCpbRemovalDelayMinus1) indicating a difference between the position of the access unit at the end of the bitstream and the position of the previous non-discardable picture, and information (nal_unit_type) indicating the null unit type.

More specifically, in a case where the current picture is the first picture of a stream, for example, the nal_unit_type determination unit 126 sets the concatenation_flag at "1 (or true)", sets the auCpbRemovalDelayMinus1 at "0 (or the minimum value)", and sets the nal_unit_type at IDR_W_RADL or IDR_N_LP (or a value indicating an IDR picture).

In a case where the current picture is not the first picture but the last picture of a stream, for example, the nal_unit_type determination unit 126 sets the concatenation_flag at "0 (or false)", sets the auCpbRemovalDelayMinus1 at "0 (or the minimum value)", and sets the nal_unit_type at TRAIL_R (or a value indicating a trailing picture that is not of a temporal sublayer and is to be referred to).

Further, in a case where the current picture is neither the first picture nor the last picture of a stream, but is the reference picture, for example, the nal_unit_type determination unit 126 sets the concatenation_flag at "0 (or false)", sets the auCpbRemovalDelayMinus1 at "0 (or the minimum value)", and sets the nal_unit_type at TRAIL_R (or a value indicating a trailing picture that is not of a temporal sublayer and is to be referred to).

In a case where the current picture is neither the first picture nor the last picture of a stream, and is not the reference picture, either, for example, the nal_unit_type determination unit 126 sets the concatenation_flag at "0 (or false)", sets the auCpbRemovalDelayMinus1 at "0 (or the minimum value)", and sets the nal_unit_type at TRAIL_N (or a value indicating a non-reference picture that is not of a temporal sublayer).

The nal_unit_type determination unit 126 supplies the above set pieces of information (the concatenation_flag, the auCpbRemovalDelayMinus1, the nal_unit_type, and the like) to the lossless encoding unit 115, so that those pieces of information are included in a bitstream to be generated at the lossless encoding unit 115.

<Rate Control Unit>

Figure 7:
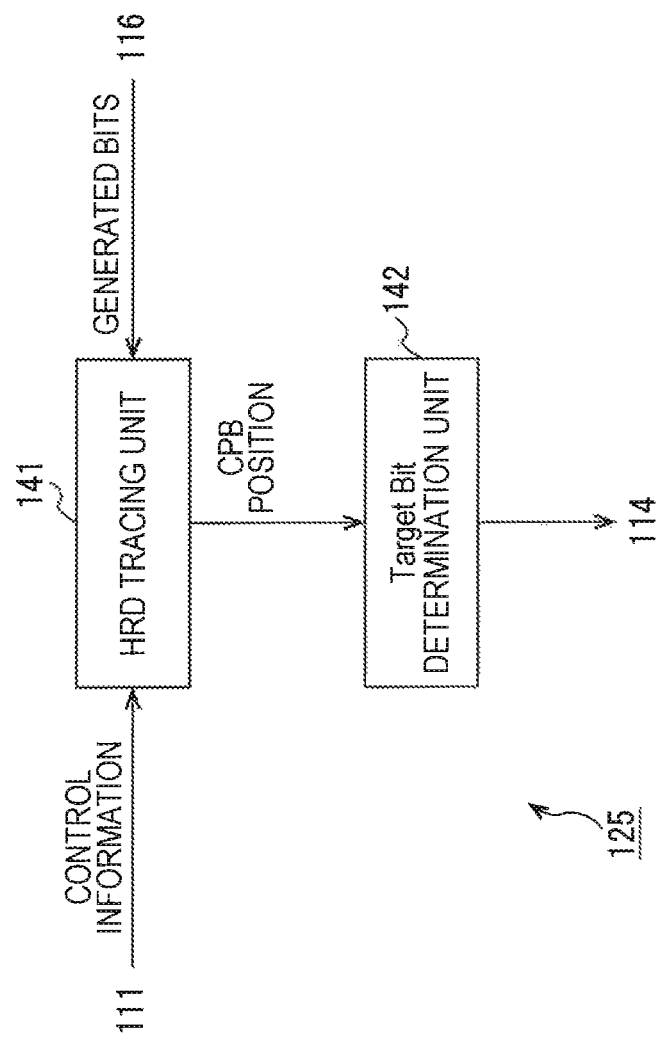
FIG. 7 is a block diagram showing a typical example structure of a rate control unit.

FIG. 7 is a block diagram showing a typical example structure of the rate control unit 125. As shown in FIG. 7, the rate control unit 125 includes an HRD tracing unit 141, and a Target Bit determination unit 142.

Figure 8:
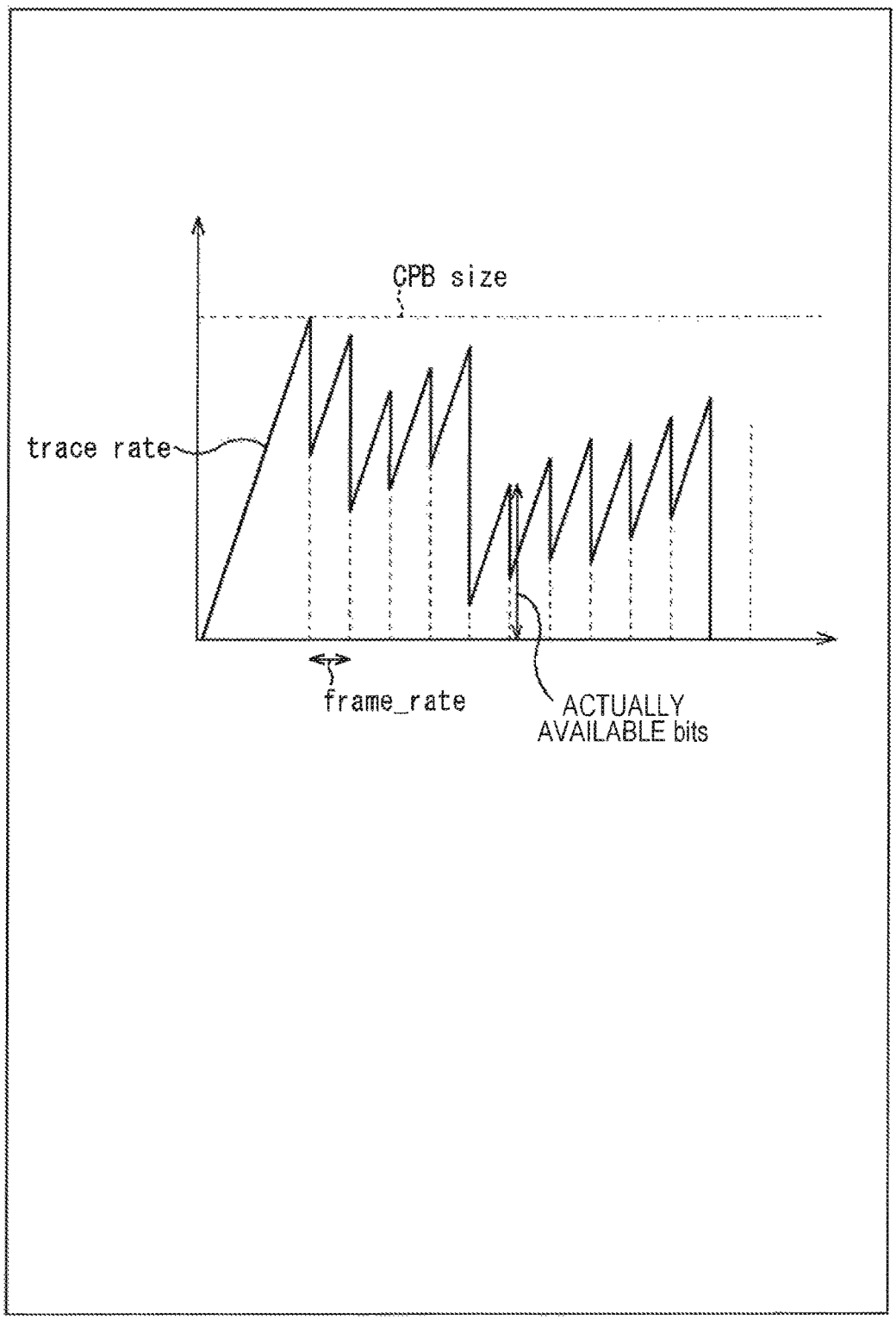
FIG. 8 is a graph for explaining parameters related to the hypothetical reference decoder.

The HRD tracing unit 141 obtains, from the screen rearrangement buffer 111, information about the position of the current picture, and information indicating whether the current section is a section for adjusting the hypothetical reference decoder. More specifically, the HRD tracing unit 141 obtains the information about the position of the current picture, such as the information (isLastPicture) indicating whether the current picture is the last picture of a stream. The HRD tracing unit 141 also obtains the information indicating whether the current section is a section for adjusting the hypothetical reference decoder, such as the trace rate (trace_rate), the frame rate (frame_rate), the CPB size (cpb_size), and the like of the coded picture buffer (CPB). These parameters are information related to the coded picture buffer (CPB), as shown in FIG. 8. The HRD tracing unit 141 also obtains information indicating the generated code amount (the generated bits) from the accumulation buffer 116.

In accordance with the control information related to the hypothetical reference decoder (HRD) and the generated code amount, the HRD tracing unit 141 calculates information (cpb_pos) indicating the position of the coded picture buffer (CPB). The HRD tracing unit 141 supplies the calculated information (cpb_pos) indicating the CPB position to the Target Bit determination unit 142.

The Target Bit determination unit 142 obtains the information (cpb_pos) indicating the CPB position from the HRD tracing unit 141. The Target Bit determination unit 142 also obtains, from the screen rearrangement buffer 111 via the HRD tracing unit 141, information (target_cpb_pos) indicating the CPB position expected at the end, and information (isAdjustPeriod) indicating whether the current period is a period for adjusting the end of the CPB.

In accordance with those pieces of information, the Target Bit determination unit 142 calculates a target bit that is information indicating the target value for the generated code amount. The Target Bit determination unit 142 supplies the calculated target bit to the quantization unit 114.

In the above described manner, the image encoding device 100 sets the respective parameters, to generate bitstreams that satisfy the conditions described below.

The nal_unit_type at the end of the bitstream to be concatenated satisfies the conditions (such as TRAIL_R) for the prevNonDiscardablePic.

The position of the cpb at the end of the bitstream to be concatenated is higher than the position of the cpb at the start of the concatenating bitstream. In terms of syntax, the value of the initial_cpb_removal_delay is high.

The start of the concatenating bitstream is the concatenation_flag=1.

The auCpbRemovalDelayDeltaMinus1 at the start of the concatenating bitstream is appropriately set (auCpbRemovalDelayDeltaMinus1=0, for example).

As those conditions are satisfied, a bitstream and another bitstream can be concatenated in a simple manner. Even if the user does not appropriately rewrite the hypothetical reference decoder information included in each bitstream, those bitstreams can be concatenated so that the bitstream obtained as a result of the concatenation will not break the hypothetical reference decoder. That is, the image encoding device 100 performs encoding by taking the later concatenation into consideration. Thus, the image encoding device 100 can generate a bitstream in such a state as to be readily concatenated with another bitstream.

<Flow in the Encoding Process>

Next, an example flow in each process to be performed by the image encoding device 100 is described. Referring first to the flowchart shown in FIG. 9, an example flow in an encoding process is described.

When an encoding process is started, the screen rearrangement buffer 111 in step S101 stores images of the respective frames (pictures) of an input moving image in the order of display, and changes the order of display of the respective pictures to the order of encoding of the respective pictures.

In step S102, the screen rearrangement buffer 111 generates various kinds of header information, such as a video parameter set (VPS), a sequence parameter set (SPS), a picture parameter set (PPS), a slice header, and SEI.

In step S103, the intra prediction unit 120 performs an intra prediction process, to generate a predicted image. In step S104, the inter prediction unit 123 performs an inter prediction process, to generate a predicted image.

In step S105, the predicted image selection unit 124 selects the predicted image generated through the intra prediction process in step S103 or the predicted image generated through the inter prediction process in step S104, in accordance with cost function values and the like.

In step S106, the arithmetic operation unit 112 calculates a difference between the input image having the frame order rearranged through the process in step S101 and the predicted image selected through the process in step S105. That is, the arithmetic operation unit 112 generates residual data between the input image and the predicted image. The residual data calculated in this manner has a smaller data amount than that of the original image data. Accordingly, the data amount can be made smaller than in a case where images are directly encoded.

In step S107, the orthogonal transform unit 113 performs an orthogonal transform on the residual data generated through the process in step S106.

In step S108, the quantization unit 114 quantizes the orthogonal transform coefficient obtained through the process in step S107.

In step S109, the inverse quantization unit 117 inversely quantizes the coefficient (also referred to as the quantized coefficient) quantized and generated through the process in step S108, using properties compatible with the properties of the quantization.

In step S110, the inverse orthogonal transform unit 118 performs an inverse orthogonal transform on the orthogonal transform coefficient obtained through the process in step S109.

In step S111, the arithmetic operation unit 119 adds the predicted image selected through the process in step S105 to the residual data restored through the process in step S110, to generate the image data of a reconstructed image.

In step S112, the loop filter 121 performs a loop filtering process on the image data of the reconstructed image generated through the process in step S111.

Consequently, block distortion and the like are removed from the reconstructed image.

In step S113, the frame memory 122 stores the decoded image data obtained through the process in step S112.

In step S114, the nal_unit_type determination unit 126 performs a null unit type (nal_unit_type) determination process, to set information (concatenation_flag) indicating bitstream concatenation, information (auCpbRemovalDelayMinus1) indicating a difference between the position of the access unit at the end of the bitstream and the position of the previous non-discardable picture, and information (nal_unit_type) indicating the null unit type.

In step S115, the lossless encoding unit 115 encodes the quantized coefficient obtained through the process in step S108. That is, lossless encoding such as variable-length encoding or arithmetic encoding is performed on the data corresponding to the residual data.

The lossless encoding unit 115 also encodes the information about the prediction mode of the predicted image selected through the process in step S105, and adds the encoded information to the encoded data obtained by encoding the difference image. That is, the lossless encoding unit 115 also encodes optimum intra prediction mode information supplied from the intra prediction unit 120 or optimum inter prediction mode information supplied from the inter prediction unit 123, and adds the encoded information to the encoded data (to be included in the bitstream).

The lossless encoding unit 115 further encodes the information (concatenation_flag) indicating bitstream concatenation, the information (auCpbRemovalDelayMinus1) indicating a difference between the position of the access unit at the end of the bitstream and the position of the previous non-discardable picture, and the information (nal_unit_type) indicating the null unit type, which are set in step S114, and adds the encoded information to the encoded data (to be included in the bitstream).

In step S116, the accumulation buffer 116 stores the encoded data and the like obtained through the process in step S115. The encoded data and the like accumulated in the accumulation buffer 116 are read as a bitstream where appropriate, and are transmitted to the decoding side via a transmission path or a recording medium.

In step S117, in accordance with the code amount (the generated code amount) of the encoded data accumulated in the accumulation buffer 116 through the process in step S116, the rate control unit 125 controls the quantization operation rate of the quantization unit 114 so as not to cause an overflow or underflow. The rate control unit 125 also supplies information about the quantization parameters to the quantization unit 114.

When the process in step S117 is completed, the encoding process comes to an end.

<Flow in the Null Unit Type Determination Process>

Figure 9:
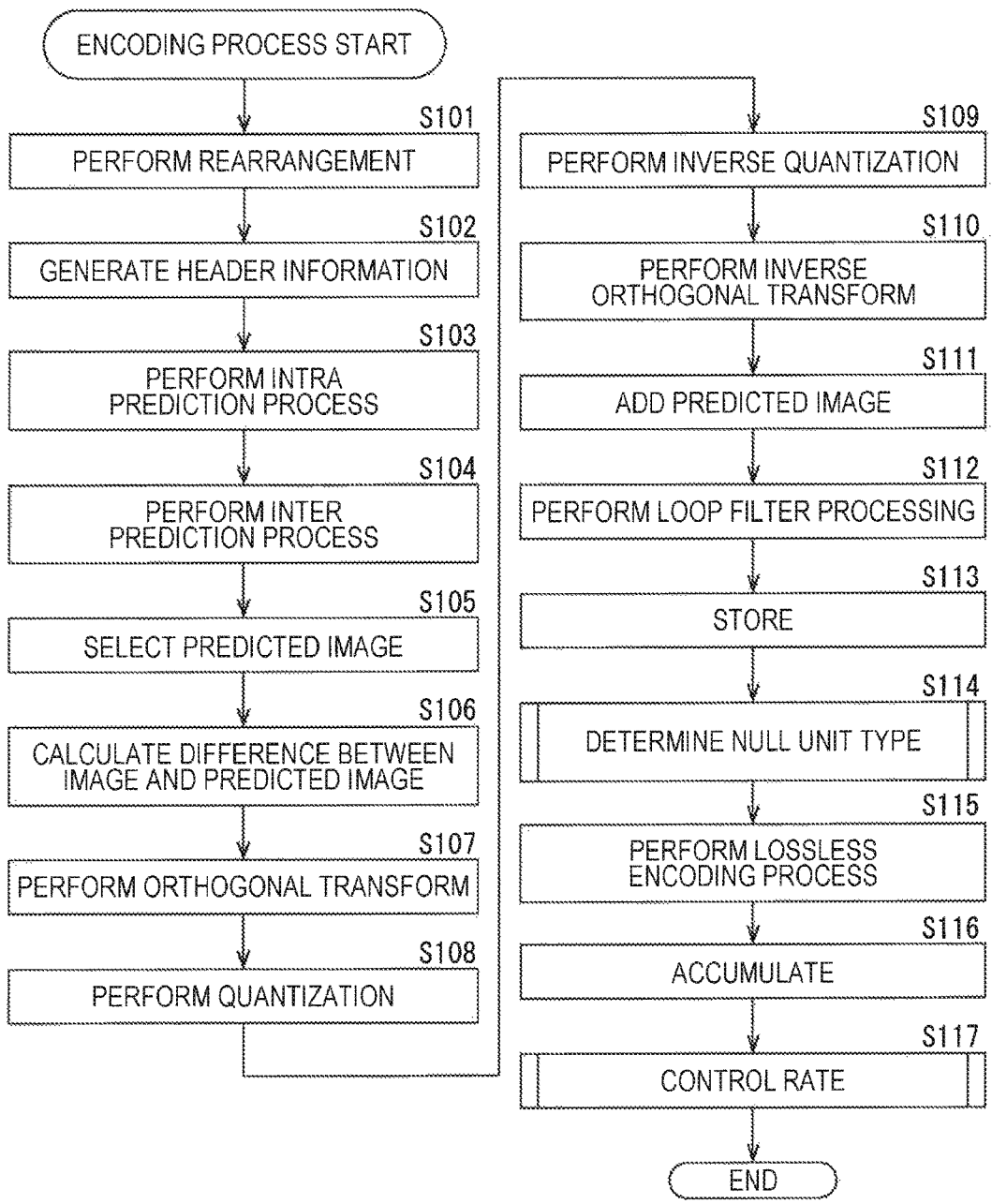
FIG. 9 is a flowchart for explaining an example flow in an encoding process.
Figure 10:
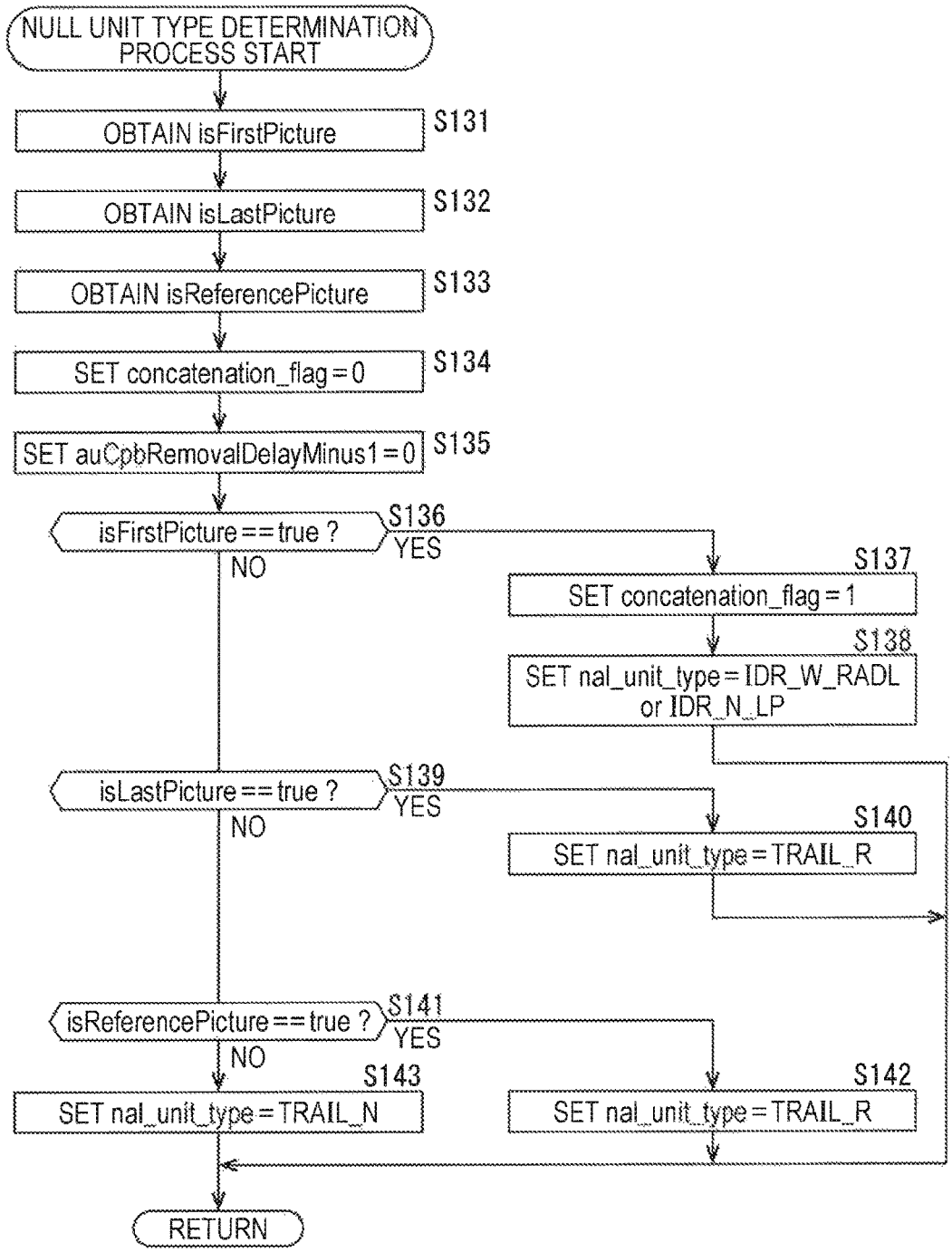
FIG. 10 is a flowchart for explaining an example flow in a null unit type determination process.

Referring now to the flowchart shown in FIG. 10, an example flow in the null unit type determination process to be performed in step S114 in FIG. 9 is described.

When the null unit type determination process is started, the nal_unit_type determination unit 126 in step S131 obtains the isFirstPicture from the header information generated in step S102. In step S132, the nal_unit_type determination unit 126 obtains the isLastPicture from the header information generated in step S102. In step S133, the nal_unit_type determination unit 126 obtains the isReferencePicture from the header information generated in step S102.

In step S134, the nal_unit_type determination unit 126 sets the concatenation_flag at "0 (false)". In step S135, the nal_unit_type determination unit 126 sets the auCpbRemovalDelayMinus1 at "0 (minimum value)".

In step S136, the nal_unit_type determination unit 126 determines whether the value of the isFirstPicture is true. If the value of the isFirstPicture is determined to be true, or if the current picture is determined to be the first picture of a stream, the process moves on to step S137.

In step S137, the nal_unit_type determination unit 126 sets the concatenation_flag at "1 (true)". In step S138, the nal_unit_type determination unit 126 also sets the null unit type (nal_unit_type) of the current picture at IDR_W_RADL or IDR_N_LP (a value indicating an IDR picture). When the process in step S138 is completed, the null unit type determination process comes to an end, and the process returns to FIG. 9.

If the value of the isFirstPicture is determined to be false in step S136, and the current picture is determined not to be the first picture of a stream, the process moves on to step S139.

In step S139, the nal_unit_type determination unit 126 determines whether the value of the isLastPicture is true. If the value of the isLastPicture is determined to be true, or if the current picture is determined to be the last picture of a stream, the process moves on to step S140.

In step S140, the nal_unit_type determination unit 126 sets the null unit type (nal_unit_type) of the current picture at TRAIL_R (or a value indicating a trailing picture that is not of a temporal sublayer and is to be referred to). When the process in step S140 is completed, the null unit type determination process comes to an end, and the process returns to FIG. 9.

If the value of the isLastPicture is determined to be false in step S139, and the current picture is determined not to be the last picture of a stream, the process moves on to step S141.

In step S141, the nal_unit_type determination unit 126 determines whether the value of the isReferencePicture is true. If the value of the isReferencePicture is determined to be true, or if the current picture is determined to be the reference picture, the process moves on to step S142.

In step S142, the nal_unit_type determination unit 126 sets the null unit type (nal_unit_type) of the current picture at TRAIL_R (or a value indicating a trailing picture that is not of a temporal sublayer and is to be referred to). When the process in step S142 is completed, the null unit type determination process comes to an end, and the process returns to FIG. 9.

If the value of the isReferencePicture is determined to be false in step S141, and the current picture is determined not to be the reference picture, the process moves on to step S143.

In step S143, the nal_unit_type determination unit 126 sets the null unit type (nal_unit_type) of the current picture at TRAIL_N (or a value indicating a non-reference picture that is not of a temporal sublayer). When the process in step S143 is completed, the null unit type determination process comes to an end, and the process returns to FIG. 9.

<Flow in the Rate Control Process>

Figure 11:
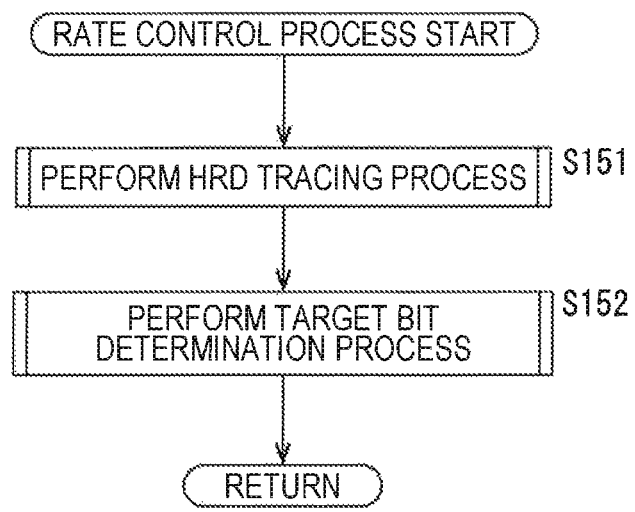
FIG. 11 is a flowchart for explaining an example flow in a rate control process.

Referring now to the flowchart shown in FIG. 11, an example flow in the rate control process to be performed in step S117 in FIG. 9 is described.

When the rate control process is started, the HRD tracing unit 141 in step S151 performs an HRD tracing process, to calculate the CPB position. In step S152, the Target Bit determination unit 142 performs a target bit determination process, to calculate the target bit.

When the process in step S152 is completed, the rate control process comes to an end, and the process returns to FIG. 9.

<Flow in the HRD Tracing Process>

Figure 12:
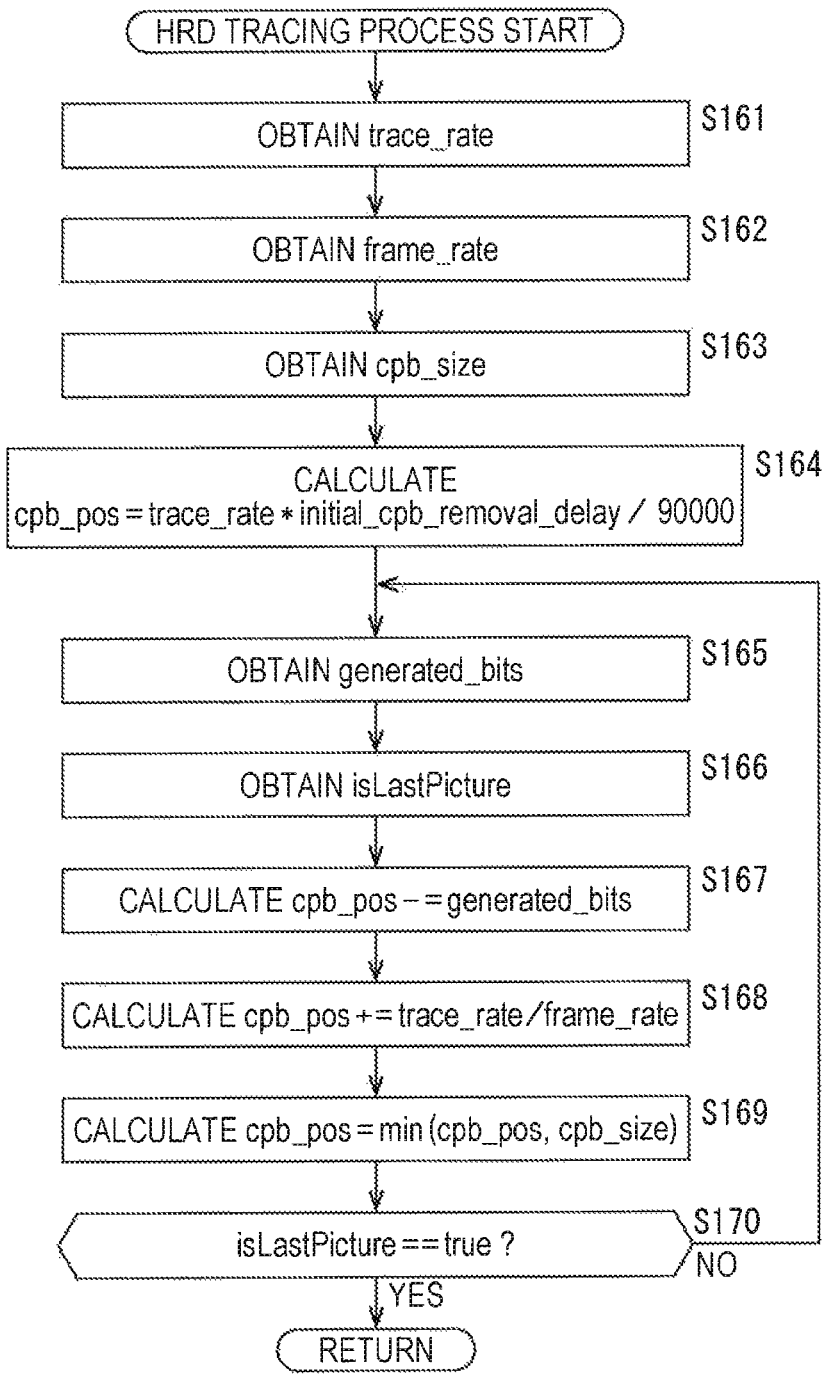
FIG. 12 is a flowchart for explaining an example flow in an HRD tracing process.

Referring now to the flowchart shown in FIG. 12, an example flow in the HRD tracing process to be performed in step S151 in FIG. 11 is described.

When the HRD tracing process is started, the HRD tracing unit 141 in step S161 obtains trace_rate from the header information generated in step S102. In step S162, the HRD tracing unit 141 obtains frame_rate from the header information generated in step S102. In step S163, the HRD tracing unit 141 obtains cpb_size from the header information generated in step S102.

In step S164, using the trace_rate and the initial removal delay of the coded picture buffer (CPB) (the period of time from the start of the bitstream input to the CBP till the time of removal of the first access unit (AU)), the HRD tracing unit 141 initializes the CPB position according to the expression (1) shown below.

$$cpb\_pos = trace\_rate * initial\_cpb\_removal\_delay / 90000 \quad (1)$$

In step S165, the HRD tracing unit 141 obtains the amount of codes (generated_bits) generated in each image. In step S166, the HRD tracing unit 141 obtains the isLastPicture from the header information generated in step S102.

In step S167, using the generated_bits obtained in step S165, the HRD tracing unit 141 updates the CPB position (cpb_pos) (or subtracts the amount equivalent to the removal) according to the expression (2) shown below.

$$cpb\_pos -= generated\_bits \quad (2)$$

In step S168, using the trace_rate and the frame_rate, the HRD tracing unit 141 updates the CPB position (cpb_pos) (or adds the amount equivalent to the increase in the buffer) according to the expression (3) shown below.

$$cpb\_pos += trace\_rate / frame\_rate \quad (3)$$

In step S169, using the cpb_size, the HRD tracing unit 141 performs a clipping process according to the expression (4) shown below.

$$cpb\_pos = \min(cpb\_pos, cpb\_size) \quad (4)$$

In step S170, the HRD tracing unit 141 determines whether the isLastPicture is true. If the isLastPicture is determined to be false, and the current picture is determined not to be the last picture of a stream, the process returns to step S165, and the steps thereafter are repeated. That is, the processing in steps S165 through S170 is performed on each picture.

If the isLastPicture is determined to be true in step S170, and the current picture is determined to be the last picture of a stream, the HRD tracing process comes to an end, and the process returns to FIG. 11.

<Flow in the Target Bit Determination Process>

Figure 13:
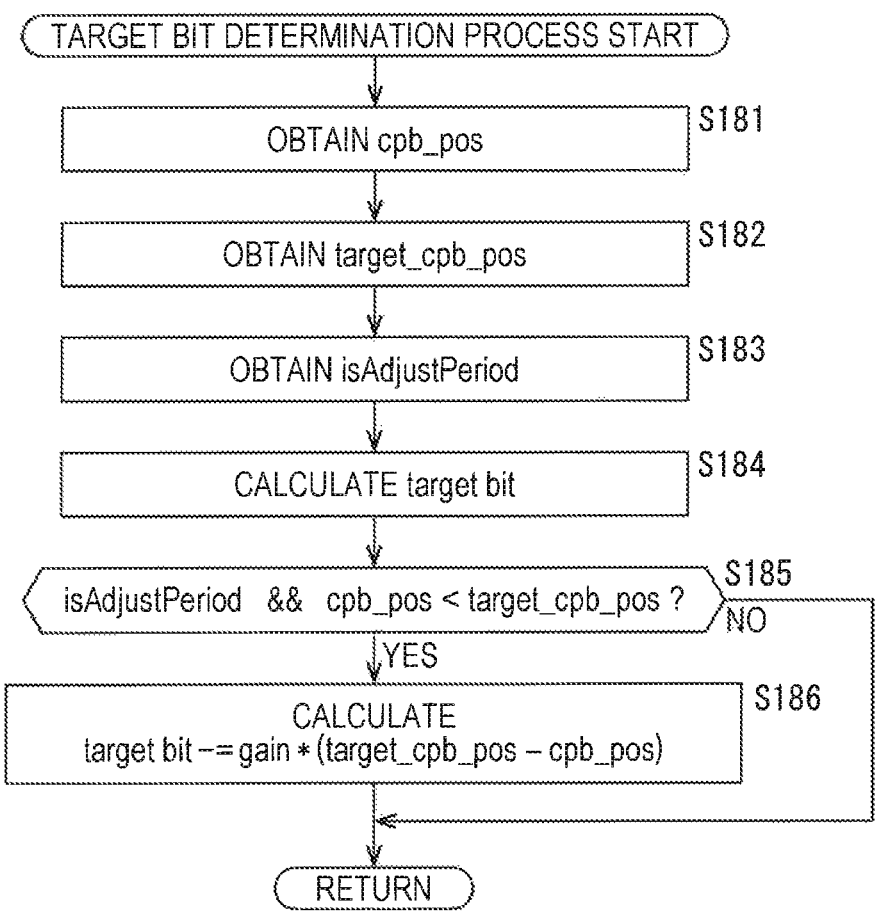
FIG. 13 is a flowchart for explaining an example flow in a target bit determination process.

Referring now to the flowchart in FIG. 13, an example flow in the target bit determination process to be performed in step S152 in FIG. 11 is described.

When the target bit determination process is started, the Target Bit determination unit 142 in step S181 obtains the information (cpb_pos) indicating the CPB position calculated in the HRD tracing process (FIG. 12). In step S182, the Target Bit determination unit 142 also obtains the information (target_cpb_pos) indicating the CPB position expected at the end, from the header information generated in step S102. In step S183, the Target Bit determination unit 142 further obtains the information (isAdjustPeriod) indicating whether the current period is a period for adjusting the end of the CPB, from the header information generated in step S102.

In step S184, the Target Bit determination unit 142 calculates a target bit that is the information indicating the target value for the generated code amount. This target bit may be calculated by any appropriate method.

In step S185, the Target Bit determination unit 142 determines whether the isAdjustPeriod is true, and whether the cpb_pos indicates a lower position than the target_cpb_pos (isAdjustPeriod && cpb_pos<target_cpb_pos).

If the isAdjustPeriod is determined to be true, and the cpb_pos indicates a lower position than the target_cpb_pos, the process moves on to step S186.

In step S186, the Target Bit determination unit 142 calculates the target bit according to the expression (5) shown below, to make the CPB fall in the position expected at the end.

$$\text{target bit} -= \text{gain} * (\text{target\_cpb\_pos\_cpb\_pos}) \quad (5)$$

Here, the value of the gain preferably becomes greater toward the end of the image. The target bit calculated at this point is supplied to the quantization unit 114, and is then used. That is, the quantization unit 114 performs quantization, using this target bit. When the process in step S186 is completed, the target bit determination process comes to an end, and the process returns to FIG. 11.

If the isAdjustPeriod is determined to be false in step S185, or if the cpb_pos indicates a higher position than the target_cpb_pos (cpb_pos≥target_cpb_pos), the process in step S186 is skipped, and the target bit determination process comes to an end. The process then returns to FIG. 11.

<Bitstream Concatenation>

Figure 14:
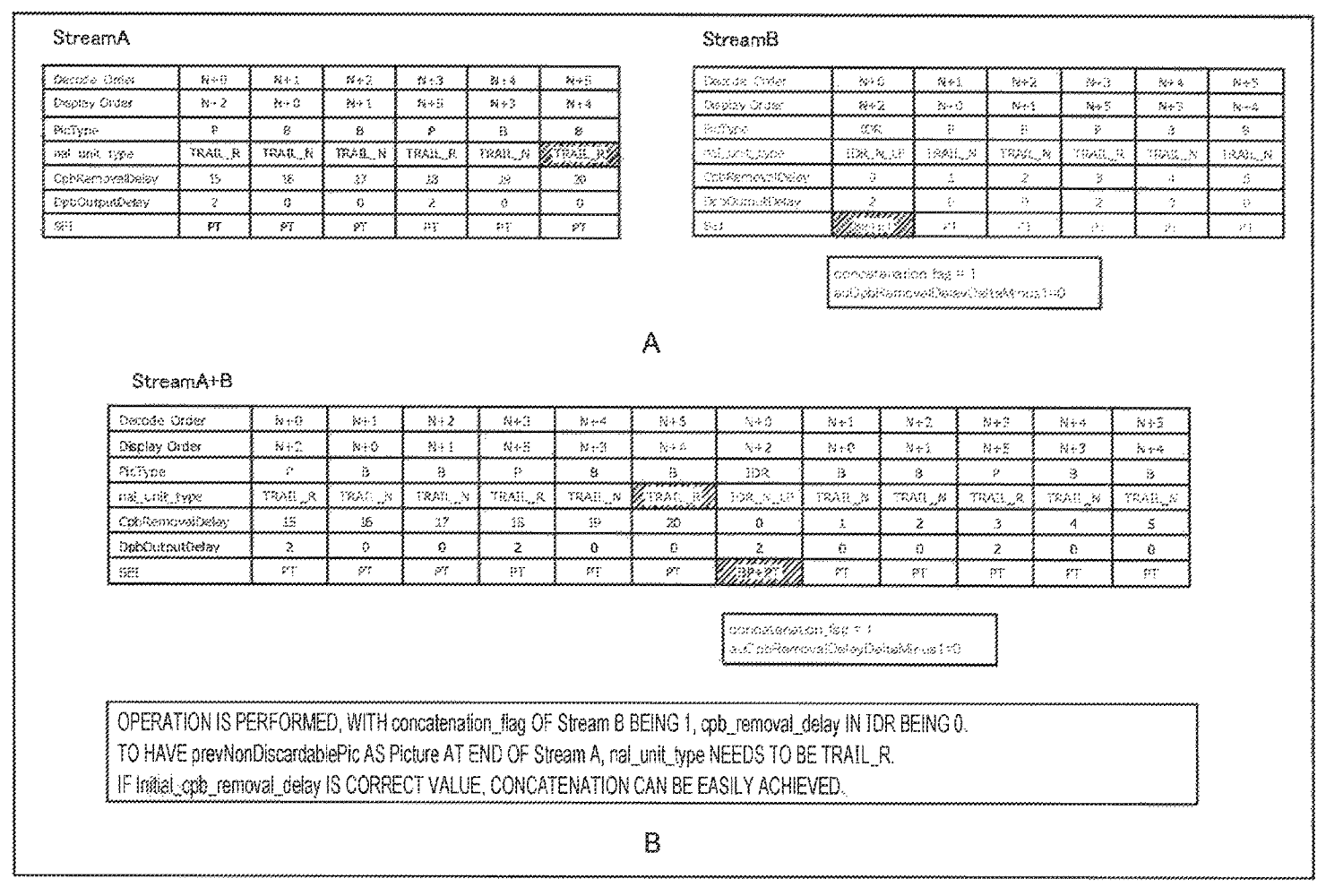

FIG. 14 shows an example case where bitstreams generated by the image encoding device 100 that performs the processes described above are concatenated. A in FIG. 14 shows an example of parameters (such as parameters related to the hypothetical reference decoder) about some of the frames (located near the connected portions) of the respective bitstreams (a stream A and a stream B) prior to concatenation. In the concatenation shown in FIG. 14, the start of the stream B is connected to the end of the stream A. B in FIG. 14 shows an example of parameters (such as parameters related to the hypothetical reference decoder) about some of the frames (located near the connected portions) of a stream A+B that is the bitstream after the concatenation.

As shown in FIG. 14, operation is performed, with the concatenation_flag being 1 in the stream B, the cpb_removal_delay being 0 in the IDR in this case. The nal_unit_type of the last picture of the stream A is set at TRAIL_R, so that the prevNonDiscardablePic becomes the picture at the end of the stream A. With this, bitstreams can be connected in a simple manner, as long as the Initial_cpb_removal_delay is a correct value. That is, by performing the respective processes described above, the image encoding device 100 can generate a bitstream in such a state as to be readily concatenated with another bitstream.

2. Second Embodiment

Bitstream Concatenation Device

In the above described embodiment, when a bitstream is generated by encoding image data, the bitstream is put into such a state as to be readily concatenated with another bitstream. However, at any time before bitstream concatenation, a bitstream can be put into such a state as to be readily concatenated with another bitstream.

Figure 15:
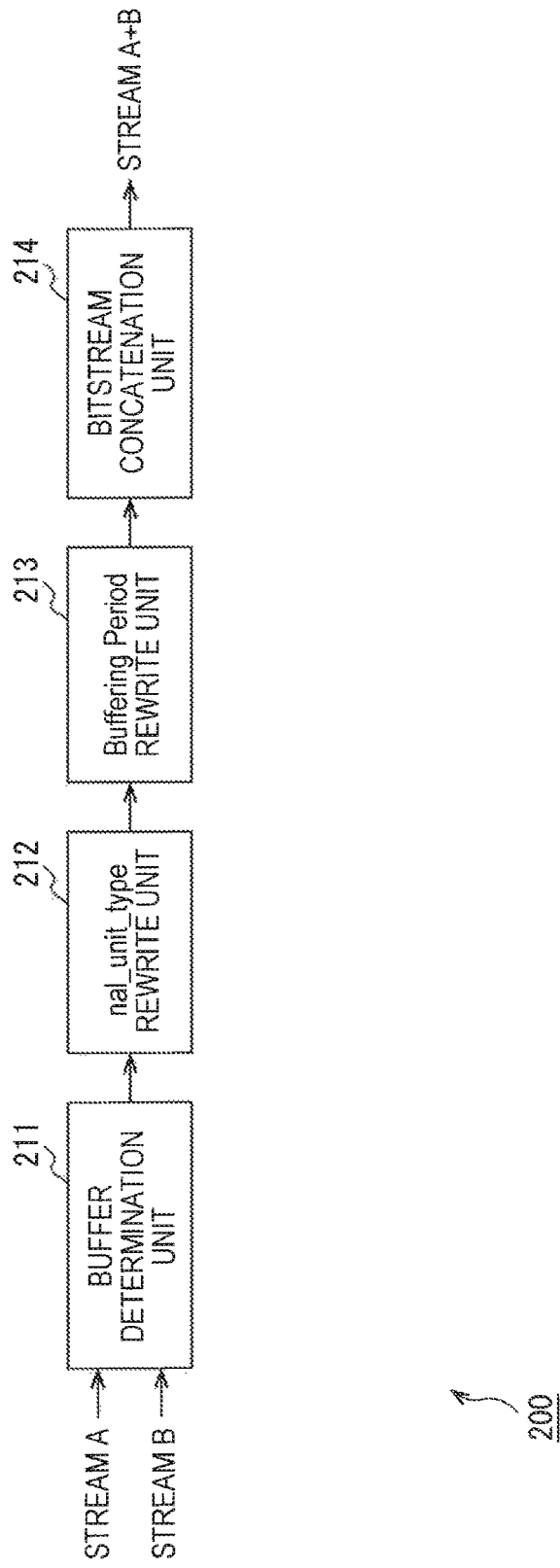
FIG. 15 is a block diagram showing a typical example structure of a bitstream concatenation device.

For example, such an operation may be performed immediately before bitstream concatenation. The following is a description of an example of such an operation. FIG. 15 is a diagram showing a typical example structure of a bitstream concatenation device. The bitstream concatenation device 200 shown in FIG. 15 is a device that performs a process to concatenate bitstreams by smart rendering editing. For example, the bitstream concatenation device 200 receives inputs of a stream A and a stream B, generates a stream A+B by connecting the start of the stream B to the end of the stream A, and outputs the stream A+B.

As shown in FIG. 15, the bitstream concatenation device 200 includes a buffer determination unit 211, a nal_unit_type rewrite unit 212, a Buffering Period rewrite unit 213, and a bitstream concatenation unit 214.

The buffer determination unit 211 performs a buffer determination process, and performs re-encoding as appropriate so that the CPB will not break in the stream A+B. The nal_unit_type rewrite unit 212 rewrites the nal_unit_type at the end of the stream A as the value corresponding to prevNonDiscardablePic. The Buffering Period rewrite unit 213 rewrites the syntax of Buffering Period SEI. For example, the Buffering Period rewrite unit 213 rewrites the concatenation_flag at the start of the stream B as "1 (true)", and rewrites the auCpbRemovalDelayMinus1 at the start of the stream B as "0 (minimum value)". The bitstream concatenation unit 214 concatenates bitstreams (such as the stream A and the stream B) having the respective pieces of the hypothetical reference decoder information updated as above.

By doing so, the bitstream concatenation device 200 sets the respective parameters prior to concatenation, to generate bitstreams that satisfy the conditions described below.

The nal_unit_type at the end of the bitstream to be concatenated satisfies the conditions (such as TRAIL_R) for the prevNonDiscardablePic.

The position of the cpb at the end of the bitstream to be concatenated is higher than the position of the cpb at the start of the concatenating bitstream. According to syntax, the value of the initial_cpb_removal_delay is high.

The start of the concatenating bitstream is the concatenation_flag=1.

The auCpbRemovalDelayDeltaMinus1 at the start of the concatenating bitstream is appropriately set (auCpbRemovalDelayDeltaMinus1=0, for example).

As those conditions are satisfied, it becomes possible to concatenate a bitstream with another bitstream in a simple manner. Even if the user does not appropriately rewrite the hypothetical reference decoder information included in each bitstream, those bitstreams can be concatenated so that the bitstream obtained as a result of the concatenation will not break the hypothetical reference decoder. That is, the bitstream concatenation device 200 puts the bitstreams to be concatenated into such a state that the bitstreams can be more easily concatenated. The bitstream concatenation device 200 then concatenates those bitstreams. Thus, bitstreams can be concatenated more easily.

<Flow in a Bitstream Concatenation Process>

Next, an example flow in each process to be performed by the bitstream concatenation device 200 is described. Referring first to the flowchart in FIG. 16, an example flow in a bitstream concatenation process is described.

When the bitstream concatenation process is started, the buffer determination unit 211 of the bitstream concatenation device 200 obtains the stream A in step S201, and obtains the stream B in step S202.

In step S203, the buffer determination unit 211 performs a buffer determination process, and adjusts the CPB position of each stream.

In step S204, the nal_unit_type rewrite unit 212 performs a null unit rewrite process, and rewrites the nal_unit_type at the end of the stream A as the value corresponding to prevNonDiscardablePic.

In step S205, the Buffering Period rewrite unit 213 performs a buffering period rewrite process, and rewrites the concatenation_flag at the start of the stream B as "1 (true)", and rewrites the auCpbRemovalDelayMinus1 at the start of the stream B as "0 (minimum value)".

In step S206, the bitstream concatenation unit 214 concatenates the bitstreams having the respective pieces of the hypothetical reference decoder information updated as above. For example, the bitstream concatenation unit 214 connects the start of the stream B to the end of the stream A.

In step S207, the bitstream concatenation unit 214 outputs the concatenated bitstream (the stream A+B) to the outside of the bitstream concatenation device 200.

When the process in step S207 is completed, the bitstream concatenation process comes to an end.

<Flow in the Buffer Determination Process>

Figure 16:
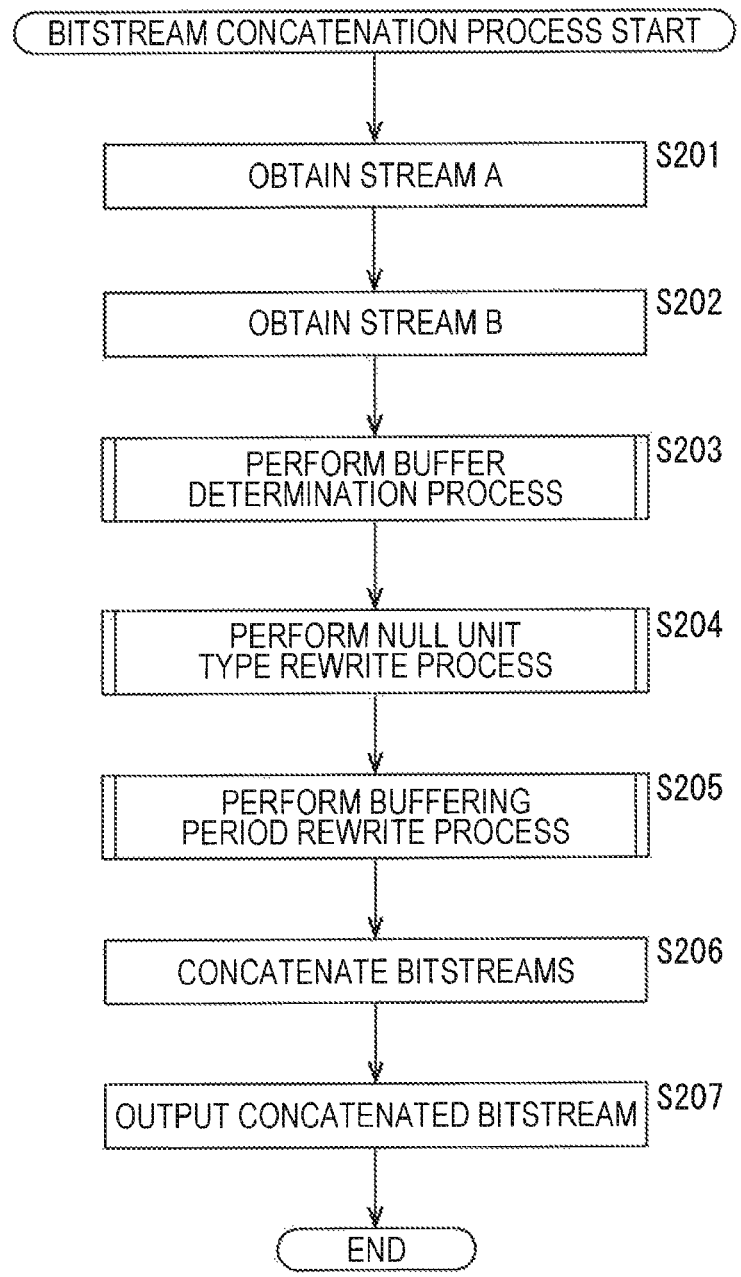
FIG. 16 is a flowchart for explaining an example flow in a bitstream concatenation process.
Figure 17:
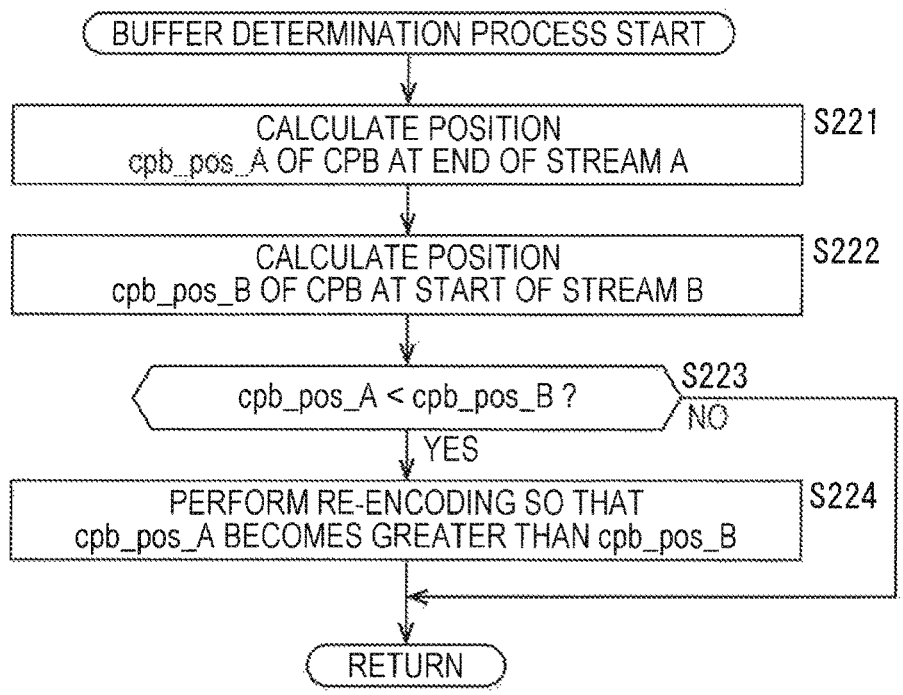
FIG. 17 is a flowchart for explaining an example flow in a buffer determination process.

Referring now to the flowchart shown in FIG. 17, an example flow in the buffer determination process to be performed in step S203 in FIG. 16 is described. When the buffer determination process is started, the buffer determination unit 211 in step S221 calculates the position of the CPB at the end of the stream A (cpb_pos_A). In step S222, the buffer determination unit 211 calculates the position of the CPB at the end of the stream B (cpb_pos_B).

In step S223, the buffer determination unit 211 determines whether "cpb_pos_A<cpb_pos_B" is true. If "cpb_pos_A<cpb_pos_B" is determined to be true, the process moves on to step S224.

In step S224, to prevent the hypothetical reference decoder from breaking, the buffer determination unit 211 performs re-encoding so that the cpb_pos_A becomes greater than the cpb_pos_B. This re-encoding may be performed in any appropriate manner. For example, the buffer determination unit 211 may re-encode the stream A. Here, any appropriate range of pictures may be re-encoded. For example, only the last picture of the stream A may be re-encoded, or the last few pictures of the stream A may be re-encoded. In that case, the compression rate of the respective pictures may become higher toward the end. Alternatively, the stream B may be re-encoded.

When the process in step S224 is completed, the process returns to FIG. 16. If "cpb_pos_A<cpb_pos_B" is determined to be false in step S223, the process in step S224 is skipped, and the buffer determination process comes to an end. The process then returns to FIG. 16.

<Flow in the Null Unit Type Rewrite Process>

Figure 18:
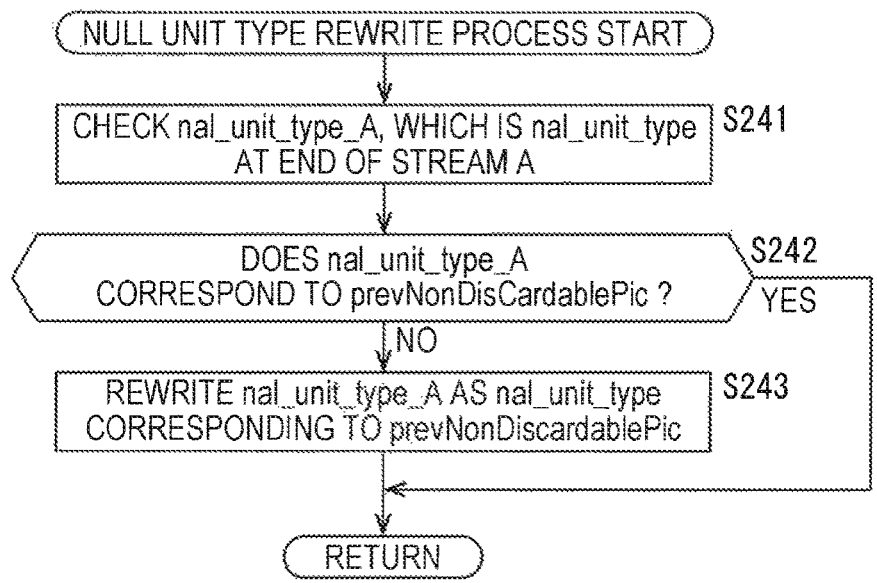
FIG. 18 is a flowchart for explaining an example flow in a null unit type rewrite process.

Referring now to the flowchart shown in FIG. 18, an example flow in the null unit type rewrite process to be performed in step S204 in FIG. 16 is described. When the null unit type rewrite process is started, the nal_unit_type rewrite unit 212 in step S241 checks (refers to) nal_unit_type_A, which is the nal_unit_type at the end of the stream A.

In step S242, the nal_unit_type rewrite unit 212 determines whether the nal_unit_type_A corresponds to the prevNonDiscardablePic, in accordance with a result of the check made in step S241. If the nal_unit_type_A is determined not to correspond to the prevNonDiscardablePic, the process moves on to step S243.

In step S243, the nal_unit_type rewrite unit 212 determines rewrites the nal_unit_type_A as the nal_unit_type corresponding to prevNonDiscardablePic. When the process in step S243 is completed, the null unit type rewrite process comes to an end, and the process returns to FIG. 16.

If the nal_unit_type_A is determined to correspond to the prevNonDiscardablePic in step S242, the process in step S243 is skipped, and the null unit type rewrite process comes to an end. The process then returns to FIG. 16.

<Flow in the Buffering Period Rewrite Process>

Figure 19:
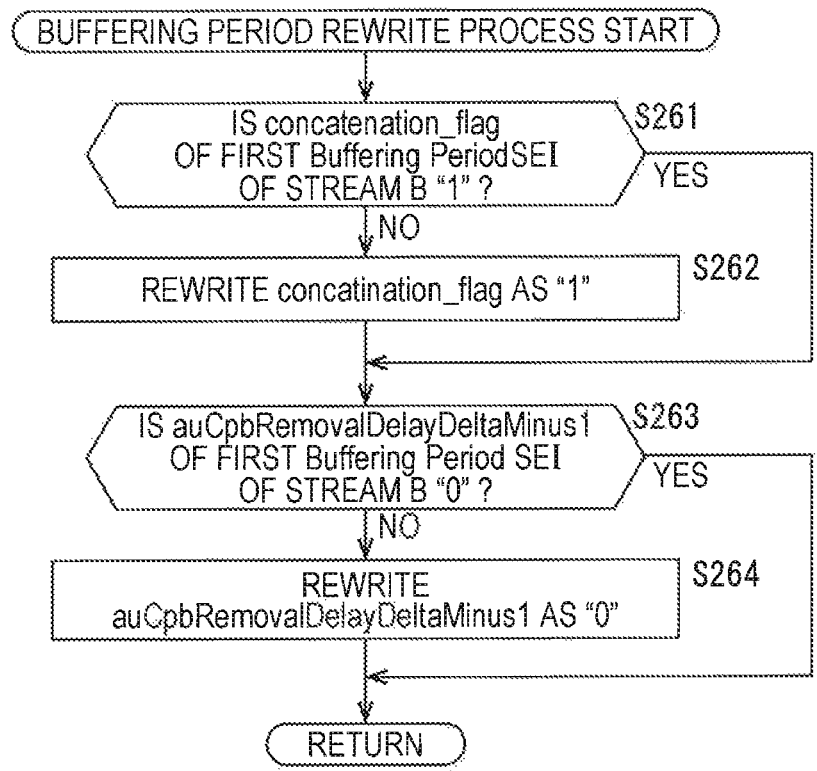
FIG. 19 is a flowchart for explaining an example flow in a buffering period rewrite process.

Referring now to the flowchart shown in FIG. 19, an example flow in the buffering period rewrite process to be performed in step S205 in FIG. 16 is described.

When the buffering period rewrite process is started, the Buffering Period rewrite unit 213 checks the first Buffering Period SEI in the stream B. In step S261, the Buffering Period rewrite unit 213 determines whether the concatenation_flag of the first Buffering Period SEI in the stream B is "1 (true)". If the concatenation_flag is determined to be "0 (false)", the process moves on to step S262.

In step S262, the Buffering Period rewrite unit 213 rewrites the concatenation_flag as "1 (true)". After the process in step S262 is completed, the process moves on to step S263.

If the concatenation_flag is determined to be "1 (true)" in step S261, the process in step S262 is skipped, and the process moves on to step S263.

In step S263, the Buffering Period rewrite unit 213 determines whether the auCpbRemovalDelayDeltaMinus1 of the first Buffering Period SEI in the stream B is "0 (minimum value)". If the auCpbRemovalDelayDeltaMinus1 is determined not to be "0 (minimum value)", the process moves on to step S264.

In step S264, the Buffering Period rewrite unit 213 sets the auCpbRemovalDelayDeltaMinus1 at "0 (minimum value)". When the process in step S264 is completed, the buffering period rewrite process comes to an end, and the process returns to FIG. 16.

If the auCpbRemovalDelayDeltaMinus1 of the first Buffering Period SEI in the stream B is determined to be "0 (minimum value)" in step S263, the process in step S264 is skipped, and the buffering period rewrite process comes to an end. The process then returns to FIG. 16.

<Bitstream Concatenation>

Figure 20:
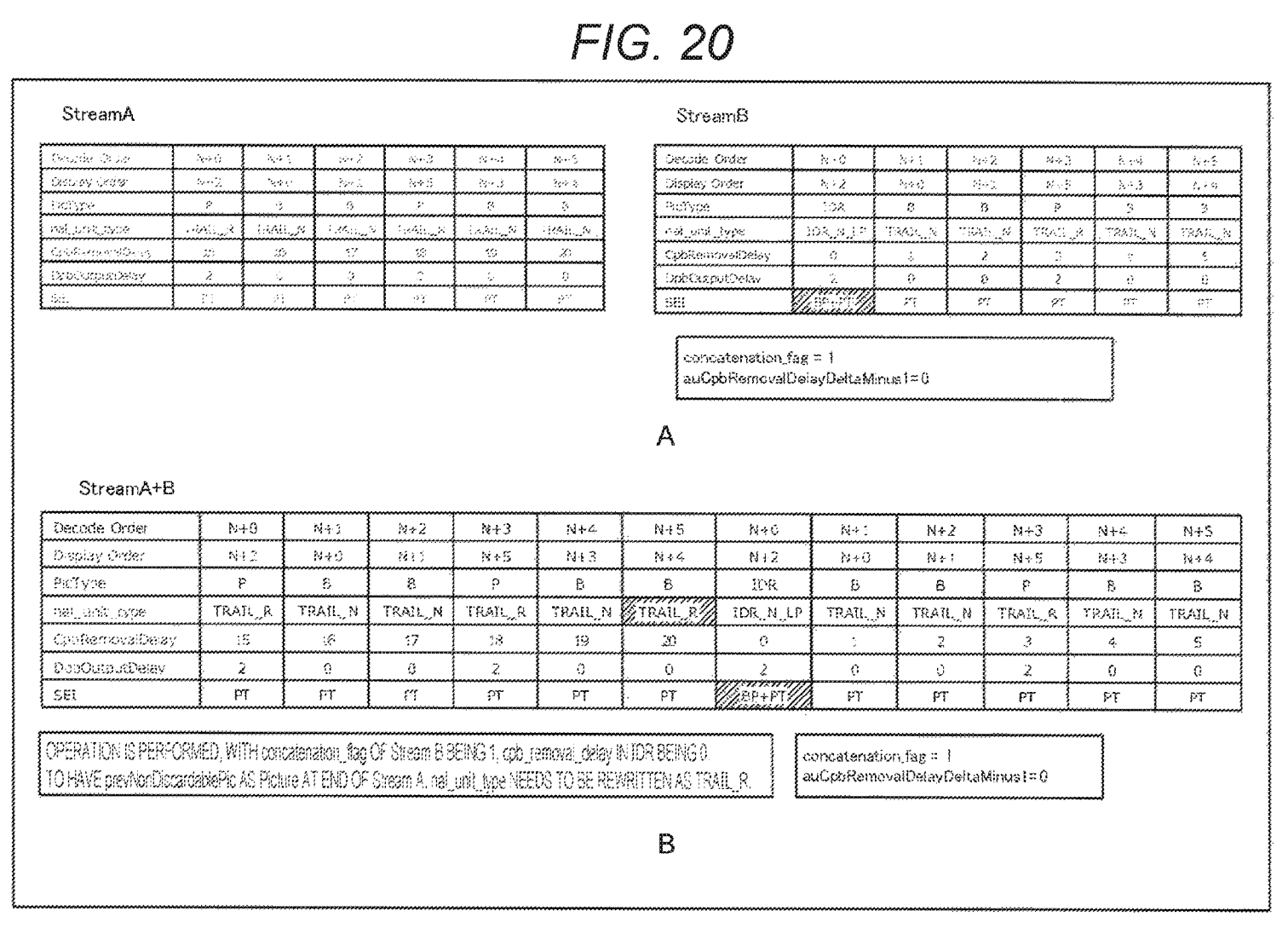

FIG. 20 shows an example case where the bitstream concatenation device 200 that performs the above described processes concatenates bitstreams. A in FIG. 20 shows an example of parameters (such as parameters related to the hypothetical reference decoder) about some of the frames (located near the connected portions) of the respective bitstreams (a stream A and a stream B) prior to concatenation. In the concatenation shown in FIG. 20, the start of the stream B is connected to the end of the stream A. B in FIG. 20 shows an example of parameters (such as parameters related to the hypothetical reference decoder) about some of the frames (located near the connected portions) of a stream A+B that is the bitstream after the concatenation.

As shown in FIG. 20, operation is performed, with the concatenation_flag being 1 in the stream B, the cpb_removal_delay being 0 in the IDR in this case. The nal_unit_type of the last picture of the stream A is set at TRAIL_R, so that the prevNonDiscardablePic becomes the picture at the end of the stream A. With this, bitstreams can be connected in a simple manner. That is, the bitstream concatenation device 200 can concatenate bitstreams more easily by performing the respective processes described above.

3. Third Embodiment

Bitstream Concatenation Device

Figure 21:
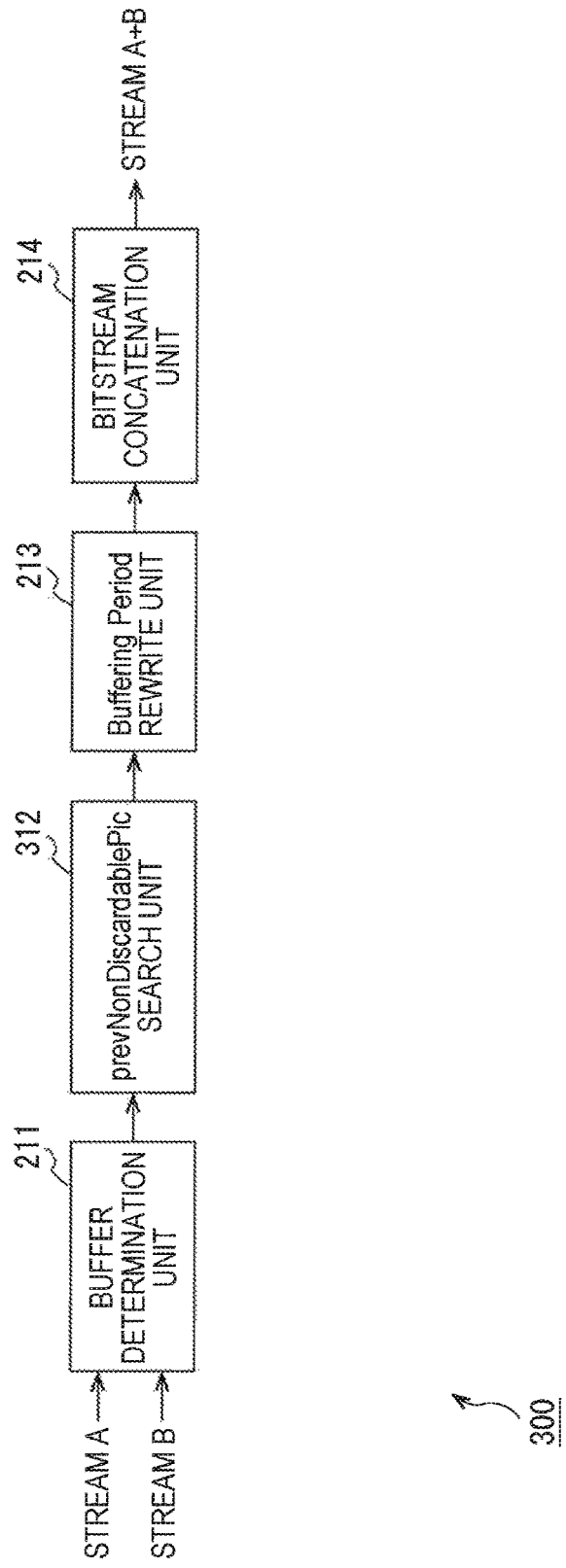
FIG. 21 is a block diagram showing a typical example structure of a bitstream concatenation device.

FIG. 21 is a diagram showing another typical example structure of a bitstream concatenation device. The bitstream concatenation device 300 shown in FIG. 21 is a device that performs a process to concatenate bitstreams by smart rendering editing, as in the case of the bitstream concatenation device 200 (FIG. 15). For example, the bitstream concatenation device 300 receives inputs of a stream A and a stream B, generates a stream A+B by connecting the start of the stream B to the end of the stream A, and outputs the stream A+B.

As shown in FIG. 21, the bitstream concatenation device 300 includes a buffer determination unit 211, a prevNonDiscardablePic search unit 312, a Buffering Period rewrite unit 213, and a bitstream concatenation unit 214.

The prevNonDiscardablePic search unit 312 searches for the position of prevNonDiscardablePic. In this case, the Buffering Period rewrite unit 213 rewrites the concatenation_flag at the start of the stream B as "1 (true)", and rewrites the auCpbRemovalDelayDeltaMinus1 of the stream B as "auCpbRemovalDelayDelta−1".

By doing so, the bitstream concatenation device 300 sets the respective parameters prior to concatenation, to generate bitstreams that satisfy the conditions described below.

The position of the cpb at the end of the bitstream to be concatenated is higher than the position of the cpb at the start of the concatenating bitstream. In terms of syntax, the value of the initial_cpb_removal_delay is high.
 The start of the concatenating bitstream is the concatenation_flag=1.
 The auCpbRemovalDelayDeltaMinus1 at the start of the concatenating bitstream is appropriately set (auCpbRemovalDelayDeltaMinus1=2, for example).

As those conditions are satisfied, a bitstream and another bitstream can be concatenated in a simple manner.

Even if the user does not appropriately rewrite the hypothetical reference decoder information included in each bitstream, those bitstreams can be concatenated so that the bitstream obtained as a result of the concatenation will not break the hypothetical reference decoder. That is, the bitstream concatenation device 300 puts the bitstreams to be concatenated into such a state that the bitstreams can be more easily concatenated. The bitstream concatenation device 300 then concatenates those bitstreams. Thus, bitstreams can be concatenated more easily.

<Flow in a Bitstream Concatenation Process>

Next, an example flow in each process to be performed by the bitstream concatenation device 300 is described. Referring first to the flowchart in FIG. 22, an example flow in a bitstream concatenation process is described.

When the bitstream concatenation process is started, the buffer determination unit 211 of the bitstream concatenation device 300 obtains the stream A in step S301, and obtains the stream B in step S302.

In step S303, the buffer determination unit 211 performs the same buffer determination process (FIG. 17) as that in step S203 in FIG. 16, and adjusts the CPB position of each stream.

In step S304, the prevNonDiscardablePic search unit 312 performs a previous non-discardable picture search process, and searches for the position of the prevNonDiscardablePic.

In step S305, the Buffering Period rewrite unit 213 performs a buffering period rewrite process, and performs processes such as rewriting the concatenation_flag at the start of the stream B as "1 (true)".

In step S306, the bitstream concatenation unit 214 concatenates the bitstreams having the respective pieces of the hypothetical reference decoder information updated as above, as in step S206 in FIG. 16. For example, the bitstream concatenation unit 214 connects the start of the stream B to the end of the stream A.

In step S307, the bitstream concatenation unit 214 outputs the concatenated bitstream (the stream A+B) to the outside of the bitstream concatenation device 200, as in step S206 in FIG. 16.

When the process in step S307 is completed, the bitstream concatenation process comes to an end.

<Flow in the Previous Non-Discardable Picture Search Process>

Figure 22:
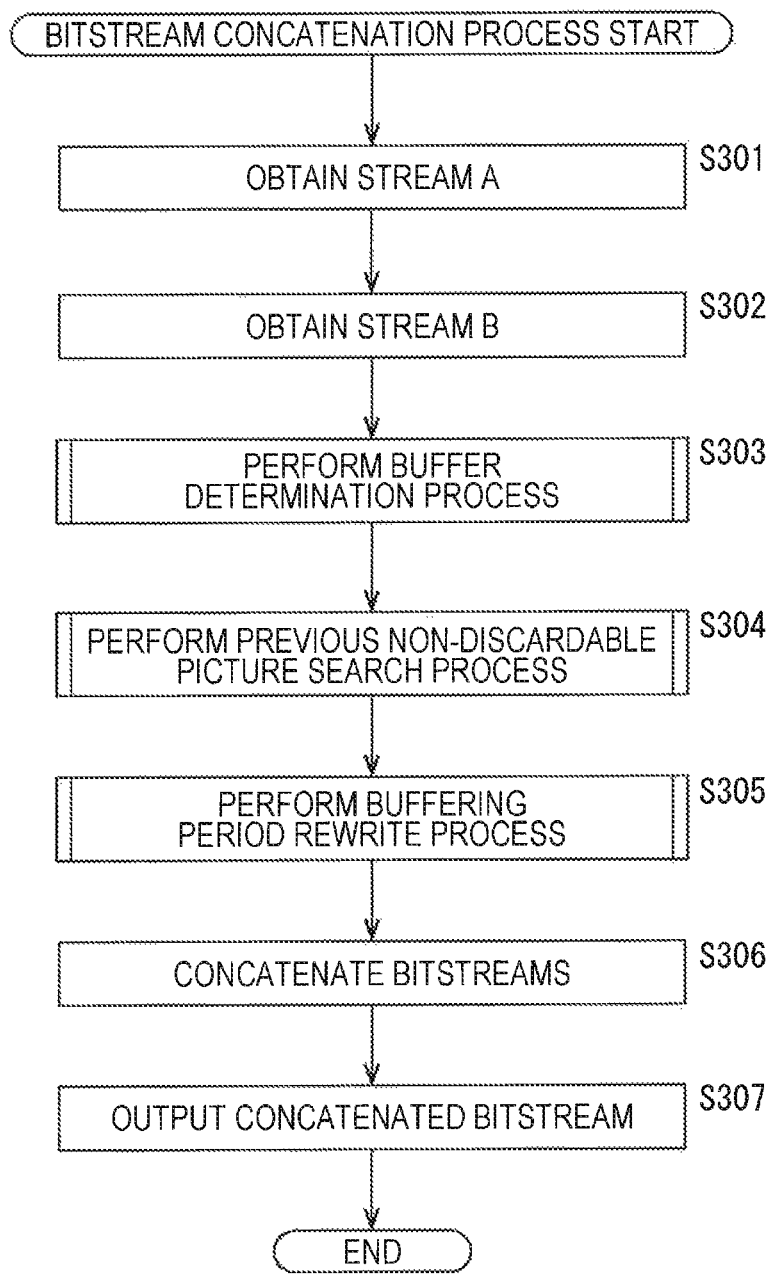
FIG. 22 is a flowchart for explaining an example flow in a bitstream concatenation process.
Figure 23:
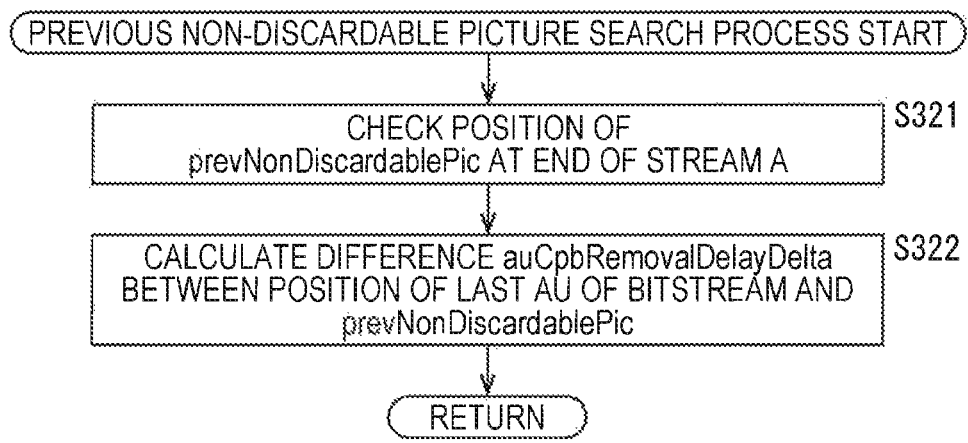
FIG. 23 is a flowchart for explaining an example flow in a previous non-discardable picture search process.

Referring now to the flowchart shown in FIG. 23, an example flow in the previous non-discardable picture search process to be performed in step S304 in FIG. 22 is described.

When the previous non-discardable picture search process is started, the prevNonDiscardablePic search unit 312 checks the position of the prevNonDiscardablePic at the end of the stream A in step S321.

In step S322, the prevNonDiscardablePic search unit 312 calculates a difference auCpbRemovalDelayDelta between the position of the access unit (AU) at the end of the bitstream and the prevNonDiscardablePic.

When step S322 is finished, the previous non-discardable picture search process comes to an end, and the process returns to FIG. 22.

<Flow in the Buffering Period Rewrite Process>

Figure 24:
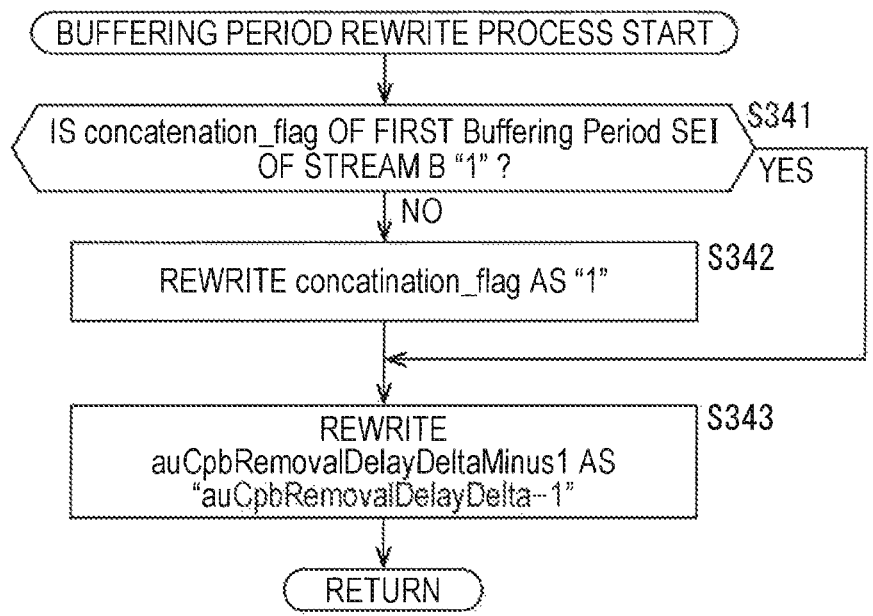
FIG. 24 is a flowchart for explaining an example flow in a buffering period rewrite process.

Referring now to the flowchart shown in FIG. 24, an example flow in the buffering period rewrite process to be performed in step S305 in FIG. 22 is described.

When the buffering period rewrite process is started, the Buffering Period rewrite unit 213 checks the first Buffering Period SEI in the stream B. In step S341, the Buffering Period rewrite unit 213 determines whether the concatenation_flag of the first Buffering Period SEI in the stream B is "1 (true)". If the concatenation_flag is determined to be "0 (false)", the process moves on to step S342.

In step S342, the Buffering Period rewrite unit 213 rewrites the concatenation_flag as "1 (true)". After the process in step S342 is completed, the process moves on to step S343.

If the concatenation_flag is determined to be "1 (true)" in step S341, the process in step S342 is skipped, and the process moves on to step S343.

In step S343, the Buffering Period rewrite unit 213 rewrites the auCpbRemovalDelayDeltaMinus1 of the first Buffering Period SEI in the stream B as "auCpbRemovalDelayDelta−1". When the process in step S343 is completed, the buffering period rewrite process comes to an end, and the process returns to FIG. 22.

<Bitstream Concatenation>

Figure 25:
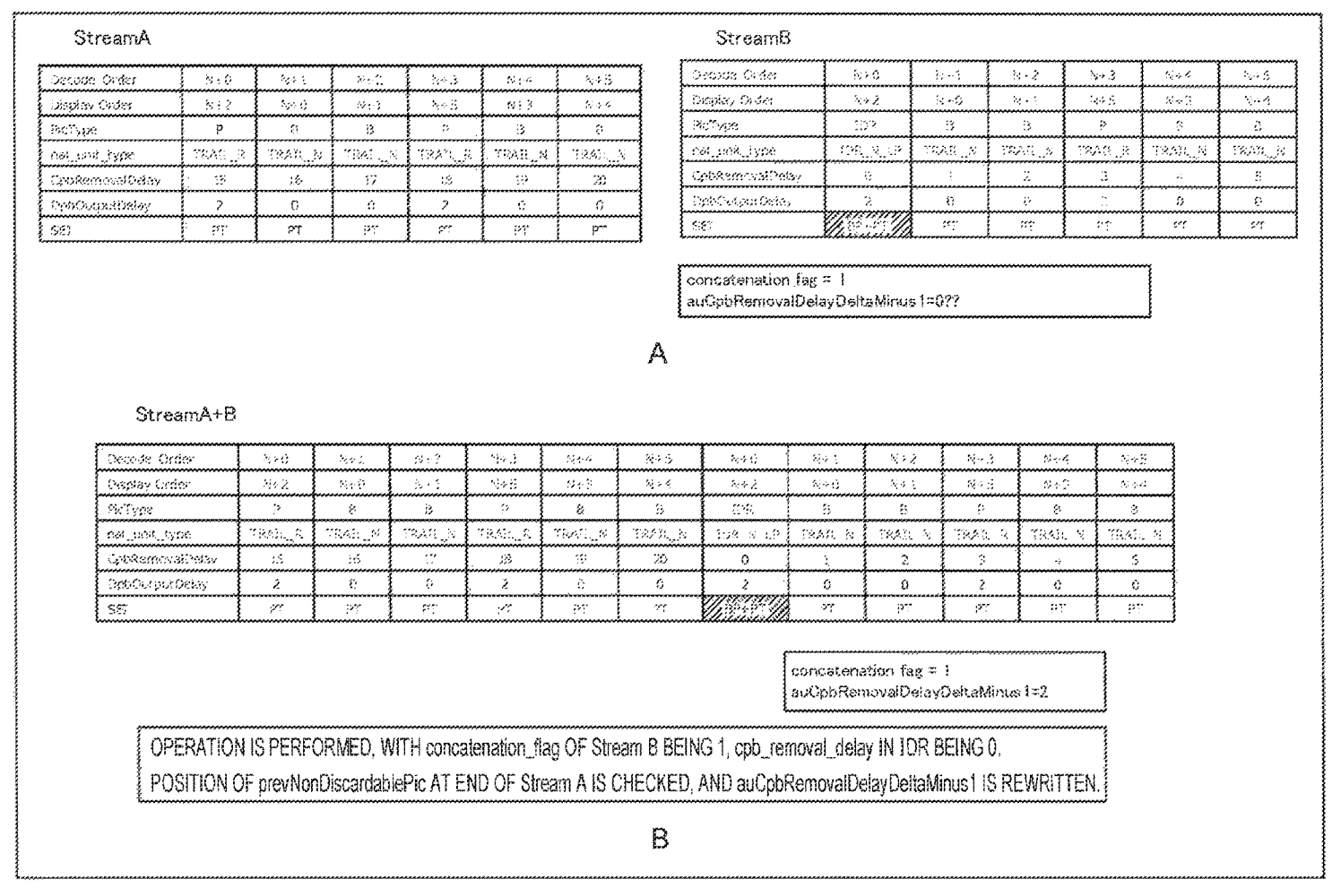

FIG. 25 shows an example case where the bitstream concatenation device 300 that performs the above described processes concatenates bitstreams. A in FIG. 25 shows an example of parameters (such as parameters related to the hypothetical reference decoder) about some of the frames (located near the connected portions) of the respective bitstreams (a stream A and a stream B) prior to concatenation. In the concatenation shown in FIG. 25, the start of the stream B is connected to the end of the stream A. B in FIG. 25 shows an example of parameters (such as parameters related to the hypothetical reference decoder) about some of the frames (located near the connected portions) of a stream A+B that is the bitstream after the concatenation.

As shown in FIG. 25, operation is performed, with the concatenation_flag being 1 in the stream B, the cpb_removal_delay being 0 in the IDR in this case. Also, the position of the prevNonDiscardablePic at the end of the stream A is checked, and the auCpbRemovalDelayDeltaMinus1 is rewritten. With this, bitstreams can be connected in a simple manner. That is, the bitstream concatenation device 300 can concatenate bitstreams more easily by performing the respective processes described above.

4. Fourth Embodiment

Bitstream Concatenation Device

Figure 26:
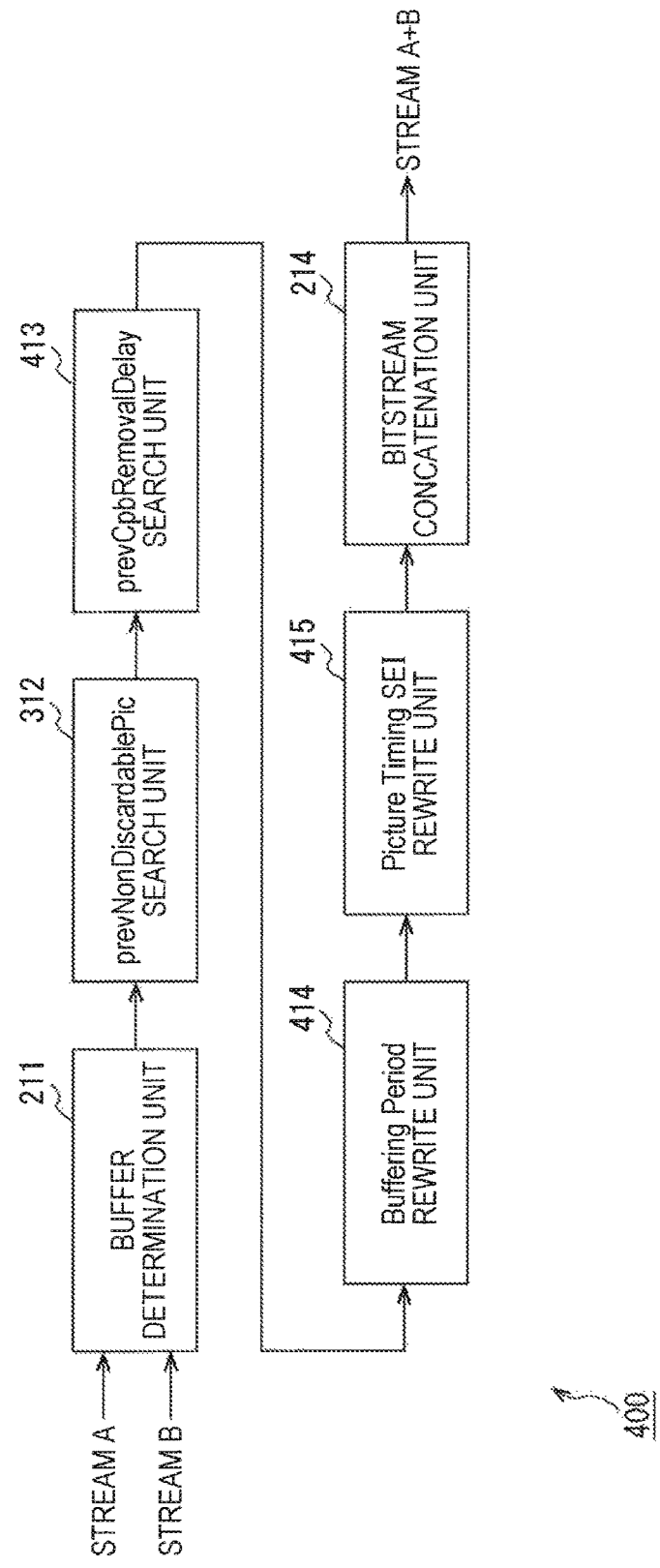
FIG. 26 is a block diagram showing a typical example structure of a bitstream concatenation device.

FIG. 26 is a diagram showing another typical example structure of a bitstream concatenation device. The bitstream concatenation device 400 shown in FIG. 26 is a device that performs a process to concatenate bitstreams by smart rendering editing, as in the case of the bitstream concatenation device 200 (FIG. 15). For example, the bitstream concatenation device 400 receives inputs of a stream A and a stream B, generates a stream A+B by connecting the start of the stream B to the end of the stream A, and outputs the stream A+B.

As shown in FIG. 26, the bitstream concatenation device 300 includes a buffer determination unit 211, a prevNonDiscardablePic search unit 312, a prevCpbRemovalDelay search unit 413, a Buffering Period rewrite unit 414, a Picture Timing SEI rewrite unit 415, and a bitstream concatenation unit 214.

The prevCpbRemovalDeiay search unit 413 searches for prevCpbRemovalDelay. The Buffering Period rewrite unit 414 rewrites the syntax of Buffering Period SEI. The Picture Timing SEI rewrite unit 415 rewrites the syntax of Picture Timing SEI.

By doing so, the bitstream concatenation device 400 sets the respective parameters prior to concatenation, to generate bitstreams that satisfy the conditions described below.

The position of the cpb at the end of the bitstream to be concatenated is higher than the position of the cpb at the start of the concatenating bitstream. In terms of syntax, the value of the initial_cpb_removal_delay is high.

The start of the concatenating bitstream is the concatenation_flag=0.

The auCpbRemovalDelayDeltaMinus1 at the start of the concatenating bitstream is appropriately set (auCpbRemovalDelayDeltaMinus1=2, for example).

The au_cpb_removal_delay_minus1 at the start of the concatenating bitstream is +1 greater than the au_cpb_removal_delay_minus1 at the end of the bitstream to be concatenated.

As those conditions are satisfied, it becomes possible to concatenate a bitstream with another bitstream in a simple manner. Even if the user does not appropriately rewrite the hypothetical reference decoder information included in each bitstream, those bitstreams can be concatenated so that the bitstream obtained as a result of the concatenation will not break the hypothetical reference decoder. That is, the bitstream concatenation device 400 puts the bitstreams to be concatenated into such a state that the bitstreams can be more easily concatenated. The bitstream concatenation device 400 then concatenates those bitstreams. Thus, bitstreams can be concatenated more easily.

<Flow in a Bitstream Concatenation Process>

Next, an example flow in each process to be performed by the bitstream concatenation device 400 is described. Referring first to the flowchart in FIG. 27, an example flow in a bitstream concatenation process is described.

When the bitstream concatenation process is started, the buffer determination unit 211 of the bitstream concatenation device 200 obtains the stream A in step S401, and obtains the stream B in step S402.

In step S403, the buffer determination unit 211 performs the same buffer determination process (FIG. 17) as that in step S203 in FIG. 16, and adjusts the CPB position of each stream.

In step S404, the prevNonDiscardablePic search unit 312 performs a previous non-discardable picture search process, and searches for the position of the prevNonDiscardablePic, as in step S304 in FIG. 22.

In step S405, the prevCpbRemovalDelay search unit 413 performs a previous Cpb removal delay search process, and searches for the position of the prevCpbRemovalDelay.

In step S406, the Buffering Period rewrite unit 414 performs a buffering period rewrite process, and rewrites the concatenation_flag at the start of the stream B as "0 (true)", and rewrites the auCpbRemovalDelayDeltaMinus1 at the start of the stream B as "auCpbRemovalDelayDelta−1".

In step S407, the Picture Timing SEI rewrite unit 415 performs a picture timing SEI rewrite process, and rewrites the syntax of Picture Timing SEI.

In step S408, the bitstream concatenation unit 214 concatenates the bitstreams having the respective pieces of the hypothetical reference decoder information updated as above. For example, the bitstream concatenation unit 214 connects the start of the stream B to the end of the stream A.

In step S409, the bitstream concatenation unit 214 outputs the concatenated bitstream (the stream A+B) to the outside of the bitstream concatenation device 200.

When the process in step S409 is completed, the bitstream concatenation process comes to an end.

<Flow in the Previous Cpb Removal Delay Search Process>

Figure 27:
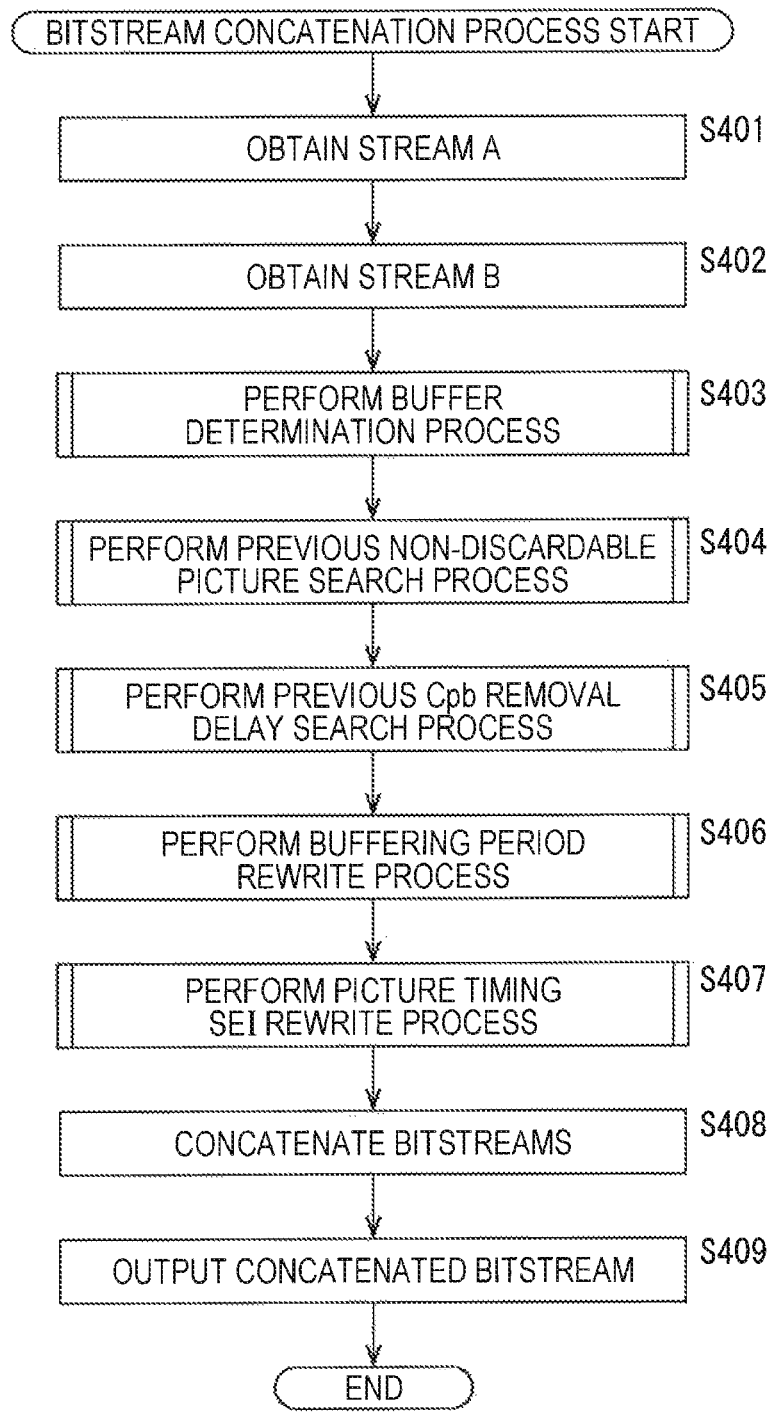
FIG. 27 is a flowchart for explaining an example flow in a bitstream concatenation process.
Figure 28:
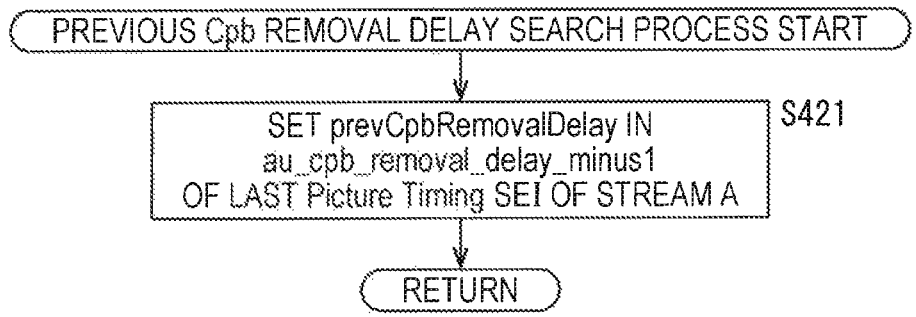
FIG. 28 is a flowchart for explaining an example flow in a prev_Cpb_removable_delay search process.

Referring now to the flowchart shown in FIG. 28, an example flow in the previous Cpb removal delay search process to be performed in step S405 in FIG. 27 is described.

When the previous Cpb removal delay search process is started, the prevCpbRemovalDelay search unit 413 in step S421 sets the prevCpbRemovalDelay in the au_cpb_removal_delay_minus1 of the last Picture Timing SEI of the stream A to be concatenated.

When the process in step S421 is completed, the previous Cpb removal delay search process comes to an end, and the process returns to FIG. 27.

<Flow in the Buffering Period Rewrite Process>

Figure 29:
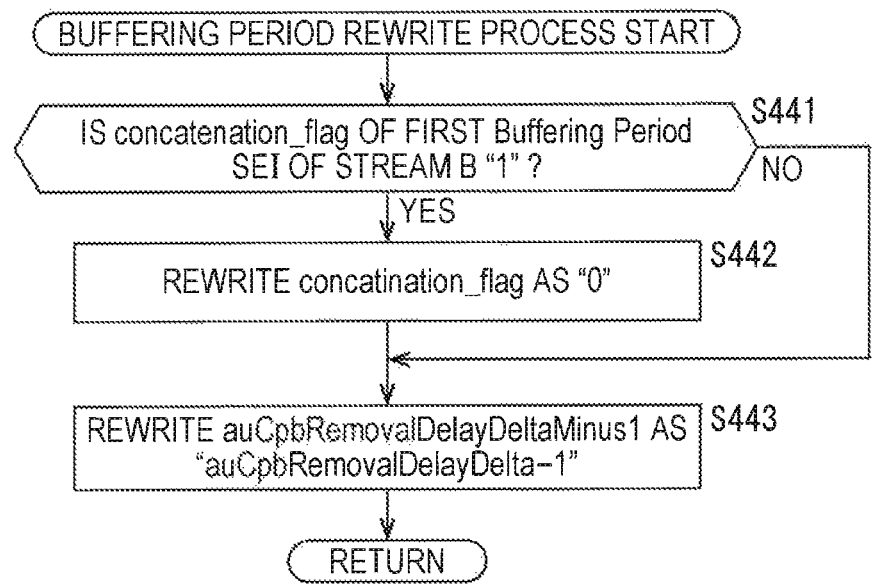
FIG. 29 is a flowchart for explaining an example flow in a buffering period rewrite process.

Referring now to the flowchart shown in FIG. 29, an example flow in the buffering period rewrite process to be performed in step S406 in FIG. 27 is described.

When the buffering period rewrite process is started, the Buffering Period rewrite unit 414 in step S441 determines whether the value of the concatenation_flag of the first Buffering Period SEI in the concatenating stream B is "1 (true)". If the concatenation_flag is determined to be "1", the process moves on to step S442.

In step S442, the Buffering Period rewrite unit 414 rewrites the value of the concatenation_flag as "0 (false)". After the process in step S442 is completed, the process moves on to step S443. If the concatenation_flag is determined not to be "1" (or if the concatenation_flag is determined to be "0") in step S441, the process in step S442 is skipped, and the process moves on to step S443.

In step S443, the Buffering Period rewrite unit 414 rewrites the value of the auCpbRemovalDelayDeltaMinus1 as "auCpbRemovalDelayDelta−1" (or auCpbRemovalDelayDeltaMinus1=auCpbRemovalDelayDelta−1).

When the process in step S443 is completed, the buffering period rewrite process comes to an end, and the process returns to FIG. 27.

<Flow in the Picture Timing SEI Rewrite Process>

Figure 30:
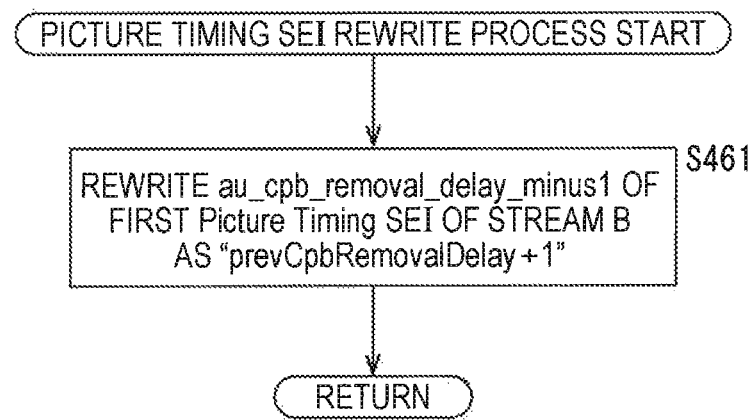
FIG. 30 is a flowchart for explaining an example flow in a picture timing SEI rewrite process.

Referring now to the flowchart shown in FIG. 30, an example flow in the picture timing SEI rewrite process to be performed in step S407 in FIG. 27 is described.

When the picture timing SEI rewrite process is started, the Picture Timing SEI rewrite unit 415 in step S461 rewrites the au_cpb_removal_delay_minus1 of the first Picture Timing SEI of the concatenating stream B as "prevCpbRemovalDelay+1".

When the process in step S461 is completed, the picture timing SEI rewrite process comes to an end, and the process returns to FIG. 27.

<Bitstream Concatenation>

Figure 31:
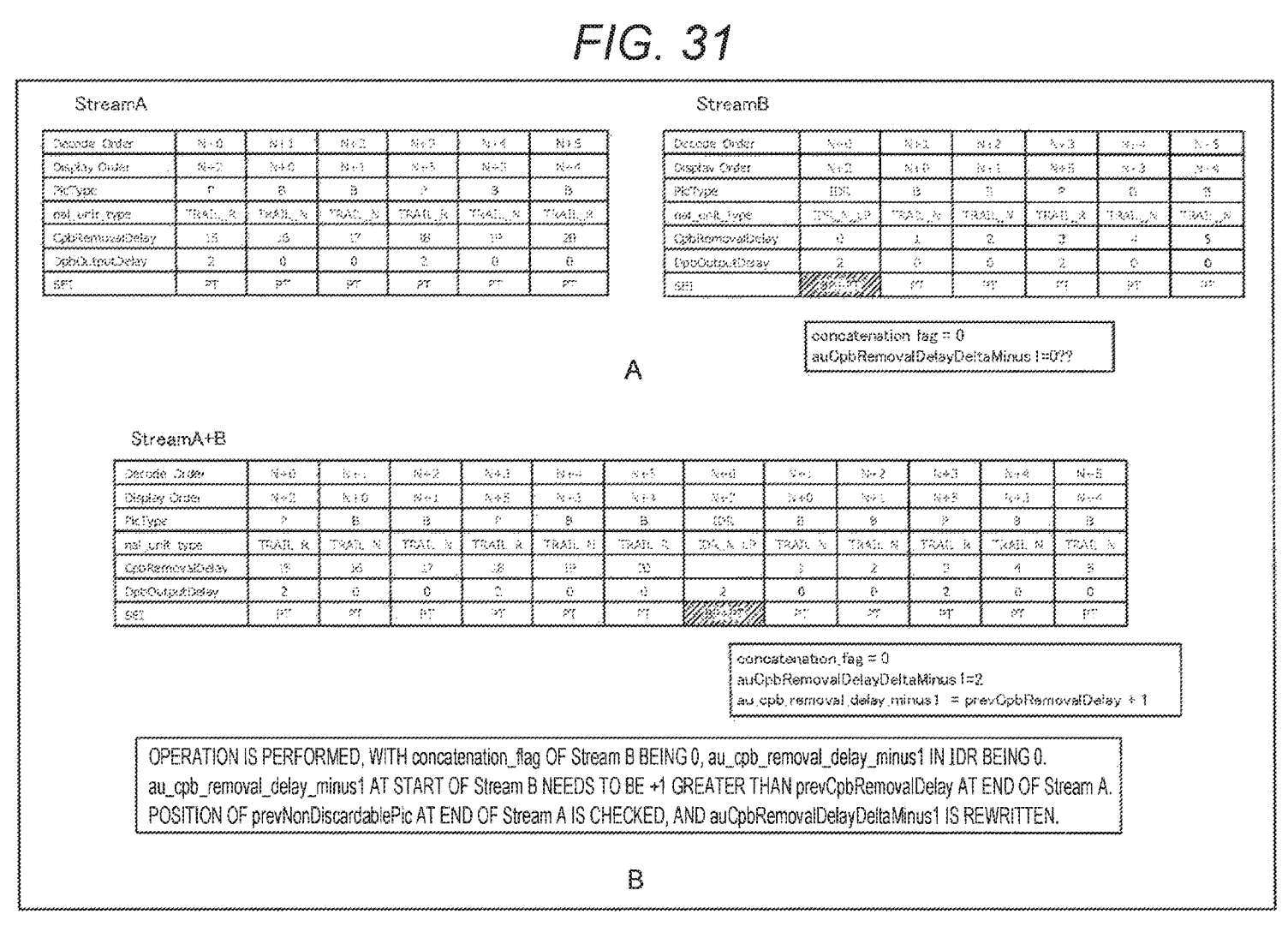

FIG. 31 shows an example case where the bitstream concatenation device 400 that performs the above described processes concatenates bitstreams. A in FIG. 31 shows an example of parameters (such as parameters related to the hypothetical reference decoder) about some of the frames (located near the connected portions) of the respective bitstreams (a stream A and a stream B) prior to concatenation. In the concatenation shown in FIG. 31, the start of the stream B is connected to the end of the stream A. B in FIG. 31 shows an example of parameters (such as parameters related to the hypothetical reference decoder) about some of the frames (located near the connected portions) of a stream A+B that is the bitstream after the concatenation.

As shown in FIG. 31, operation is performed, with the concatenation_flag being 0 in the stream B, the au_cpb_removal_delay_minus1 being 0 in the IDR in this case. The au_cpb_removal_delay_minus1 at the start of the stream B is made+1 greater than the prevCpbRemovalDelay at the end of the stream A. The position of the prevNonDiscardablePic at the end of the stream A is then checked, and the auCpbRemovalDelayDeltaMinus1 is rewritten.

With this, bitstreams can be connected in a simple manner. That is, the bitstream concatenation device 400 can concatenate bitstreams more easily by performing the respective processes described above.

<Additional Information>

Information to be used in the process to be performed at a time of the above described concatenation may be added to a bitstream. For example, it is necessary to search for the prevNonDiscardablePic as described above, since the location of the prevNonDiscardablePic in a bitstream is not clear. To search for the prevNonDiscardablePic, however, the information about the respective pictures needs to be referred to, starting from the end of the bitstream. This might lead to an increase in the processing load.

To counter this, information indicating which picture is the prevNonDiscardablePic may be added beforehand to a bitstream. With such information, it becomes easier to search for the prevNonDiscardablePic in accordance with the information, and an increase in the processing load can be prevented.

The information indicating the prevNonDiscardablePic may be added in any position in a bitstream. For example, the information may be placed at the start of the access unit (AU). The information may be placed at the start of the GOP. The same information may be placed in two or more positions, such as at the start of the AU and the start of the GOP. A bitstream might be partially cut during editing. As the same information is provided in more than one positions, information can be prevented from being lost due to such editing.

Also, information designating a range in which the prevNonDiscardablePic is searched for may be added as the additional information to a bitstream, for example. As the search range is limited in accordance with such information, an unnecessary increase in the processing load can be prevented.

Any appropriate information may of course be added to a bitstream, and such information is not limited to the above described example.

The scope of application of the present technology may include any image encoding device that can encode image data, and any image processing device that can concatenate bitstreams of image data.

The present technology can also be applied to devices that are used for receiving image information (bitstreams) compressed through orthogonal transforms such as discrete cosine transforms and motion compensation, like MPEG, H.26x, and the like, via a network medium such as satellite broadcasting, cable television broadcasting, the Internet, or a portable telephone apparatus. The present technology can also be applied to devices that are used when compressed image information is processed on a storage medium such as an optical or magnetic disk or a flash memory.

5. Fifth Embodiment

Computer

The above described series of processes can be performed by hardware or can be performed by software. When the series of processes are to be conducted by software, the program that forms the software is installed into a computer. Here, the computer may be a computer incorporated into special-purpose hardware, or may be a general-purpose personal computer that can execute various kinds of functions as various kinds of programs are installed thereinto, for example.

Figure 32:
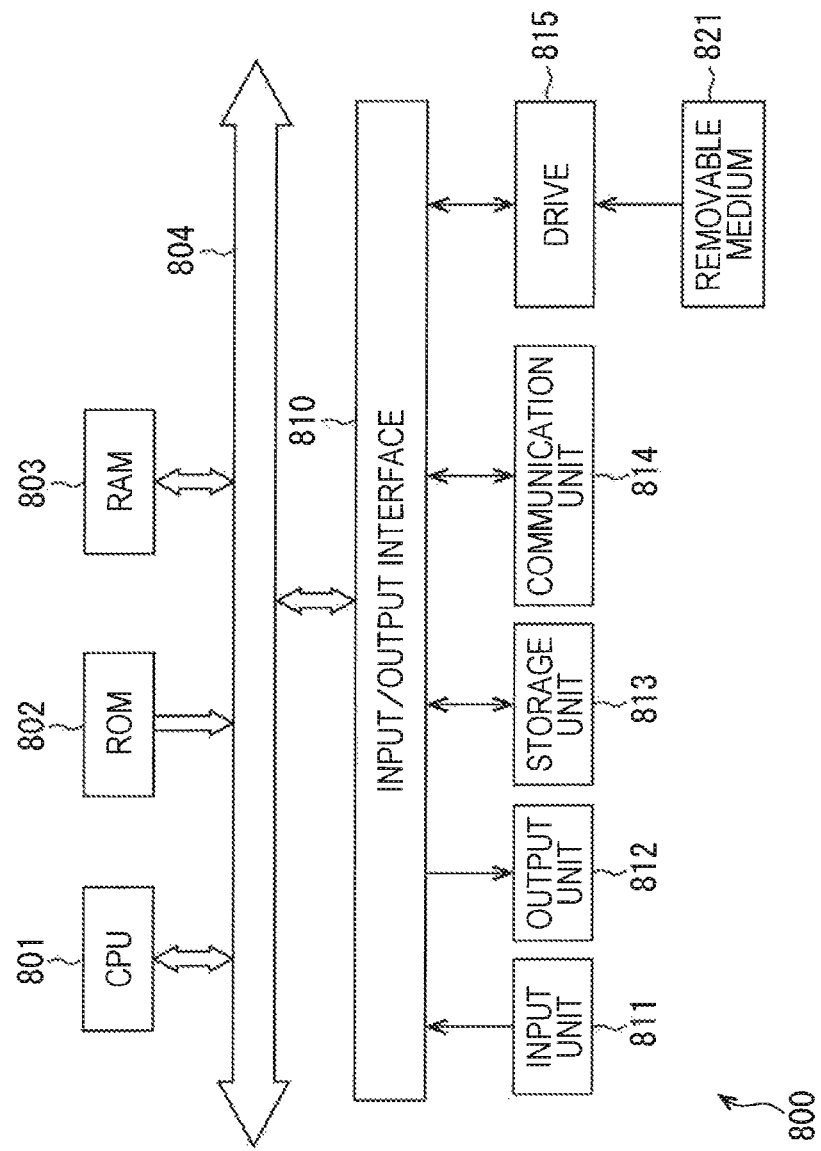
FIG. 32 is a block diagram showing a typical example structure of a computer.

FIG. 32 is a block diagram showing an example configuration of the hardware of a computer that performs the above described series of processes in accordance with a program.

In the computer 800 shown in FIG. 32, a central processing unit (CPU) 801, a read only memory (ROM) 802, and a random access memory (RAM) 803 are connected to one another by a bus 804.

An input/output interface 810 is also connected to the bus 804. An input unit 811, an output unit 812, a storage unit 813, a communication unit 814, and a drive 815 are connected to the input/output interface 810.

The input unit 811 is formed with a keyboard, a mouse, a microphone, a touch panel, an input terminal, and the like. The output unit 812 is formed with a display, a speaker, an output terminal, and the like. The storage unit 813 is formed with a hard disk, a RAM disk, a nonvolatile memory, or the like. The communication unit 814 is formed with a network interface or the like. The drive 815 drives a removable medium 821 such as a magnetic disk, an optical disk, a magnetooptical disk, or a semiconductor memory.

In the computer having the above described structure, the CPU 801 loads a program stored in the storage unit 813 into the RAM 803 via the input/output interface 810 and the bus 804, and executes the program, so that the above described series of processes are performed. The RAM 803 also stores data necessary for the CPU 801 to perform various processes and the like as necessary.

The program to be executed by the computer (the CPU 801) may be recorded on the removable medium 821 as a packaged medium to be used, for example. In that case, the program can be installed into the storage unit 813 via the input/output interface 810 when the removable medium 821 is mounted on the drive 815.

Alternatively, this program can be provided via a wired or wireless transmission medium such as a local area network, the Internet, or digital satellite broadcasting. In that case, the program may be received by the communication unit 814, and be installed into the storage unit 813.

Also, this program may be installed beforehand into the ROM 802 or the storage unit 813.

The program to be executed by the computer may be a program for performing processes in chronological order in accordance with the sequence described in this specification, or may be a program for performing processes in parallel or performing a process when necessary, such as when there is a call.

In this specification, steps describing the program to be recorded in a recording medium include processes to be performed in parallel or independently of one another if not necessarily in chronological order, as well as processes to be performed in chronological order in accordance with the sequence described herein.

In this specification, a system means an assembly of components (devices, modules (parts), and the like), and not all the components need to be provided in the same housing. In view of this, devices that are housed in different housings and are connected to each other via a network form a system, and one device having modules housed in one housing is also a system.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the functions of the system as a whole are substantially the same.

While preferred embodiments of the present disclosure have been described above with reference to the accompanying drawings, the technical scope of the present disclosure is not limited to those examples. It is apparent that those who have ordinary skills in the technical field of the present disclosure can make various changes or modifications within the scope of the technical spirit claimed herein, and it should be understood that those changes or modifications are within the technical scope of the present disclosure.

For example, the present technology can be embodied in a cloud computing structure in which one function is shared among devices via a network, and processing is performed by the devices cooperating with one another.

The respective steps described with reference to the above described flowcharts can be carried out by one device or can be shared among devices.

In a case where more than one process is included in one step, the processes included in the step can be performed by one device or can be shared among devices.

The image encoding device and the bitstream concatenation devices according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as optical disks, magnetic disks, and flash memory, and reproduction devices configured to reproduce images from the storage media. Four examples of applications will be described below.

6. Sixth Embodiment

First Example Application: Television Receiver

Figure 33:
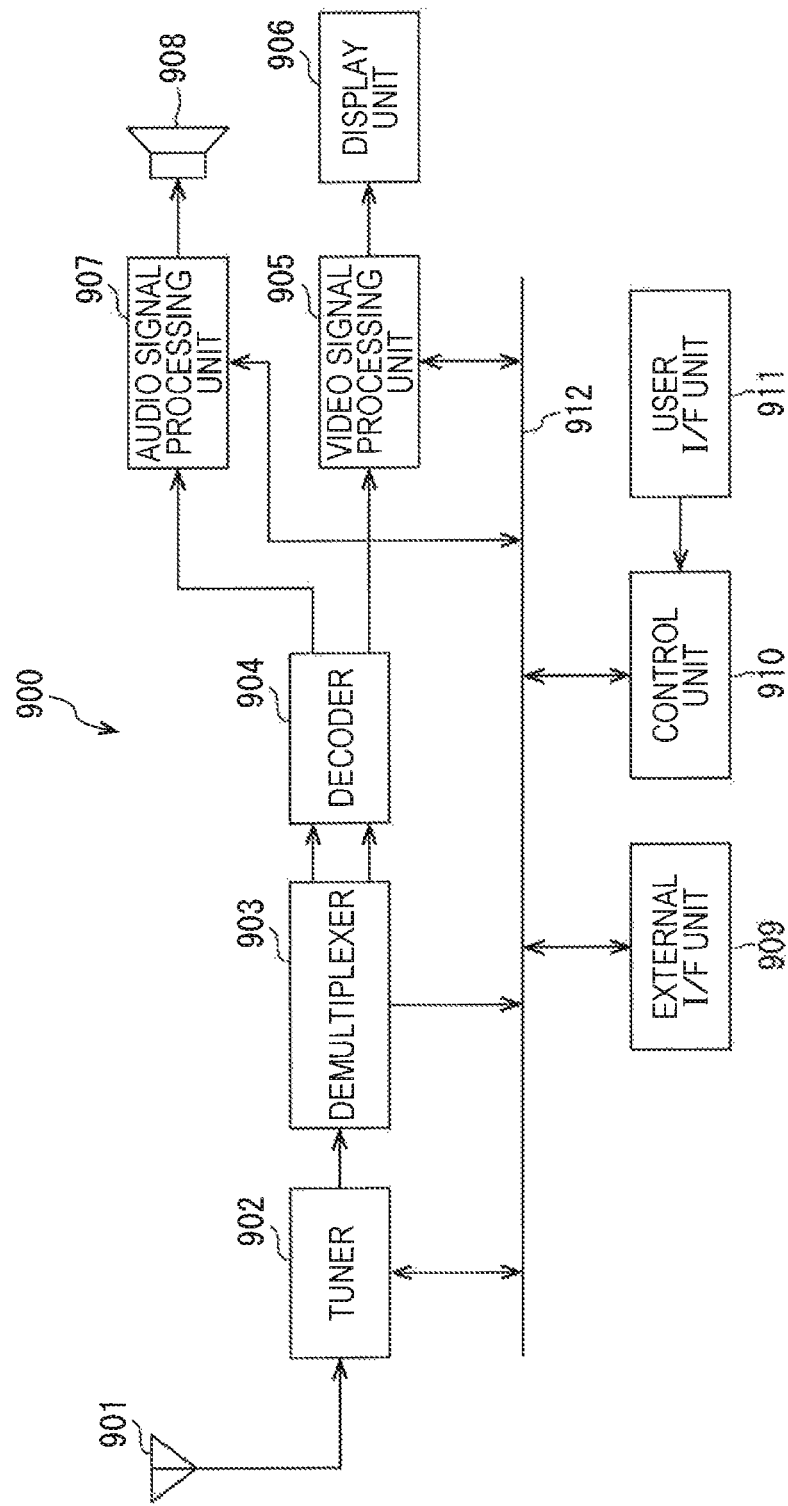
FIG. 33 is a block diagram schematically showing an example structure of a television apparatus.

FIG. 33 schematically shows an example structure of a television apparatus to which the above described embodiments are applied. A television apparatus 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from broadcast signals received via the antenna 901, and demodulates the extracted signal. The tuner 902 then outputs an encoded bitstream obtained by the demodulation to the demultiplexer 903. That is, the tuner 902 serves as a transmission unit in the television apparatus 900 that receives an encoded stream of encoded images.

The demultiplexer 903 separates a video stream and an audio stream of the current program to be viewed from the encoded bitstream, and outputs the separated streams to the decoder 904. The demultiplexer 903 also extracts auxiliary data such as an electronic program guide (EPG) from the encoded bitstream, and supplies the extracted data to the control unit 910. If the encoded bitstream is scrambled, the demultiplexer 903 may descramble the encoded bitstream.

The decoder 904 decodes the video stream and the audio stream input from the demultiplexer 903. The decoder 904 then outputs video data generated by the decoding to the video signal processing unit 905. The decoder 904 also outputs audio data generated by the decoding to the audio signal processing unit 907.

The video signal processing unit 905 reproduces video data input from the decoder 904, and displays the video data on the display unit 906. The video signal processing unit 905 may also display an application screen supplied via the network on the display unit 906. Furthermore, the video signal processing unit 905 may perform additional processing such as noise removal on the video data depending on settings. The video signal processing unit 905 may further generate an image of a graphical user interface (GUI) such as a menu, a button, or a cursor, and superimpose the generated image on the output image.

The display unit 906 is driven by a drive signal supplied from the video signal processing unit 905, and displays video or images on a video screen of a display device (such as a liquid crystal display, a plasma display, or an organic electroluminescence display (OELD).

The audio signal processing unit 907 performs reproduction processing such as D/A conversion and amplification on the audio data input from the decoder 904, and outputs audio through the speaker 908. Furthermore, the audio signal processing unit 907 may perform additional processing such as noise removal on the audio data.

The external interface unit 909 is an interface for connecting the television apparatus 900 to an external device or a network. For example, a video stream or an audio stream received via the external interface unit 909 may be decoded by the decoder 904. That is, the external interface unit 909 also serves as a transmission unit in the television apparatus 900 that receives an encoded stream of encoded images.

The control unit 910 includes a processor such as a CPU, and a memory such as a RAM or a ROM. The memory stores the program to be executed by the CPU, program data, EPG data, data acquired via the network, and the like. The program stored in the memory is read and executed by the CPU when the television apparatus 900 is activated, for example. The CPU controls the operation of the television apparatus 900 according to an operating signal input from the user interface unit 911, for example, by executing the program.

The user interface unit 911 is connected to the control unit 910. The user interface unit 911 includes buttons and switches for users to operate the television apparatus 900 and a receiving unit for receiving remote control signals, for example. The user interface unit 911 detects a user operation via these components, generates an operating signal, and outputs the generated operating signal to the control unit 910.

The bus 912 connects the tuner 902, the demultiplexer 903, the decoder 904, the video signal processing unit 905, the audio signal processing unit 907, the external interface unit 909, and the control unit 910 to one another.

In the television apparatus 900 having the above described structure, the video signal processing unit 905 may have the functions of the above described image encoding device 100, for example. For example, the video signal processing unit 905 may encode image data supplied from the decoder 904 by the above described methods. The video signal processing unit 905 supplies the encoded data (bitstream) obtained as a result of the encoding to the external interface unit 909, for example, and causes the external interface unit 909 to output the encoded data to the outside of the television apparatus 900. Thus, the television apparatus 900 can put a bitstream generated by encoding the current image into such a state as to be more readily concatenated with another bitstream, and then output the bitstream.

Alternatively, the video signal processing unit 905 may have the functions of one of the above described bitstream concatenation devices (one of the bitstream concatenation devices 200 through 400), for example. The video signal processing unit 905 may be capable of concatenating bitstreams by performing smart rendering editing according to the methods described in the second through fourth embodiments, for example. With this, the television apparatus 900 (the video signal processing unit 905) can concatenate bitstreams more easily. The video signal processing unit 905 supplies the encoded data (bitstream) obtained in this manner to the external interface unit 909, for example, and can cause the external interface unit 909 to output the encoded data to the outside of the television apparatus 900.

Second Example Application: Portable Telephone Apparatus

Figure 34:
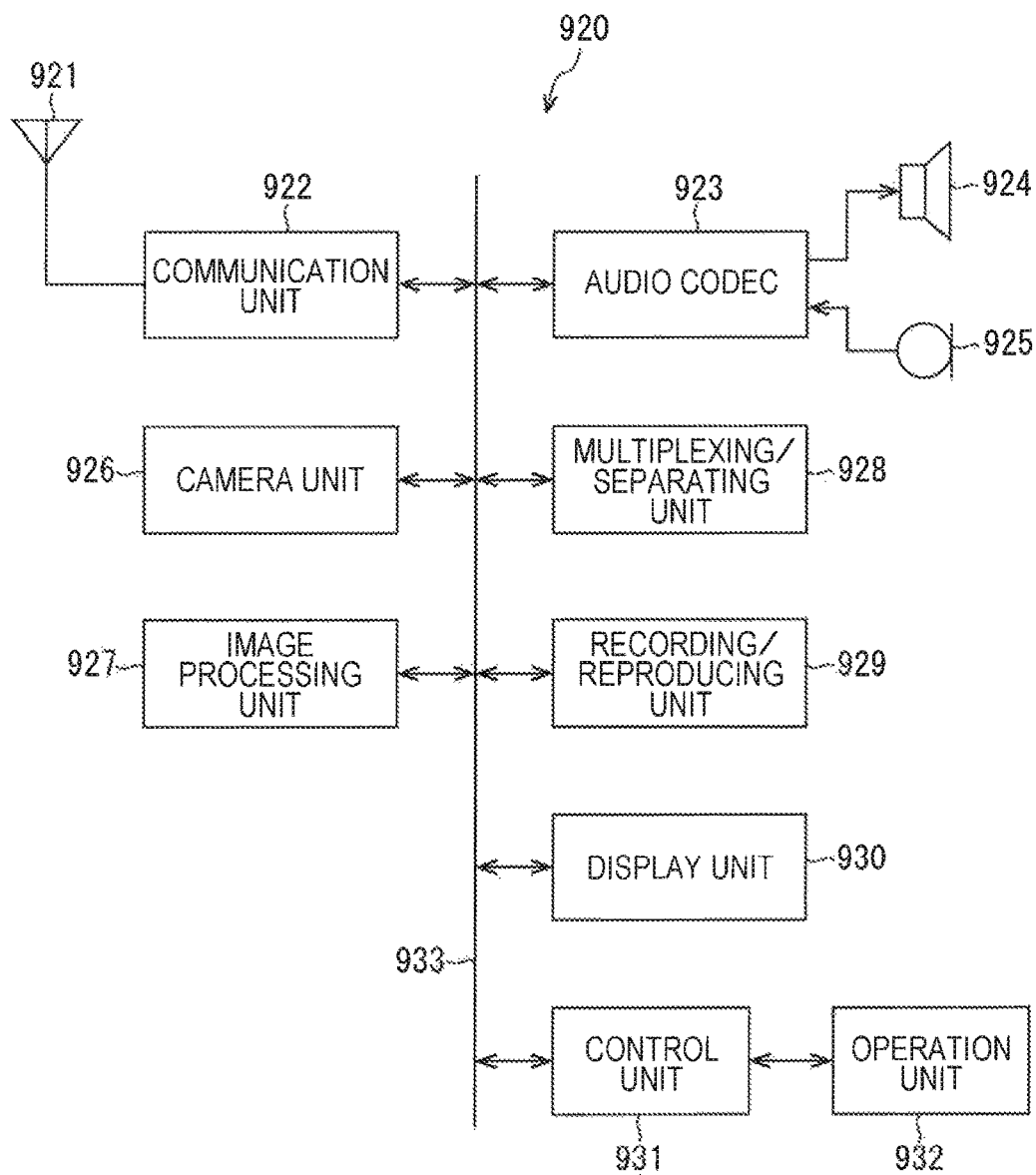
FIG. 34 is a block diagram schematically showing an example structure of a portable telephone apparatus.

FIG. 34 schematically shows an example structure of a portable telephone apparatus to which the above described embodiments are applied. The portable telephone apparatus 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to one another.

The portable telephone apparatus 920 performs operation such as transmission/reception of audio signals, transmission/reception of electronic mails and image data, capturing of images, recording of data, and the like in various operation modes including a voice call mode, a data communication mode, an imaging mode, and a video telephone mode.

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the compressed audio data to the communication unit 922. The communication unit 922 encodes and modulates the audio data to generate a signal to be transmitted. The communication unit 922 then transmits the generated signal to be transmitted to a base station (not shown) via the antenna 921. The communication unit 922 also performs amplification and a frequency conversion on a radio signal received via the antenna 921, and obtains a received signal. The communication unit 922 then demodulates and decodes the received signal to generate audio data, and outputs the generated audio data to the audio codec 923. The audio codec 923 performs decompression and D/A conversion on the audio data, to generate an analog audio signal. The audio codec 923 then supplies the generated audio signal to the speaker 924 to output audio therefrom.

In the data communication mode, the control unit 931 generates text data constituting an electronic mail in accordance with an operation by the user via the operation unit 932. The control unit 931 also displays the text on the display unit 930. The control unit 931 also generates electronic mail data in response to an instruction for transmission from a user via the operation unit 932, and outputs the generated electronic mail data to the communication unit 922. The communication unit 922 encodes and modulates the electronic mail data, to generate a transmission signal. The communication unit 922 then transmits the generated signal to be transmitted to a base station (not shown) via the antenna 921. The communication unit 922 also performs amplification and a frequency conversion on a radio signal received via the antenna 921, and obtains a received signal. The communication unit 922 then demodulates and decodes the received signal to restore electronic mail data, and outputs the restored electronic mail data to the control unit 931. The control unit 931 displays the content of the electronic mail on the display unit 930, and supplies the electronic mail data to the recording/reproducing unit 929 to write the data into the storage medium thereof.

The recording/reproducing unit 929 includes a readable/writable storage medium. For example, the storage medium may be an internal storage medium such as a RAM or flash memory, or may be an externally mounted storage medium such as a hard disk, a magnetic disk, a magnetooptical disk, an optical disk, a Universal Serial Bus (USB) memory, or a memory card.

In the imaging mode, the camera unit 926 generates image data by capturing an image of an object, and outputs the generated image data to the image processing unit 927. The image processing unit 927 encodes the image data input from the camera unit 926, and supplies the encoded stream to the recording/reproducing unit 929 to write the encoded stream into the storage medium thereof.

Further, in an image display mode, the recording/reproducing unit 929 reads the encoded stream recorded in the storage medium, and outputs the encoded stream to the image processing unit 927. The image processing unit 927 decodes the encoded stream input from the recording/reproducing unit 929, and supplies the image data to the display unit 930 to display the image.

In the video telephone mode, the multiplexing/separating unit 928 multiplexes a video stream encoded by the image processing unit 927 and an audio stream input from the audio codec 923, and outputs the multiplexed stream to the communication unit 922. The communication unit 922 encodes and modulates the stream to generate a signal to be transmitted. The communication unit 922 then transmits the generated signal to be transmitted to a base station (not shown) via the antenna 921. The communication unit 922 also performs amplification and a frequency conversion on a radio signal received via the antenna 921, and obtains a received signal. The transmission signal and the reception signal each include an encoded bitstream. The communication unit 922 restores a stream by demodulating and decoding the reception signal, and outputs the restored stream to the multiplexing/separating unit 928. The multiplexing/separating unit 928 separates a video stream and an audio stream from the input stream, and outputs the video stream to the image processing unit 927 and the audio stream to the audio codec 923. The image processing unit 927 decodes the video stream to generate video data. The video data is supplied to the display unit 930, and a series of images is displayed by the display unit 930. The audio codec 923 performs decompression and D/A conversion on the audio stream, to generate an analog audio signal. The audio codec 923 then supplies the generated audio signal to the speaker 924 to output audio therefrom.

In the portable telephone apparatus 920 having the above described structure, the image processing unit 927 may have the functions of the above described image encoding device 100, for example. That is, the image processing unit 927 may encode image data by the above described methods. Consequently, the portable telephone apparatus 920 can output or record a bitstream that has been generated by encoding image data and been put into such a state as to be more readily concatenated with another bitstream.

Alternatively, the image processing unit 927 may have the functions of one of the above described bitstream concatenation devices (one of the bitstream concatenation devices 200 through 400), for example. The image processing unit 927 may be capable of concatenating bitstreams by performing smart rendering editing according to the methods described in the second through fourth embodiments, for example. With this, the portable telephone apparatus 920 (the image processing unit 927) can concatenate bitstreams more easily. The image processing unit 927 can supply the encoded data (bitstream) obtained in this manner to the recording/reproducing unit 929, and cause the recording/reproducing unit 929 to write the encoded data into its storage medium or transmit the encoded data via the communication unit 922, for example.

Third Example Application: Recording/Reproducing Apparatus

Figure 35:
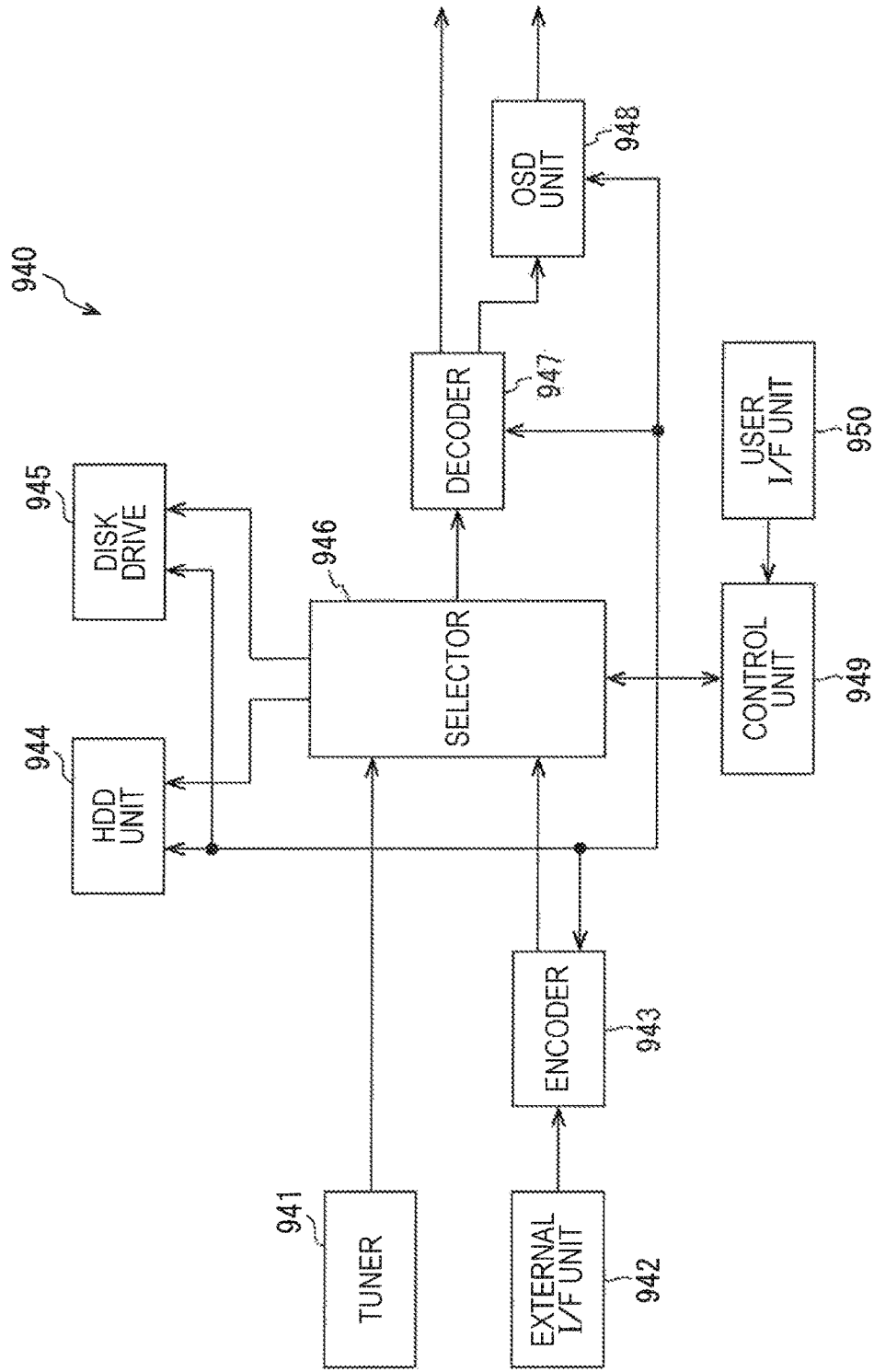
FIG. 35 is a block diagram schematically showing an example structure of a recording/reproducing apparatus.

FIG. 35 schematically shows an example structure of a recording/reproducing apparatus to which the above described embodiments are applied. A recording/reproducing apparatus 940 encodes audio data and video data of a received broadcast show, for example, and records the audio data and the video data on a recording medium. The recording/reproducing apparatus 940 may encode audio data and video data acquired from another apparatus, for example, and record the audio data and the video data on the recording medium. The recording/reproducing apparatus 940 also reproduces data recorded in the recording medium on a monitor and through a speaker in response to an instruction from a user, for example. In this case, the recording/reproducing apparatus 940 decodes audio data and video data.

The recording/reproducing apparatus 940 includes a tuner 941, an external interface (I/F) unit 942, an encoder 943, an hard disk drive (HDD) unit 944, a disk drive 945, a selector 946, a decoder 947, an on-screen display (OSD) unit 948, a control unit 949, and a user interface (I/F) unit 950.

The tuner 941 extracts a signal of a desired channel from broadcast signals received via an antenna (not shown), and demodulates the extracted signal. The tuner 941 outputs the encoded bitstream obtained by the demodulation to the selector 946. That is, the tuner 941 serves as a transmission unit in the recording/reproducing apparatus 940.

The external interface unit 942 is an interface for connecting the recording/reproducing apparatus 940 to an external device or a network. The external interface unit 942 may be an Institute of Electrical and Electronic Engineers (IEEE) 1394 interface, a network interface, a USB interface, or a flash memory interface, for example. Video data and audio data received via the external interface unit 942 are input to the encoder 943, for example. That is, the external interface unit 942 has a role as a transmission unit in the recording/reproducing apparatus 940.

The encoder 943 encodes the video data and the audio data if the video data and the audio data input from the external interface unit 942 are not encoded. The encoder 943 then outputs an encoded bitstream to the selector 946.

The HDD unit 944 records an encoded bitstream of compressed content data such as a video image and sound, various programs, and other data in an internal hard disk. The HDD unit 944 also reads the data from the hard disk for reproduction of the video image and the sound.

The disk drive 945 records and reads data into/from a recording medium mounted thereon. The recording medium mounted on the disk drive 945 may be a Digital Versatile Disc (DVD) (such as DVD-Video, DVD-Random Access Memory (DVD-RAM), DVD-Recordable (DVD-R), DVD-Rewritable (DVD-RW), DVD+Recordable (DVD+R), or DVD+Rewritable (DVD+RW)), or a Blu-ray (a registered trade name) disk, for example.

At a time of recording of a video image and sound, the selector 946 selects an encoded bitstream input from the tuner 941 or the encoder 943 and outputs the selected encoded bitstream to the HDD unit 944 or the disk drive 945. At a time of reproduction of a video image and audio, the selector 946 outputs an encoded bitstream input from the HDD unit 944 or the disk drive 945 to the decoder 947.

The decoder 947 decodes the encoded bitstream to generate video data and audio data. The decoder 947 then outputs the generated video data to the OSD unit 948. The decoder 947 also outputs the generated audio data to an external speaker.

The OSD unit 948 reproduces the video data input from the decoder 947 and displays the video image. The OSD unit 948 may also superimpose a GUI image such as a menu, a button, or a cursor on the video image to be displayed.

The control unit 949 includes a processor such as a CPU, and a memory such as a RAM and a ROM. The memory stores the program to be executed by the CPU, program data, and the like. The program stored in the memory is read and executed by the CPU when the recording/reproducing apparatus 940 is activated, for example. By executing the program, the CPU controls operation of the recording/reproducing apparatus 940 in accordance with an operating signal input from the user interface unit 950, for example.

The user interface unit 950 is connected to the control unit 949. The user interface unit 950 includes buttons and switches for users to operate the recording/reproducing apparatus 940 and a receiving unit for receiving remote control signals, for example. The user interface unit 950 detects operation performed by a user via these components, generates an operating signal, and outputs the generated operating signal to the control unit 949.

In the recording/reproducing apparatus 940 having such a structure, the encoder 943 may have the functions of the above described image encoding device 100. That is, the encoder 943 may encode image data by the above described methods. Consequently, the recording/reproducing apparatus 940 can output or record a bitstream that has been generated by encoding image data and been put into such a state as to be more readily concatenated with another bitstream.

Alternatively, the encoder 943 may have the functions of one of the above described bitstream concatenation devices (one of the bitstream concatenation devices 200 through 400), for example. The encoder 943 may be capable of not only encoding image data but also concatenating bitstreams by performing smart rendering editing according to the methods described in the second through fourth embodiments, for example. With this, the recording/reproducing apparatus 940 (the encoder 943) can concatenate bitstreams more easily.

Fourth Example Application: Imaging Apparatus

Figure 36:
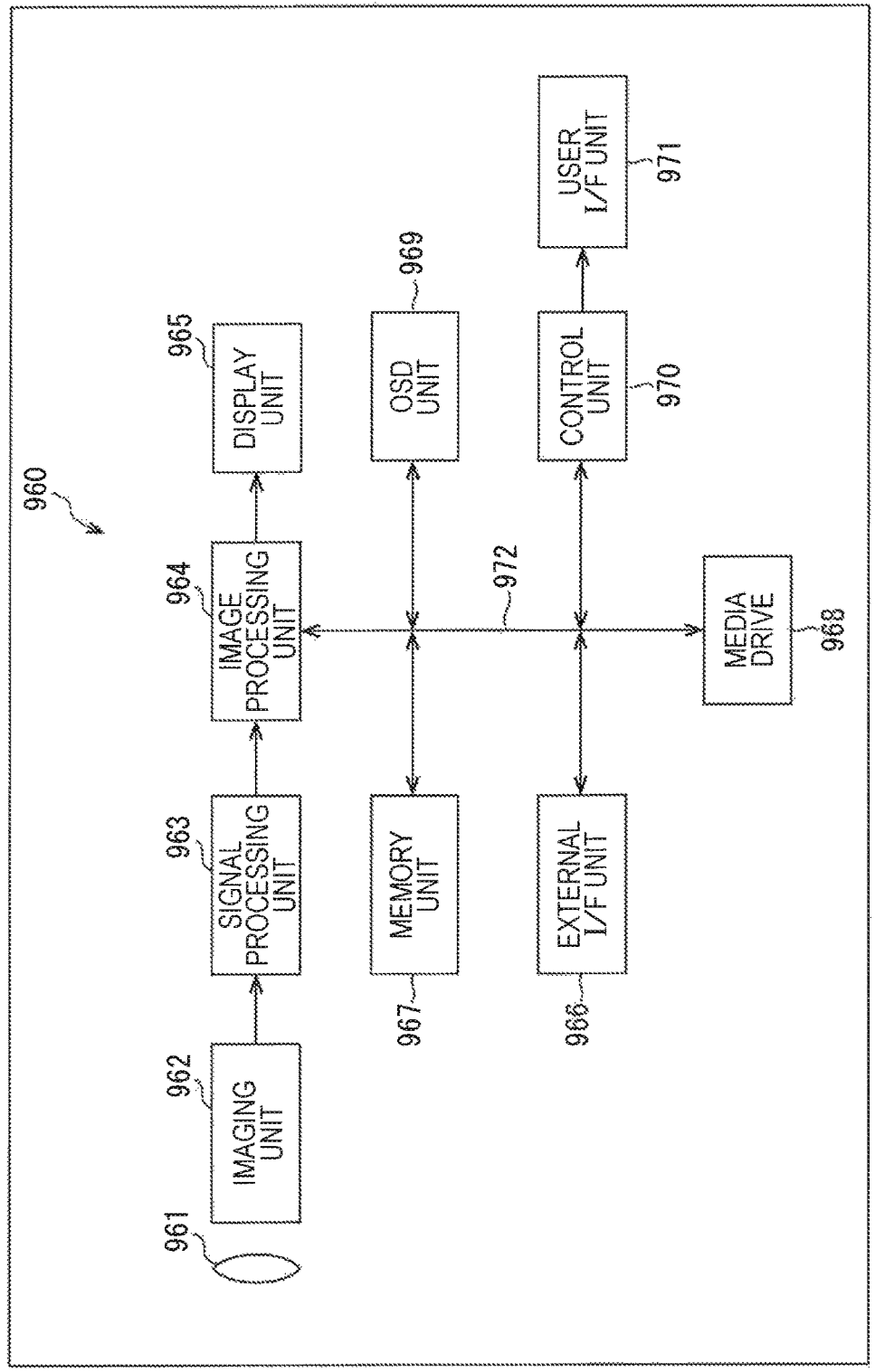
FIG. 36 is a block diagram schematically showing an example structure of an imaging apparatus.

FIG. 36 schematically shows an example structure of an imaging apparatus to which the above described embodiments are applied. An imaging apparatus 960 generates an image by imaging an object, encodes the image data, and records the image data on a recording medium.

The imaging apparatus 960 includes an optical block 961, an imaging unit 962, a signal processing unit 963, an image processing unit 964, a display unit 965, an external interface (I/F) unit 966, a memory unit 967, a media drive 968, an OSD unit 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 connects the image processing unit 964, the external interface unit 966, the memory unit 967, the media drive 968, the OSD unit 969, and the control unit 970 to one another.

The optical block 961 includes a focus lens and a diaphragm. The optical block 961 forms an optical image of an object on the imaging surface of the imaging unit 962. The imaging unit 962 includes an image sensor such as a Charge Coupled Device (CCD) or a Complementary Metal Oxide Semiconductor (CMOS), and converts the optical image formed on the imaging surface into an image signal as an electrical signal by photoelectric conversion. The imaging unit 962 outputs the image signal to the signal processing unit 963.

The signal processing unit 963 performs various kinds of camera signal processing such as knee correction, gamma correction, and color correction on the image signal input from the imaging unit 962. The signal processing unit 963 outputs the image data subjected to the camera signal processing to the image processing unit 964.

The image processing unit 964 encodes the image data input from the signal processing unit 963, to generate encoded data. The image processing unit 964 then outputs the generated encoded data to the external interface unit 966 or the media drive 968. The image processing unit 964 also decodes encoded data input from the external interface unit 966 or the media drive 968, to generate image data. The image processing unit 964 outputs the generated image data to the display unit 965. The image processing unit 964 may output image data input from the signal processing unit 963 to the display unit 965 to display images. The image processing unit 964 may also superimpose data for display acquired from the OSD unit 969 on the image to be output to the display unit 965.

The OSD unit 969 may generate a GUI image such as a menu, a button, or a cursor, and output the generated image to the image processing unit 964.

The external interface unit 966 is formed as a USB input/output terminal, for example. The external interface unit 966 connects the imaging apparatus 960 to a printer at the time of printing of an image, for example. A drive is also connected to the external interface unit 966, if necessary. A removable medium such as a magnetic disk or an optical disk is mounted on the drive so that a program read from the removable medium can be installed into the imaging apparatus 960. Furthermore, the external interface unit 966 may be a network interface connected to a network such as a LAN or the Internet. That is, the external interface unit 966 has a role as a transmission mean in the imaging apparatus 960.

The recording medium to be mounted on the media drive 968 may be a readable/writable removable medium such as a magnetic disk, a magnetooptical disk, an optical disk, or a semiconductor memory. Alternatively, a recording medium may be mounted on the media drive 968 in a fixed manner to form an immobile storage unit such as an internal hard disk drive or an solid state drive (SSD).

The control unit 970 includes a processor such as a CPU, and a memory such as a RAM and a ROM. The memory stores the program to be executed by the CPU, program data, and the like. The program stored in the memory is read and executed by the CPU when the imaging apparatus 960 is activated, for example. The CPU controls the operation of the imaging apparatus 960 according to an operating signal input from the user interface unit 971, for example, by executing the program.

The user interface unit 971 is connected to the control unit 970. The user interface unit 971 includes buttons and switches for users to operate the imaging apparatus 960, for example. The user interface unit 971 detects operation performed by a user via these components, generates an operating signal, and outputs the generated operating signal to the control unit 970.

In the imaging apparatus 960 having such a structure, the image processing unit 964 may have the functions of the above described image encoding device 100. That is, the image processing unit 964 may encode image data by the above described methods. Consequently, the imaging apparatus 960 can output or record a bitstream that has been generated by encoding image data and been put into such a state as to be more readily concatenated with another bitstream.

Alternatively, the image processing unit 964 may have the functions of one of the above described bitstream concatenation devices (one of the bitstream concatenation devices 200 through 400), for example. The image processing unit 964 may be capable of concatenating bitstreams by performing smart rendering editing according to the methods described in the second through fourth embodiments, for example. With this, the imaging apparatus 960 (the image processing unit 964) can concatenate bitstreams more easily.

The present technology can also be applied to HTTP streaming, such as MPEG DASH, which uses appropriate encoded data selected on a segment basis from among predetermined pieces of encoded data having different resolutions from one another. That is, information related to encoding and decoding can be shared among such pieces of encoded data.

7. Seventh Embodiment

Other Examples of Embodiments

Although examples of devices, systems, and the like to which the present technology is applied have been described above, the present technology is not limited to them, and can be embodied as any structure to be mounted on the above devices or devices in the systems, such as a processor as a system Large Scale Integration (LSI) or the like, a module using processors or the like, a unit using modules or the like, and a set (or a structure in a device) having other functions added to the unit.

<Video Set>

Figure 37:
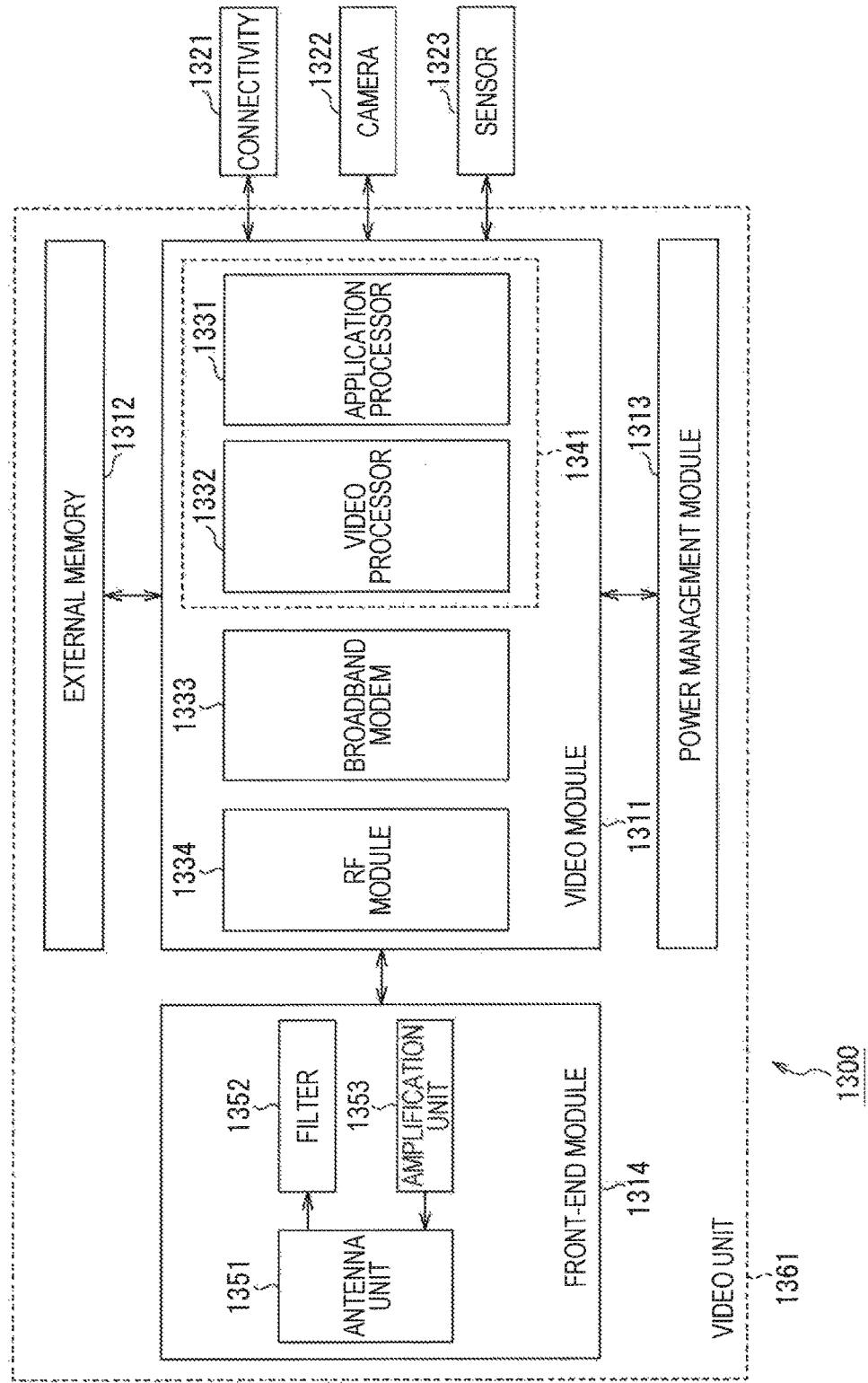
FIG. 37 is a block diagram schematically showing an example structure of a video set.

Referring now to FIG. 37, an example case where the present technology is embodied as a set is described. FIG. 37 schematically shows an example structure of a video set to which the present technology is applied.

In recent years, electronic apparatuses have become multifunctional. In the process of development and manufacture of electronic apparatuses, not only one structure in such electronic apparatuses is to be sold or provided, or a structure having one function is manufactured, but also one set having various functions is manufactured by combining structures having relevant functions in many cases these days.

The video set 1300 shown in FIG. 37 is such a multifunctional structure, and is formed by combining a device having a function related to image encoding and decoding (or encoding or decoding, or both encoding and decoding) with another function related to the function.

As shown in FIG. 37, the video set 1300 includes modules such as a video module 1311, an external memory 1312, a power management module 1313, and a front-end module 1314, and devices having relevant functions, such as connectivity 1321, a camera 1322, and a sensor 1323.

A module is formed by integrating the functions of components related to one another, and serves as a component having the integrated functions. Although its specific physical structure is not limited, a module may be formed by placing electronic circuit elements such as processors, resistors, and capacitors having respective functions on a wiring board or the like, and be integrated thereon. Alternatively, a new module may be formed by combining a module with another module, a processor, or the like.

In the example case shown in FIG. 37, the video module 1311 is formed by combining structures having functions related to image processing, and includes an application processor, a video processor, a broadband modem 1333, and an RF module 1334.

A processor is formed by integrating a structure having predetermined functions into a semiconductor chip by System On a Chip (SoC), and some processors are called system Large Scale Integrations (LSI), for example. The structure having the predetermined functions may be a logic circuit (a hardware structure), may be a structure including a CPU, a ROM, and a RAM, and a program (a software structure) to be executed with these components, or may be a structure formed by combining the two structures. For example, a processor may include a logic circuit, a CPU, a ROM, and a RAM, one of the functions may be realized by the logic circuit (hardware structure), and the other functions may be realized by the program (software structure) executed by the CPU.

The application processor 1331 in FIG. 37 is a processor that executes an application related to image processing. The application to be executed by the application processor 1331 can not only perform an arithmetic process but also control structures inside and outside the video module 1311, such as the video processor 1332, as necessary, to realize predetermined functions.

The video processor 1332 is a processor having functions related to image encoding and decoding (encoding and/or decoding).

The broadband modem 1333 obtains an analog signal by performing digital modulation or the like on data (a digital signal) to be transmitted through wired or wireless (or wired and wireless) broadband communication being conducted via a broadband network such as the Internet or a public telephone network, or converts an analog signal received through the broadband communication into data (a digital signal) by demodulating the analog signal. The broadband modem 1333 processes information, such as image data to be processed by the video processor 1332, a stream generated by encoding image data, an application program, and setting data.

The RF module 1334 is a module that performs frequency conversion, modulation/demodulation, amplification, filtering, or the like on an Radio Frequency (RF) signal to be transmitted or received via an antenna. For example, the RF module 1334 generates an RF signal by performing frequency conversion or the like on a baseband signal generated by the broadband modem 1333. The RF module 1334 also generates a baseband signal by performing frequency conversion or the like on an RF signal received via the front-end module 1314, for example.

As indicated by a dashed line 1341 in FIG. 37, the application processor 1331 and the video processor 1332 may be integrated and formed as one processor.

The external memory 1312 is a module that is provided outside the video module 1311 and has a storage device to be used by the video module 1311. The storage device of the external memory 1312 may be realized by any physical structure. Normally, the storage device is often used for storing large volumes of data such as frame-based image data. Therefore, the storage device is preferably realized by a relatively inexpensive, large-capacity semiconductor memory, such as a Dynamic Random Access Memory (DRAM).

The power management module 1313 manages and controls the power supply to the video module 1311 (the respective structures in the video module 1311).

The front-end module 1314 is a module that provides the RF module 1334 with front-end functions (circuits at the transmission and reception ends of the antenna). As shown in FIG. 37, the front-end module 1314 includes an antenna unit 1351, a filter 1352, and an amplification unit 1353, for example.

The antenna unit 1351 includes an antenna that transmits and receives radio signals, and peripheral structures around the antenna. The antenna unit 1351 transmits a signal supplied from the amplification unit 1353 as a radio signal, and supplies a received radio signal as an electrical signal (RF signal) to the filter 1352. The filter 1352 performs filtering or the like on an RF signal received via the antenna unit 1351, and supplies the processed RF signal to the RF module 1334. The amplification unit 1353 amplifies an RF signal supplied from the RF module 1334, and supplies the amplified RF signal to the antenna unit 1351.

The connectivity 1321 is a module that has a function related to connection to the outside. The connectivity 1321 may have any kind of physical structure. For example, the connectivity 1321 includes a structure that has a communication function compliant with standards other than the communication standards with which the broadband modem 1333 is compliant, and an external input/output terminal or the like.

For example, the connectivity 1321 may include a module having a communication function compliant with wireless communication standards such as Bluetooth (a registered trade name), IEEE 802.11 (such as Wireless Fidelity (Wi-Fi: a registered trade name), Near Field Communication (NFC), or InfraRed Data Association (IrDA), and an antenna or the like that transmits and receives signals compliant with the standards. Alternatively, the connectivity 1321 may include a module having a communication function compliant with cable communication standards such as Universal Serial Bus (USB) or High-Definition Multimedia Interface (a registered trade name) (HDMI), and a terminal compliant with the standards. Further, the connectivity 1321 may have some other data (signal) transmission function or the like, such as an analog input/output terminal.

The connectivity 1321 may include a device that is a data (signal) transmission destination. For example, the connectivity 1321 may include a drive (inclusive of not only a drive for removable media, but also a hard disk, an Solid State Drive (SSD), a Network Attached Storage (NAS), or the like) that performs data reading and writing on a recording medium such as a magnetic disk, an optical disk, a magnetooptical disk, or a semiconductor memory. The connectivity 1321 may also include an image or sound output device (a monitor, a speaker, or the like).

The camera 1322 is a module that has the function to image an object and obtain image data of the object. The image data obtained through the imaging performed by the camera 1322 is supplied to the video processor 1332 and is encoded.

The sensor 1323 is a module having a sensor function, such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. Data detected by the sensor 1323 is supplied to the application processor 1331, and is used by an application, for example.

The structures described as modules above may be embodied as processors, and the structures described as processors above may be embodied as modules.

In the video set 1300 having the above described structure, the present technology can be applied to the video processor 1332 as will be described later. Accordingly, the video set 1300 can be embodied as a set to which the present technology is applied.

<Example Structure of the Video Processor>

Figure 38:
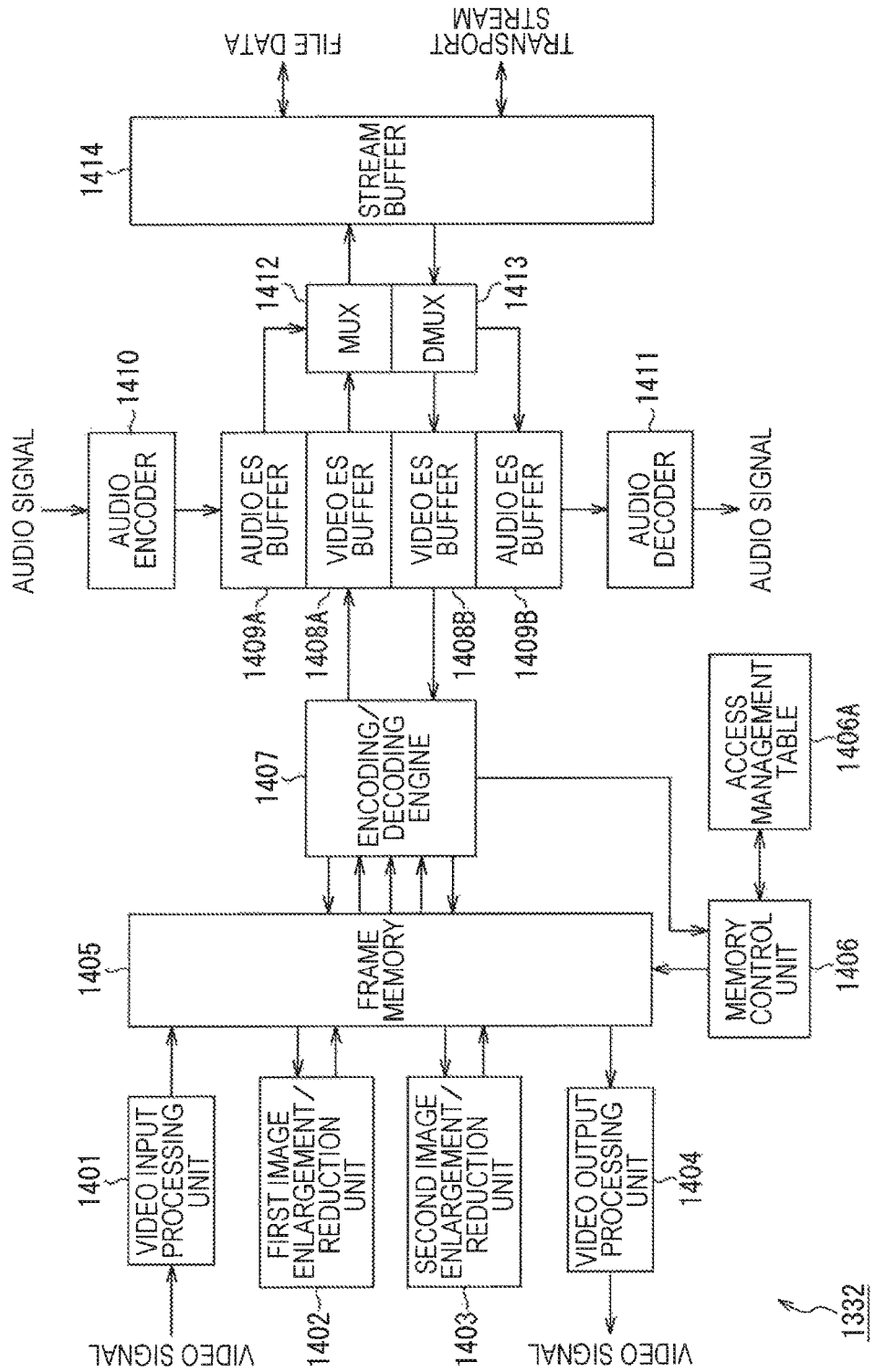
FIG. 38 is a block diagram schematically showing an example structure of a video processor.

FIG. 38 schematically shows an example structure of the video processor 1332 (FIG. 37) to which the present technology is applied.

In the example case shown in FIG. 38, the video processor 1332 has a function to receive inputs of a video signal and an audio signal, and encode these signals by a predetermined method, and a function to decode encoded video data and audio data, and reproduce and output a video signal and an audio signal.

As shown in FIG. 38, the video processor 1332 includes a video input processing unit 1401, a first image enlargement/reduction unit 1402, a second image enlargement/reduction unit 1403, a video output processing unit 1404, a frame memory 1405, and a memory control unit 1406. The video processor 1332 also includes an encoding/decoding engine 1407, video Elementary Stream (ES) buffers 1408A and 1408B, and audio ES buffers 1409A and 1409B. The video processor 1332 further includes an audio encoder 1410, an audio decoder 1411, a multiplexer (MUX) 1412, a demultiplexer (DMUX) 1413, and a stream buffer 1414.

The video input processing unit 1401 acquires a video signal input from the connectivity 1321 (FIG. 37), for example, and converts the video signal into digital image data. The first image enlargement/reduction unit 1402 performs format conversion, an image enlargement/reduction process, or the like on image data. The second image enlargement/reduction unit 1403 performs an image enlargement/reduction process on image data in accordance with the format at the output destination via the video output processing unit 1404, or, like the first image enlargement/reduction unit 1402, performs format conversion, an image enlargement/reduction process, or the like. The video output processing unit 1404 performs format conversion, conversion to an analog signal, or the like on image data, and outputs the result as a reproduced video signal to the connectivity 1321, for example.

The frame memory 1405 is an image data memory that is shared among the video input processing unit 1401, the first image enlargement/reduction unit 1402, the second image enlargement/reduction unit 1403, the video output processing unit 1404, and the encoding/decoding engine 1407. The frame memory 1405 is embodied as a semiconductor memory such as a DRAM.

The memory control unit 1406 receives a synchronization signal from the encoding/decoding engine 1407, and controls write and read access to the frame memory 1405 in accordance with a schedule of access to the frame memory 1405 written in an access management table 1406A. The access management table 1406A is updated by the memory control unit 1406 in accordance with processes performed by the encoding/decoding engine 1407, the first image enlargement/reduction unit 1402, the second image enlargement/reduction unit 1403, and the like.

The encoding/decoding engine 1407 performs an image data encoding process, and a process of decoding a video stream that is data generated by encoding image data. For example, the encoding/decoding engine 1407 encodes image data read from the frame memory 1405, and sequentially writes the encoded image data as a video stream into the video ES buffer 1408A. Also, the encoding/decoding engine 1407 sequentially reads and decodes a video stream from the video ES buffer 1408B, and sequentially writes the decoded video stream as image data into the frame memory 1405, for example. In the encoding and the decoding, the encoding/decoding engine 1407 uses the frame memory 1405 as a work area. The encoding/decoding engine 1407 also outputs a synchronization signal to the memory control unit 1406 when a process for a macroblock is started, for example.

The video ES buffer 1408A buffers a video stream generated by the encoding/decoding engine 1407, and supplies the video stream to the multiplexer (MUX) 1412. The video ES buffer 1408B buffers a video stream supplied from the demultiplexer (DMUX) 1413, and supplies the video stream to the encoding/decoding engine 1407.

The audio ES buffer 1409A buffers an audio stream generated by the audio encoder 1410, and supplies the audio stream to the multiplexer (MUX) 1412. The audio ES buffer 1409B buffers an audio stream supplied from the demultiplexer (DMUX) 1413, and supplies the audio stream to the audio decoder 1411.

The audio encoder 1410 performs digital conversion, for example, on an audio signal input from the connectivity 1321 or the like, and encodes the audio signal by a predetermined method such as an MPEG audio method or Audio Code number 3 (AC3). The audio encoder 1410 sequentially writes an audio stream that is the data generated by encoding the audio signal, into the audio ES buffer 1409A. The audio decoder 1411 decodes an audio stream supplied from the audio ES buffer 1409B, performs conversion to an analog signal, for example, and supplies the result as a reproduced audio signal to the connectivity 1321 or the like.

The multiplexer (MUX) 1412 multiplexes a video stream and an audio stream. Any method can be used in this multiplexing (or any format can be used for the bitstream to be generated by the multiplexing). In this multiplexing, the multiplexer (MUX) 1412 may also add predetermined header information or the like to the bitstream. That is, the multiplexer (MUX) 1412 can convert a stream format by performing multiplexing. For example, the multiplexer (MUX) 1412 multiplexes a video stream and an audio stream, to convert the format to a transport stream that is a bitstream in a format for transfer. Also, the multiplexer (MUX) 1412 multiplexes a video stream and an audio stream, to convert data to data (file data) in a file format for recording, for example.

The demultiplexer (DMUX) 1413 demultiplexes a bitstream generated by multiplexing a video stream and an audio stream, by a method compatible with the multiplexing performed by the multiplexer (MUX) 1412. Specifically, the demultiplexer (DMUX) 1413 extracts a video stream and an audio stream from a bitstream read from the stream buffer 1414 (or separates a video stream and an audio stream). That is, the demultiplexer (DMUX) 1413 can convert a stream format by performing demultiplexing (the reverse conversion of the conversion performed by the multiplexer (MUX) 1412). For example, the demultiplexer (DMUX) 1413 acquires, via the stream buffer 1414, a transport stream supplied from the connectivity 1321, the broadband modem 1333, or the like, and demultiplexes the transport stream, to convert the transport stream into a video stream and an audio stream. Also, the demultiplexer (DMUX) 1413 acquires, via the stream buffer 1414, file data read from a recording medium of any kind through the connectivity 1321, for example, and demultiplexes the file data, to convert the file data into a video stream and an audio stream.

The stream buffer 1414 buffers a bitstream. For example, the stream buffer 1414 buffers a transport stream supplied from the multiplexer (MUX) 1412, and supplies the transport stream to the connectivity 1321, the broadband modem 1333, or the like at a predetermined time or in response to a request or the like from the outside.

Also, the stream buffer 1414 buffers file data supplied from the multiplexer (MUX) 1412, and supplies the file data to the connectivity 1321 or the like at a predetermined time or in response to a request or the like from the outside, to record the file data into a recording medium of any kind, for example.

Further, the stream buffer 1414 buffers a transport stream obtained via the connectivity 1321, the broadband modem 1333, or the like, and supplies the transport stream to the demultiplexer (DMUX) 1413 at a predetermined time or in response to a request or the like from the outside.

Also, the stream buffer 1414 buffers file data read from a recording medium of any kind in the connectivity 1321 or the like, and supplies the file data to the demultiplexer (DMUX) 1413 at a predetermined time or in response to a request or the like from the outside.

Next, an example operation of the video processor 1332 having the above structure is described. For example, a video signal that is input from the connectivity 1321 or the like to the video processor 1332 is converted into digital image data by a predetermined format such as the 4:2:2 Y/Cb/Cr format in the video input processing unit 1401, and the digital image data is sequentially written into the frame memory 1405. The digital image data is also read into the first image enlargement/reduction unit 1402 or the second image enlargement/reduction unit 1403, is subjected to format conversion to a predetermined format such as the 4:2:0 Y/Cb/Cr format, and an enlargement/reduction process, and is again written into the frame memory 1405. The image data is encoded by the encoding/decoding engine 1407, and is written as a video stream into the video ES buffer 1408A.

Meanwhile, an audio signal that is input from the connectivity 1321 or the like to the video processor 1332 is encoded by the audio encoder 1410, and is written as an audio stream into the audio ES buffer 1409A.

The video stream in the video ES buffer 1408A and the audio stream in the audio ES buffer 1409A are read into the multiplexer (MUX) 1412, are then multiplexed, and are converted into a transport stream or file data. A transport stream generated by the multiplexer (MUX) 1412 is buffered by the stream buffer 1414, and is then output to an external network via the connectivity 1321, the broadband modem 1333, or the like. File data generated by the multiplexer (MUX) 1412 is buffered by the stream buffer 1414, is output to the connectivity 1321 or the like, and is recorded into a recording medium of any kind.

Meanwhile, a transport stream that is input from an external network to the video processor 1332 via the connectivity 1321, the broadband modem 1333, or the like is buffered by the stream buffer 1414, and is then demultiplexed by the demultiplexer (DMUX) 1413. Also, file data that is read from a recording medium of any kind in the connectivity 1321 or the like and is input to the video processor 1332 is buffered by the stream buffer 1414, and is then demultiplexed by the demultiplexer (DMUX) 1413.

That is, a transport stream or file data that is input to the video processor 1332 is divided into a video stream and an audio stream by the demultiplexer (DMUX) 1413.

An audio stream is supplied to the audio decoder 1411 via the audio ES buffer 1409B, and is then decoded, to reproduce an audio signal. Meanwhile, a video stream is written into the video ES buffer 1408B, is then sequentially read and decoded by the encoding/decoding engine 1407, and is written into the frame memory 1405. The decoded image data is subjected to an enlargement/reduction process by the second image enlargement/reduction unit 1403, and is written into the frame memory 1405. The decoded image data is then read into the video output processing unit 1404, is subjected to format conversion to a predetermined format such as the 4:2:2Y/Cb/Cr format, is further converted into an analog signal, so that a video signal is reproduced and output.

In a case where the present technology is applied to the video processor 1332 having the above structure, the present technology according to the respective embodiments described above is applied to the encoding/decoding engine 1407. That is, the encoding/decoding engine 1407 may have the functions of the image encoding device according to each of the above described embodiments, for example. Alternatively, the encoding/decoding engine 1407 may have the functions of the bitstream concatenation devices according to the above described embodiments, for example. The encoding/decoding engine 1407 may be capable of concatenating bitstreams by performing smart rendering editing according to the methods described in the second through fourth embodiments, for example. With this, the video processor 1332 can achieve the same effects as the effects described above with reference to FIGS. 1 through 31.

In the encoding/decoding engine 1407, the present technology (or the functions of the image encoding device and the bitstream concatenation devices according to the respective embodiments described above) may be embodied by hardware such as a logic circuit, may be embodied by software such as an embedded program, or may be embodied by both hardware and software.

<Another Example Structure of the Video Processor>

Figure 39:
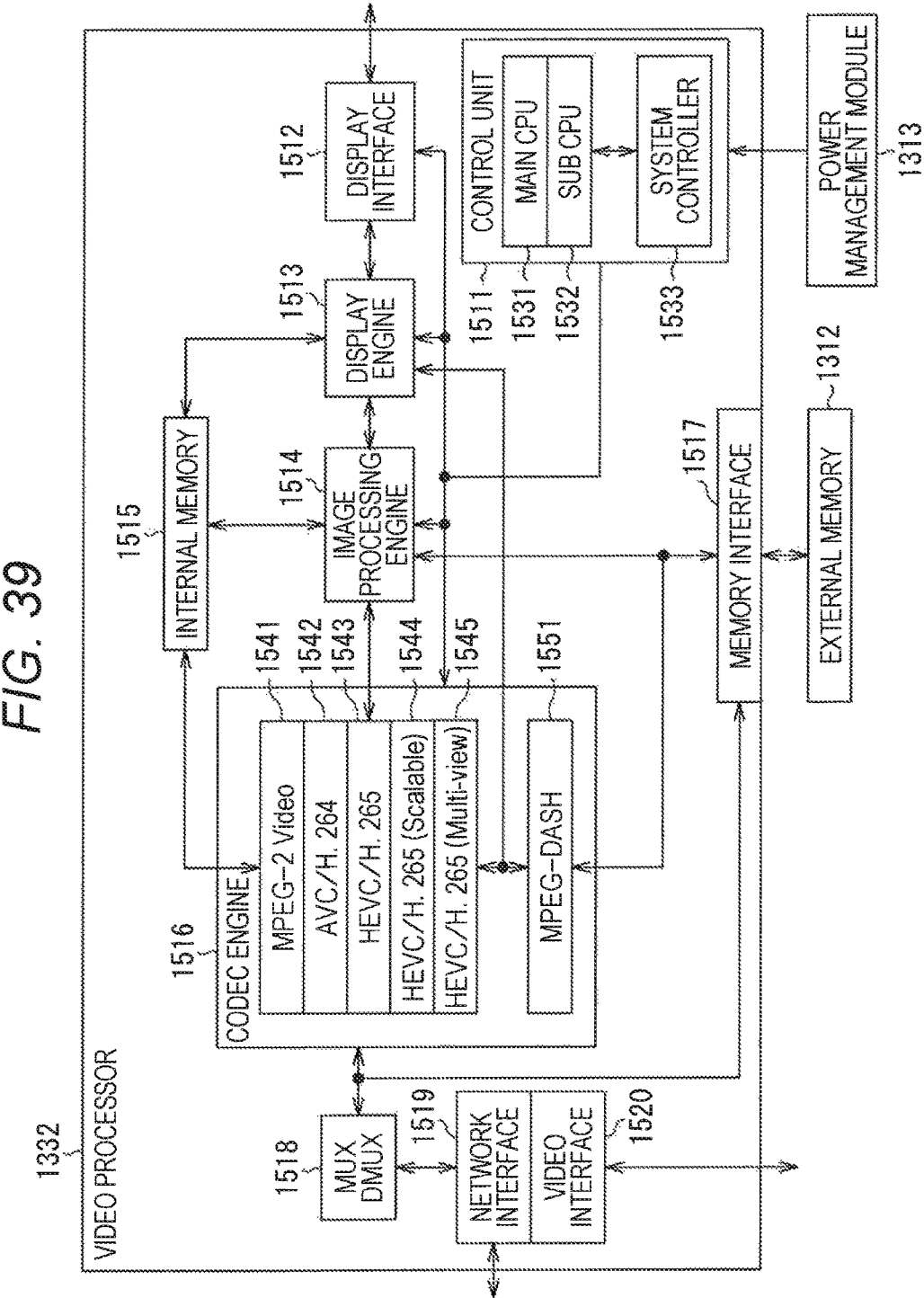
FIG. 39 is a block diagram schematically showing another example structure of a video processor.

FIG. 39 schematically shows another example structure of the video processor 1332 to which the present technology is applied. In the example case shown in FIG. 39, the video processor 1332 has a function to encode and decode video data by a predetermined method.

More specifically, as shown in FIG. 39, the video processor 1332 includes a control unit 1511, a display interface 1512, a display engine 1513, an image processing engine 1514, and an internal memory 1515. The video processor 1332 also includes a codec engine 1516, a memory interface 1517, a multiplexer/demultiplexer (MUX DMUX) 1518, a network interface 1519, and a video interface 1520.

The control unit 1511 controls operations of the respective processing units in the video processor 1332, such as the display interface 1512, the display engine 1513, the image processing engine 1514, and the codec engine 1516.

As shown in FIG. 39, the control unit 1511 includes a main CPU 1531, a sub CPU 1532, and a system controller 1533, for example. The main CPU 1531 executes a program or the like for controlling operations of the respective processing units in the video processor 1332. The main CPU 1531 generates a control signal in accordance with the program or the like, and supplies the control signal to the respective processing units (or controls operations of the respective processing units). The sub CPU 1532 plays an auxiliary role for the main CPU 1531. For example, the sub CPU 1532 executes a child process, a subroutine, or the like of the program or the like to be executed by the main CPU 1531. The system controller 1533 controls operations of the main CPU 1531 and the sub CPU 1532, such as designating programs to be executed by the main CPU 1531 and the sub CPU 1532.

Under the control of the control unit 1511, the display interface 1512 outputs image data to the connectivity 1321, for example. The display interface 1512 converts digital image data into an analog signal, and outputs the image data as a reproduced video signal or the digital image data as it is to a monitor device or the like of the connectivity 1321, for example.

Under the control of the control unit 1511, the display engine 1513 performs various conversion processes such as format conversion, size conversion, and color gamut conversion on image data, so as to conform to the hardware specifications of the monitor device or the like that will display the image.

Under the control of the control unit 1511, the image processing engine 1514 performs predetermined image processing, such as filtering for improving image quality, on image data.

The internal memory 1515 is a memory that is shared among the display engine 1513, the image processing engine 1514, and the codec engine 1516, and is provided in the video processor 1332. The internal memory 1515 is used in data exchange among the display engine 1513, the image processing engine 1514, and the codec engine 1516, for example. The internal memory 1515 stores data supplied from the display engine 1513, the image processing engine 1514, or the codec engine 1516, and supplies the data to the display engine 1513, the image processing engine 1514, or the codec engine 1516 as necessary (in response to a request, for example). The internal memory 1515 may be realized by any storage device. Normally, the internal memory 1515 is often used for storing small volumes of data such as block-based image data and parameters. Therefore, the internal memory 1515 is preferably realized by a semiconductor memory that has a relatively small capacity (compared with the external memory 1312) but has a high response speed, such as an Static Random Access Memory (SRAM).

The codec engine 1516 performs processing related to encoding and decoding of image data. The codec engine 1516 is compatible with any encoding/decoding method, and the number of compatible methods may be one, or may be two or greater. For example, the codec engine 1516 has a codec functions compatible with encoding/decoding methods, and may encode image data or decode encoded data by a method selected from among those methods.

In the example shown in FIG. 39, the codec engine 1516 includes MPEG-2 Video 1541, AVC/H.264 1542, HEVC/H.265 1543, HEVC/H.265 (Scalable) 1544, HEVC/H.265 (Multi-view) 1545, and MPEG-DASH 1551, as functional blocks for processing related to codec.

The MPEG-2 Video 1541 is a functional block that encodes or decodes image data by MPEG-2. The AVC/H.264 1542 is a functional block that encodes or decodes image data by AVC. The HEVC/H.265 1543 is a functional block that encodes or decodes image data by HEVC. The HEVC/H.265 (Scalable) 1544 is a functional block that performs scalable encoding or scalable decoding on image data by HEVC. The HEVC/H.265 (Multi-view) 1545 is a functional block that performs multi-view encoding or multi-view decoding on image data by HEVC.

The MPEG-DASH 1551 is a functional block that transmits and receives image data by MPEG-Dynamic Adaptive Streaming over HTTP (MPEG-DASH). MPEG-DASH is a technology for conducting video stream using HyperText Transfer Protocol (HTTP), and one of the features thereof lies in selecting and transmitting, on a segment basis, an appropriate piece of encoded data from among predetermined pieces of encoded data having different resolutions from one another. The MPEG-DASH 1551 generates a stream compliant with the standards and performs control or the like on transmission of the stream. As for encoding/decoding image data, the MPEG-DASH 1551 uses the MPEG-2 Video 1541 through the HEVC/H.265 (Multi-view) 1545 described above.

The memory interface 1517 is an interface for the external memory 1312. Data supplied from the image processing engine 1514 and the codec engine 1516 is supplied to the external memory 1312 via the memory interface 1517. Meanwhile, data read from the external memory 1312 is supplied to the video processor 1332 (the image processing engine 1514 or the codec engine 1516) via the memory interface 1517.

The multiplexer/demultiplexer (MUX DMUX) 1518 multiplexes or demultiplexes various kinds of data related to images, such as a bitstream of encoded data, image data, and a video signal. Any method may be used in this multiplexing/demultiplexing. For example, at a time of multiplexing, the multiplexer/demultiplexer (MUX DMUX) 1518 may not only integrate pieces of data into one, but also add predetermined header information or the like to the data. At a time of demultiplexing, the multiplexer/demultiplexer (MUX DMUX) 1518 may not only divide one set of data into pieces, but also add predetermined header information or the like to each piece of the divided data. That is, the multiplexer/demultiplexer (MUX DMUX) 1518 can convert a data format by performing multiplexing/demultiplexing. For example, the multiplexer/demultiplexer (MUX DMUX) 1518 can convert a bitstream into a transport stream that is a bitstream in a format for transfer, or into data (file data) in a file format for recording, by multiplexing the bitstream. The reverse conversion is of course also possible through demultiplexing.

The network interface 1519 is an interface for the broadband modem 1333, the connectivity 1321, and the like. The video interface 1520 is an interface for the connectivity 1321, the camera 1322, and the like.

Next, an example operation of this video processor 1332 is described. When a transport stream is received from an external network via the connectivity 1321, the broadband modem 1333, or the like, the transport stream is supplied to the multiplexer/demultiplexer (MUX DMUX) 1518 via the network interface 1519, is demultiplexed, and is decoded by the codec engine 1516. The image data obtained through the decoding performed by the codec engine 1516 is subjected to predetermined image processing by the image processing engine 1514, for example, is subjected to predetermined conversion by the display engine 1513, and is supplied to the connectivity 1321 or the like via the display interface 1512, so that the image is displayed on a monitor. Also, the image data obtained through the decoding performed by the codec engine 1516 is again encoded by the codec engine 1516, is multiplexed and converted into file data by the multiplexer/demultiplexer (MUX DMUX) 1518, is output to the connectivity 1321 or the like via the video interface 1520, and is recorded into a recording medium of any kind.

Further, file data of encoded data that is generated by encoding image data and is read from a recording medium (not shown) by the connectivity 1321 or the like is supplied to the multiplexer/demultiplexer (MUX DMUX) 1518 via the video interface 1520, is demultiplexed, and is decoded by the codec engine 1516. The image data obtained through the decoding performed by the codec engine 1516 is subjected to predetermined image processing by the image processing engine 1514, is subjected to predetermined conversion by the display engine 1513, and is supplied to the connectivity 1321 or the like via the display interface 1512, so that the image is displayed on a monitor. Also, the image data obtained through the decoding performed by the codec engine 1516 is again encoded by the codec engine 1516, is multiplexed and converted into a transport stream by the multiplexer/demultiplexer (MUX DMUX) 1518, is supplied to the connectivity 1321, the broadband modem 1333, or the like via the network interface 1519, and is transmitted to another apparatus (not shown).

Exchange of image data and other data among the respective processing units in the video processor 1332 is conducted with the use of the internal memory 1515 or the external memory 1312, for example. The power management module 1313 controls the power supply to the control unit 1511, for example.

In a case where the present technology is applied to the video processor 1332 having the above structure, the present technology according to the respective embodiments described above is applied to the codec engine 1516. That is, the codec engine 1516 may have the functional blocks that constitute the image encoding device according to each of the above described embodiments, for example. Alternatively, the codec engine 1516 may have the functions of the bitstream concatenation devices according to the above described embodiments, for example. The codec engine 1516 may be capable of concatenating bitstreams by performing smart rendering editing according to the methods described in the second through fourth embodiments, for example. With this, the video processor 1332 can achieve the same effects as the effects described above with reference to FIGS. 1 through 31.

In the codec engine 1516, the present technology (or the functions of the image encoding device and the bitstream concatenation devices according to the respective embodiments described above) may be embodied by hardware such as a logic circuit, may be embodied by software such as an embedded program, or may be embodied by both hardware and software.

Although two example structures for the video processor 1332 have been described above, the video processor 1332 may have any appropriate structure other than the two example structures described above. The video processor 1332 may be formed as a single semiconductor chip, or may be formed as semiconductor chips. For example, the video processor 1332 may be formed as a three-dimensional stacked LSI in which semiconductors are stacked. Alternatively, the video processor 1332 may be realized by LSIs.

<Example Applications to Apparatuses>

The video set 1300 can be incorporated into various apparatuses that process image data. For example, the video set 1300 can be incorporated into the television apparatus 900 (FIG. 33), the portable telephone apparatus 920 (FIG. 34), the recording/reproducing apparatus 940 (FIG. 35), the imaging apparatus 960 (FIG. 36), and the like. As the video set 1300 is incorporated into an apparatus, the apparatus can achieve the same effects as the effects described above with reference to FIGS. 1 through 31.

A portion of a structure in the above described video set 1300 can be embodied as a structure to which the present technology is applied, as long as the portion includes the video processor 1332. For example, the video processor 1332 can be embodied as a video processor to which the present technology is applied. Also, the processors indicated by the dashed line 1341, the video module 1311, and the like can be embodied as a processor, a module, and the like to which the present technology is applied. Further, the video module 1311, the external memory 1312, the power management module 1313, and the front-end module 1314 may be combined into a video unit 1361 to which the present technology is applied. With any of the above structures, the same effects as the effects described above with reference to FIGS. 1 through 31 can be achieved.

That is, like the video set 1300, any structure including the video processor 1332 can be incorporated into various kinds of apparatuses that process image data. For example, the video processor 1332, the processors indicated by the dashed line 1341, the video module 1311, or the video unit 1361 can be incorporated into the television apparatus 900 (FIG. 33), the portable telephone apparatus 920 (FIG. 34), the recording/reproducing apparatus 940 (FIG. 35), the imaging apparatus 960 (FIG. 36), and the like. As any of the structures to which the present technology is applied is incorporated into an apparatus, the apparatus can achieve the same effects as the effects described above with reference to FIGS. 1 through 31, as in the case of the video set 1300.

In this specification, examples in which various information pieces are multiplexed with an encoded stream and are transmitted from the encoding side to the decoding side have been described. However, the method of transmitting the information is not limited to the above examples. For example, the information pieces may be transmitted or recorded as separate data associated with an encoded bitstream, without being multiplexed with the encoded bitstream. Note that the term "associate" means to allow images (which may be part of images such as slices or blocks) contained in a bitstream to be linked to the information corresponding to the images at the time of decoding. That is, the information may be transmitted via a transmission path different from that for the images (or the bitstream). Alternatively, the information may be recorded in a recording medium (or in a different area in the same recording medium) other than the recording medium for the images (or the bitstream). Furthermore, the information and the images (or the bitstream) may be associated with each other in any units such as in units of some frames, one frame, or part of a frame.

The present technology can also be in the following forms.

(1) An image encoding device including:
a setting unit that sets header information related to a hypothetical reference decoder in accordance with information about a position and information about reference, the information about a position and the information about reference being of the current picture of image data to be processed; and
an encoding unit that encodes the image data and generates a bitstream containing the encoded data of the image data and the header information set by the setting unit.

(2) The image encoding device of any of (1) and (3) through (9), wherein the setting unit sets information indicating a null unit type.

(3) The image encoding device of any of (1), (2), and (4) through (9), wherein the setting unit further sets information indicating bitstream concatenation.

(4) The image encoding device of any of (1) through (3) and (5) through (9), wherein the setting unit further sets information indicating a difference between the position of the access unit at the end of the bitstream and the position of the previous non-discardable picture.

(5) The image encoding device of any of (1) through (4) and (6) through (9), wherein,
when the current picture is a first picture,
the setting unit sets the information indicating the null unit type at a value indicating an IDR picture,
sets the information indicating bitstream concatenation at "true", and
sets the information indicating the difference between the position of the access unit at the end of the bitstream and the position of the previous non-discardable picture at a minimum value.

(6) The image encoding device of any of (1) through (5) and (7) through (9), wherein,
when the current picture is a last picture,
the setting unit sets the information indicating the null unit type at a value indicating a trailing picture that is not of a temporal sublayer and is to be referred to,
sets the information indicating bitstream concatenation at "false", and
sets the information indicating the difference between the position of the access unit at the end of the bitstream and the position of the previous non-discardable picture at a minimum value.

(7) The image encoding device of any of (1) through (6), (8), and (9), wherein,
when the current picture is neither a first picture nor a last picture, but is a reference picture,
the setting unit sets the information indicating the null unit type at a value indicating a trailing picture that is not of a temporal sublayer and is to be referred to,
sets the information indicating bitstream concatenation at "false", and
sets the information indicating the difference between the position of the access unit at the end of the bitstream and the position of the previous non-discardable picture at a minimum value.

(8) The image encoding device of any of (1) through (6), (7), and (9), wherein,
when the current picture is neither a first picture nor a last picture, and is not a reference picture,
the setting unit sets the information indicating the null unit type at a value indicating a non-reference picture that is not of a temporal sublayer,
sets the information indicating bitstream concatenation at "false", and
sets the information indicating the difference between the position of the access unit at the end of the bitstream and the position of the previous non-discardable picture at a minimum value.

(9) The image encoding device of any of (1) through (8), further including
a rate control unit that sets a target code amount value in accordance with the information about the position of the current picture, information indicating a section for adjusting the hypothetical reference decoder, and information indicating a generated code amount.

(10) An image encoding method including:
setting header information related to a hypothetical reference decoder in accordance with information about a position and information about reference, the information about a position and the information about reference being of the current picture of image data to be processed; and
encoding the image data and generating a bitstream containing the encoded data of the image data and the set header information.

(11) An image processing device including an updating unit that updates header information related to a hypothetical reference decoder, the header information being included in a bitstream containing encoded data generated by encoding image data, the updating enabling concatenation of the bitstream with another bitstream.

(12) The image processing device of any of (11) and (13) through (19), wherein the updating unit re-encodes the bitstream to appropriately adjust the relationship between the position of the coded picture buffer at the end of the bitstream to be concatenated and the position of the coded picture buffer at the start of the concatenating bitstream.

(13) The image processing device of any of (11), (12), and (14) through (19), wherein the updating unit updates information indicating the null unit type at the end of the bitstream with the value corresponding to the previous non-discardable picture.

(14) The image processing device of any of (11) through (13) and (15) through (19), wherein the updating unit updates information about readout from a coded picture buffer with a value suitable for bitstream concatenation.

(15) The image processing device of any of (11) through (14) and (16) through (19), wherein the updating unit searches for the previous non-discardable picture at the end of the bitstream, and, in accordance with a result of the search, updates the difference between the position of the access unit at the end of the bitstream and the position of the previous non-discardable picture.

(16) The image processing device of any of (11) through (15) and (17) through (19), wherein the updating unit updates information about readout from the coded picture buffer and the decoded picture buffer at the end of the bitstream with a value suitable for bitstream concatenation.

(17) The image processing device of any of (11) through (16), (18), and (19), wherein the updating unit updates information about readout from the coded picture buffer and the decoded picture buffer at the start of the bitstream with a value suitable for bitstream concatenation.

(18) The image processing device of any of (11) through (17) and (19), wherein the updating unit updates information indicating a delay of readout from the coded picture buffer of the access unit at the start of the concatenating bitstream, with a value in accordance with information indicating a delay of readout from the coded picture buffer at the end of the bitstream to be concatenated.

(19) The image processing device of any of (11) through (18), further including a concatenating unit that concatenates the bitstream updated by the updating unit with another bitstream.

(20) An image processing method including updating header information related to a hypothetical reference decoder, the header information being included in a bitstream containing encoded data generated by encoding image data, the updating enabling concatenation of the bitstream with another bitstream.

REFERENCE SIGNS LIST

100 Image encoding device
125 Rate control unit
126 Nal_unit_type determination unit
141 HRD tracing unit
142 Target Bit determination unit
200 Bitstream concatenation device
211 Buffer determination unit
212 Nal_unit_type rewrite unit
213 Buffering Period rewrite unit
214 Bitstream concatenation unit
300 Bitstream concatenation device
312 PrevNonDiscardablePic search unit
400 Bitstream concatenation device
413 PrevCpbRemovalDelay search unit
414 Buffering Period rewrite unit
415 Picture Timing SEI rewrite unit

The invention claimed is:

1. An image encoding device comprising:
a setting unit configured to set, prior to concatenation of a bitstream with another bitstream, header information related to a hypothetical reference decoder, wherein the header information is set based on information about a position of a current picture of image data to be processed and information about whether the current picture is a reference picture to be referred to; and
an encoding unit configured to encode the image data and generate the bitstream containing the encoded data of the image data and the header information set by the setting unit, the encoding enabling concatenation of the bitstream with the another bitstream,
wherein the setting unit is further configured to set information indicating a difference between a position of an access unit at an end of the bitstream and a position of a previous non-discardable picture, based on whether or not the current picture is a first picture of a concatenating bitstream, a last picture of a bitstream to be concatenated, and the reference picture to be referred to, and
wherein the setting unit and the encoding unit are each implemented via at least one processor.

2. The image encoding device according to claim 1, wherein the setting unit is further configured to set information indicating a NAL unit type.

3. The image encoding device according to claim 2, wherein the setting unit is further configured to set information indicating bitstream concatenation.

4. The image encoding device according to claim 3, wherein, when the current picture is the first picture of the concatenating bitstream, the setting unit is further configured to
set the information indicating the NAL unit type at a value indicating an Instantaneous Decoding Refresh (IDR) picture,
set the information indicating bitstream concatenation at "true", and
set the information indicating the difference between the position of the access unit at the end of the bitstream and the position of the previous non-discardable picture as 0.

5. The image encoding device according to claim 3, wherein, when the current picture is the last picture of the bitstream to be concatenated, the setting unit is further configured to
set the information indicating the NAL unit type at a value indicating a trailing picture to be referred to, the trailing picture not being of a temporal sublayer,
set the information indicating bitstream concatenation at "false", and
set the information indicating the difference between the position of the access unit at the end of the bitstream and the position of the previous non-discardable picture as 0.

6. The image encoding device according to claim 3, wherein, when the current picture is neither the first picture nor the last picture of the bitstream to be concatenated or the concatenating bitstream, but is the reference picture to be referred to, the setting unit is further configured to
set the information indicating the NAL unit type at a value indicating a trailing picture to be referred to, the trailing picture not being of a temporal sublayer,
set the information indicating bitstream concatenation at "false", and
set the information indicating the difference between the position of the access unit at the end of the bitstream and the position of the previous non-discardable picture as 0.

7. The image encoding device according to claim 3, wherein, when the current picture is neither the first picture nor the last picture of the bitstream to be concatenated or the concatenating bitstream, and is not the reference picture to be referred to, the setting unit is further configured to
set the information indicating the NAL unit type at a value indicating a non-reference picture, the non-reference picture not being of a temporal sublayer,
set the information indicating bitstream concatenation at "false", and
set the information indicating the difference between the position of the access unit at the end of the bitstream and the position of the previous non-discardable picture as 0.

8. The image encoding device according to claim 1, further comprising:
a rate control unit configured to set a target code amount value in accordance with the information about the position of the current picture, information indicating a section for adjusting the hypothetical reference decoder, and information indicating a generated code amount,
wherein the rate control unit is implemented via at least one processor.

9. An image encoding method comprising:
setting, prior to concatenation of a bitstream with another bitstream, header information related to a hypothetical reference decoder, wherein the header information is set based on information about a position of a current picture of image data to be processed and information about whether the current picture is a reference picture to be referred to; and
encoding the image data and generating the bitstream containing the encoded data of the image data and the set header information, the encoding enabling concatenation of the bitstream with the another bitstream,
wherein the setting of the header information comprises setting information indicating a difference between a position of an access unit at an end of the bitstream and a position of a previous non-discardable picture, based on whether or not the current picture is a first picture of a concatenating bitstream, a last picture of a bitstream to be concatenated, and the reference picture to be referred to.

10. An image processing device comprising
an updating unit configured to update, prior to concatenation of a bitstream with another bitstream, header information related to a hypothetical reference decoder, the header information being included in the bitstream containing encoded data generated by encoding image data and set based on information about a position of a current picture of image data to be processed and information about whether the current picture is a reference picture to be referred to, the updating enabling concatenation of the bitstream with the another bitstream,
wherein the updating unit is further configured to
search for a previous non-discardable picture at an end of the bitstream, and
in accordance with a result of the search, update a difference between a position of an access unit at the end of the bitstream and a position of the previous non-discardable picture, based on whether or not the current picture is a first picture of a concatenating bitstream, a last picture of a bitstream to be concatenated, and the reference picture to be referred to, and
wherein the updating unit is implemented via at least one processor.

11. The image processing device according to claim 10, wherein the updating unit re-encodes the bitstream to appropriately adjust a relationship between a position of a coded picture buffer at an end of the bitstream to be concatenated and a position of a coded picture buffer at a start of the concatenating bitstream.

12. The image processing device according to claim 10, wherein the updating unit updates information indicating a NAL unit type at an end of the bitstream to be concatenated with a value corresponding to a previous non-discardable picture.

13. The image processing device according to claim 10, wherein the updating unit updates information, about readout from a coded picture buffer, with a value suitable for bitstream concatenation.

14. The image processing device according to claim 10, wherein the updating unit updates information, about readout from a coded picture buffer and a decoded picture buffer at an end of the bitstream to be concatenated, with a value suitable for bitstream concatenation.

15. The image processing device according to claim 10, wherein the updating unit updates information, about readout from a coded picture buffer and a decoded picture buffer at a start of the concatenating bitstream, with a value suitable for bitstream concatenation.

16. The image processing device according to claim 15, wherein the updating unit updates information indicating a delay of readout from a coded picture buffer of an access unit at the start of the concatenating bitstream, with a value in accordance with information indicating a delay of readout from a coded picture buffer at an end of the bitstream to be concatenated.

17. The image processing device according to claim 10, further comprising
a concatenating unit configured to concatenate the bitstream updated by the updating unit with the another bitstream,
wherein the concatenating unit is implemented via at least one processor.

18. An image processing method comprising
updating, prior to concatenation of a bitstream with another bitstream, header information related to a hypothetical reference decoder, the header information being included in the bitstream containing encoded data generated by encoding image data and set based on information about a position of a current picture of image data to be processed and information about whether the current picture is a reference picture to be referred to, the updating enabling concatenation of the bitstream with the another bitstream,
wherein the updating the header information comprises
searching for a previous non-discardable picture at an end of the bitstream, and in accordance with a result of the search, updating a difference between a position of an access unit at the end of the bitstream and a position of the previous non-discardable picture, based on whether or not the current picture is a first picture of a concatenating bitstream, a last picture of a bitstream to be concatenated, and the reference picture to be referred to.

19. The image encoding device according to claim 1, wherein the setting unit is further configured to set the header information in accordance with information about whether the current picture is a first picture of a concatenating bitstream or a last picture of a bitstream to be concatenated.

20. The image encoding device according to claim 1, wherein the setting unit is further configured to
   determine a position of the current picture of image data to be processed; and
   set the header information based on the determined position of the current picture.

\* \* \* \* \*